(12) United States Patent
Amundson

(10) Patent No.: US 9,269,311 B2
(45) Date of Patent: Feb. 23, 2016

(54) METHODS AND APPARATUS FOR DRIVING ELECTRO-OPTIC DISPLAYS

(71) Applicant: E Ink Corporation, Billerica, MA (US)

(72) Inventor: Karl Raymond Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/089,610

(22) Filed: Nov. 25, 2013

(65) Prior Publication Data

US 2014/0085350 A1 Mar. 27, 2014

Related U.S. Application Data

(60) Division of application No. 13/086,066, filed on Apr. 13, 2011, now Pat. No. 8,593,396, which is a division of application No. 11/161,715, filed on Aug. 13, 2005, now Pat. No. 7,952,557, and a continuation-in-part of (Continued)

(51) Int. Cl.
*G09G 3/34* (2006.01)
*G09G 5/00* (2006.01)

(52) U.S. Cl.
CPC . *G09G 3/344* (2013.01); *G09G 5/00* (2013.01)

(58) Field of Classification Search
CPC G09G 3/344; G09G 3/3446; G09G 2310/068
USPC .......................................................... 345/107
See application file for complete search history.

(56) References Cited

U.S. PATENT DOCUMENTS

| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |

(Continued)

FOREIGN PATENT DOCUMENTS

| EP | 1 099 207 B1 | 3/2002 |
| EP | 1 145 072 B1 | 5/2003 |

(Continued)

OTHER PUBLICATIONS

Kitamura, T., et al., "Electrical toner movement for electronic paper-like display", Asia Display/IDW '01, p. 1517, Paper HCS1-1 (2001).

(Continued)

*Primary Examiner* — Stephen Sherman
(74) *Attorney, Agent, or Firm* — David J. Cole

(57) ABSTRACT

Waveforms for driving electro-optic displays, especially bistable electro-optic displays, are modified by one or more of insertion of at least one balanced pulse pair into a base waveform; excision of at least one balanced pulse pair from the base waveform; and insertion of at least one period of zero voltage into the base waveform. Such modifications permit fine control of gray levels.

4 Claims, 31 Drawing Sheets

Related U.S. Application Data application No. 10/904,707, filed on Nov. 24, 2004, now Pat. No. 8,558,783, and a continuation-in-part of application No. 10/879,335, filed on Jun. 29, 2004, now Pat. No. 7,528,822, and a continuation-in-part of application No. 10/814,205, filed on Mar. 31, 2004, now Pat. No. 7,119,772, and a continuation-in-part of application No. 10/065,795, filed on Nov. 20, 2002, now Pat. No. 7,012,600.

(60) Provisional application No. 60/601,242, filed on Aug. 13, 2004, provisional application No. 60/522,372, filed on Sep. 21, 2004, provisional application No. 60/522,393, filed on Sep. 24, 2004, provisional application No. 60/481,711, filed on Nov. 26, 2003, provisional application No. 60/481,713, filed on Nov. 26, 2003, provisional application No. 60/481,040, filed on Jun. 30, 2003, provisional application No. 60/481,053, filed on Jul. 2, 2003, provisional application No. 60/481,405, filed on Sep. 22, 2003, provisional application No. 60/320,070, filed on Mar. 31, 2003, provisional application No. 60/320,207, filed on May 5, 2003, provisional application No. 60/481,669, filed on Nov. 19, 2003, provisional application No. 60/481,675, filed on Nov. 20, 2003, provisional application No. 60/557,094, filed on Mar. 26, 2004, provisional application No. 60/319,007, filed on Nov. 20, 2001, provisional application No. 60/319,010, filed on Nov. 21, 2001, provisional application No. 60/319,034, filed on Dec. 18, 2001, provisional application No. 60/319,037, filed on Dec. 20, 2001, provisional application No. 60/319,040, filed on Dec. 21, 2001.

(56) References Cited

U.S. PATENT DOCUMENTS

| | | |
|---|---|---|
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| 6,672,921 B1 | 1/2004 | Liang et al. |
| 6,680,725 B1 | 1/2004 | Jacobson |
| 6,683,333 B2 | 1/2004 | Kazlas et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,071,913 B2 | 7/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,119,772 B2 | 10/2006 | Amundson et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,193,625 B2 | 3/2007 | Danner et al. |
| 7,202,847 B2 | 4/2007 | Gates |
| 7,206,119 B2 | 4/2007 | Honeyman et al. |
| 7,223,672 B2 | 5/2007 | Kazlas et al. |
| 7,236,291 B2 | 6/2007 | Kaga et al. |
| 7,256,766 B2 | 8/2007 | Albert et al. |
| 7,259,744 B2 | 8/2007 | Arango et al. |
| 7,280,094 B2 | 10/2007 | Albert |
| 7,312,916 B2 | 12/2007 | Pullen et al. |

(56) References Cited

U.S. PATENT DOCUMENTS

| | | |
|---|---|---|
| 7,321,459 B2 | 1/2008 | Masuda et al. |
| 7,339,715 B2 | 3/2008 | Webber et al. |
| 7,365,394 B2 | 4/2008 | Denis et al. |
| 7,365,733 B2 | 4/2008 | Duthaler et al. |
| 7,420,549 B2 | 9/2008 | Jacobson et al. |
| 7,528,822 B2 | 5/2009 | Amundson et al. |
| 7,561,324 B2 | 7/2009 | Duthaler et al. |
| 7,602,374 B2 | 10/2009 | Zehner et al. |
| 7,667,684 B2 | 2/2010 | Jacobson et al. |
| 7,728,811 B2 | 6/2010 | Albert et al. |
| 7,893,435 B2 | 2/2011 | Kazlas et al. |
| 7,952,557 B2 | 5/2011 | Amundson et al. |
| 8,129,655 B2 | 3/2012 | Jacobson et al. |
| 8,466,852 B2 | 6/2013 | Drzaic et al. |
| 8,558,783 B2 | 10/2013 | Wilcox et al. |
| 8,593,396 B2 | 11/2013 | Amundson et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2005/0012471 A1* | 1/2005 | Burau et al. .................. 315/291 |
| 2005/0012980 A1 | 1/2005 | Wilcox et al. |
| 2005/0018273 A1 | 1/2005 | Honeyman et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0259068 A1 | 11/2005 | Nihei et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0170648 A1* | 8/2006 | Zhou et al. .................... 345/107 |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |

FOREIGN PATENT DOCUMENTS

| | | |
|---|---|---|
| EP | 1 429 178 | 6/2004 |
| JP | 2000-137250 | 5/2000 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |
| WO | WO 2005008623 A1 * | 1/2005 |

OTHER PUBLICATIONS

Yamaguchi, Y., et al., "Toner display using insulative particles charged triboelectrically", Asia Display/IDW '01, p. 1729, Paper AMD4-4 (2001).

* cited by examiner

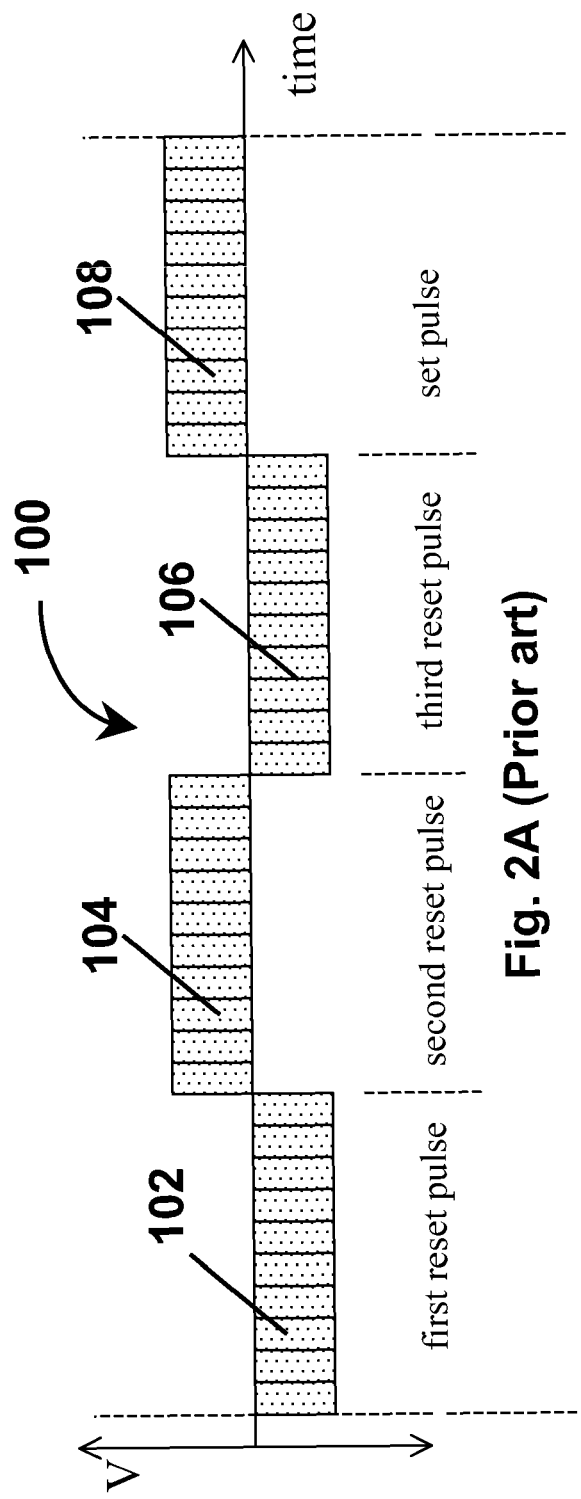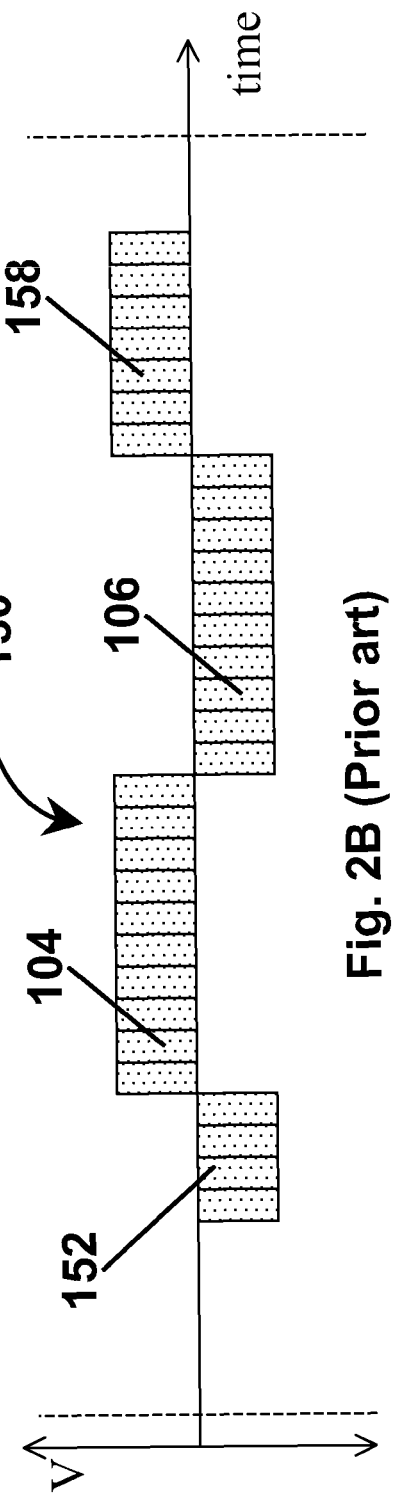

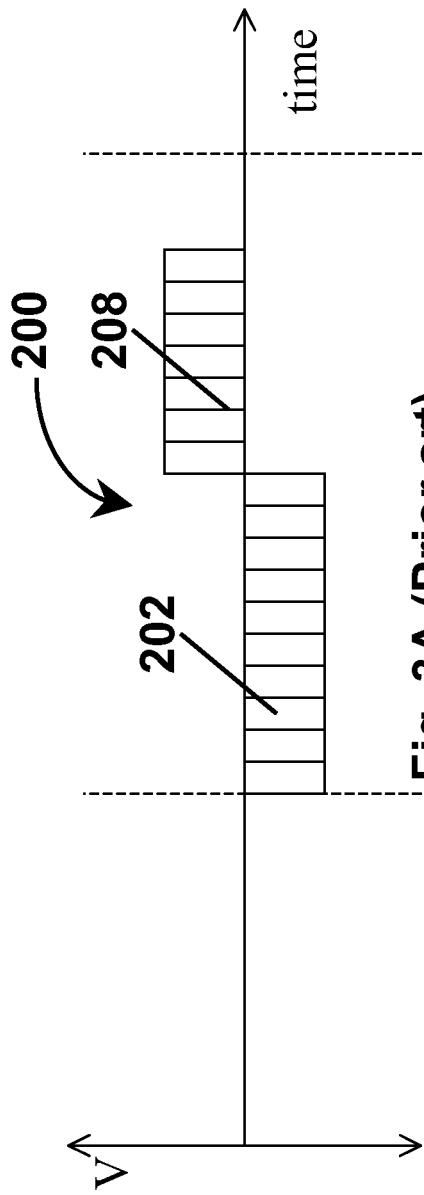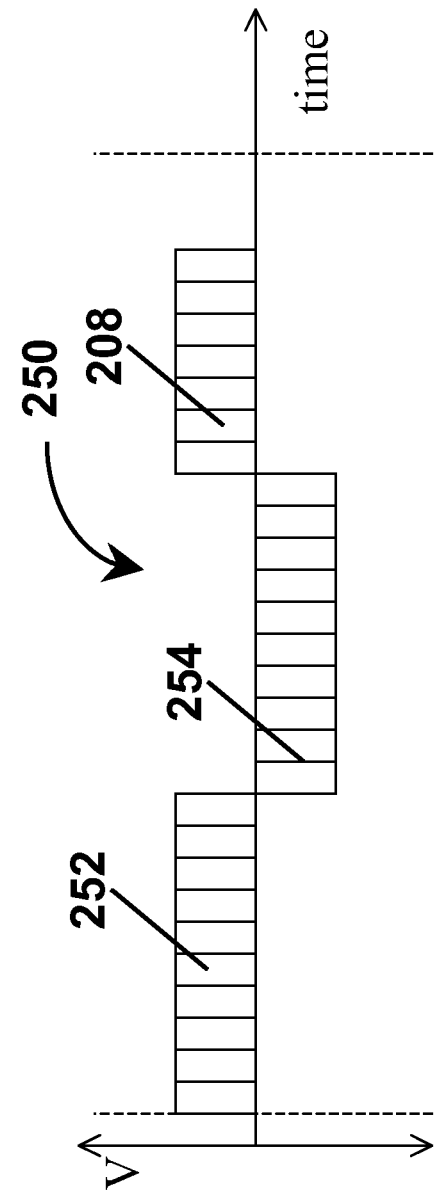

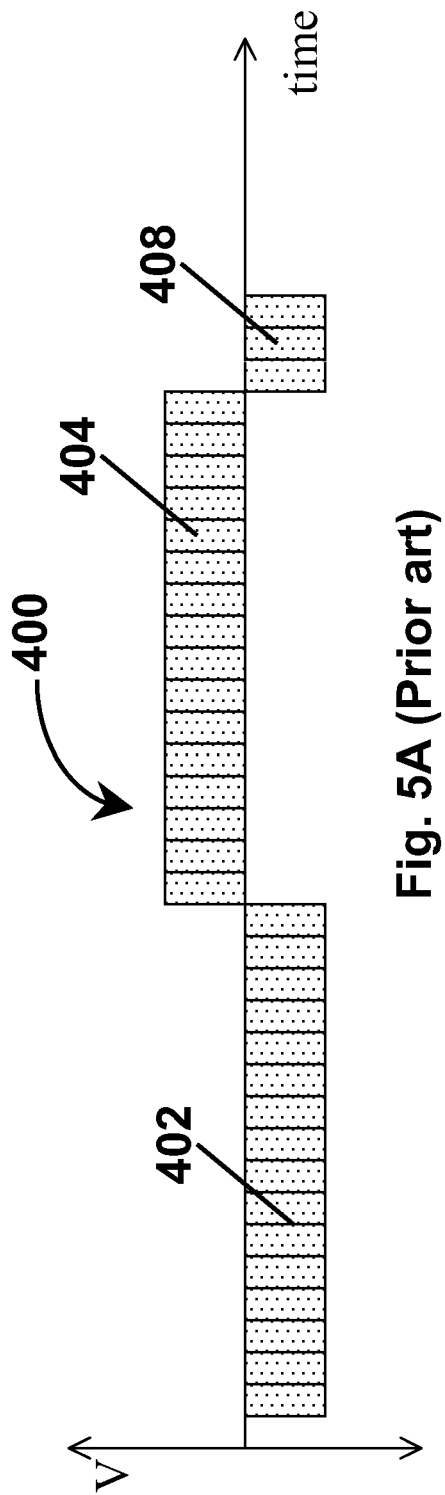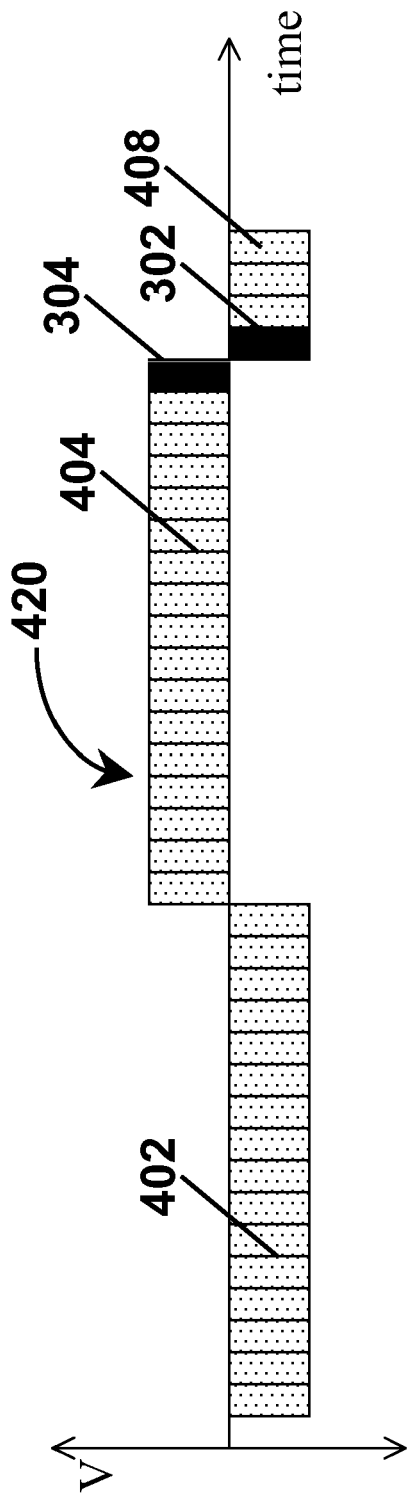

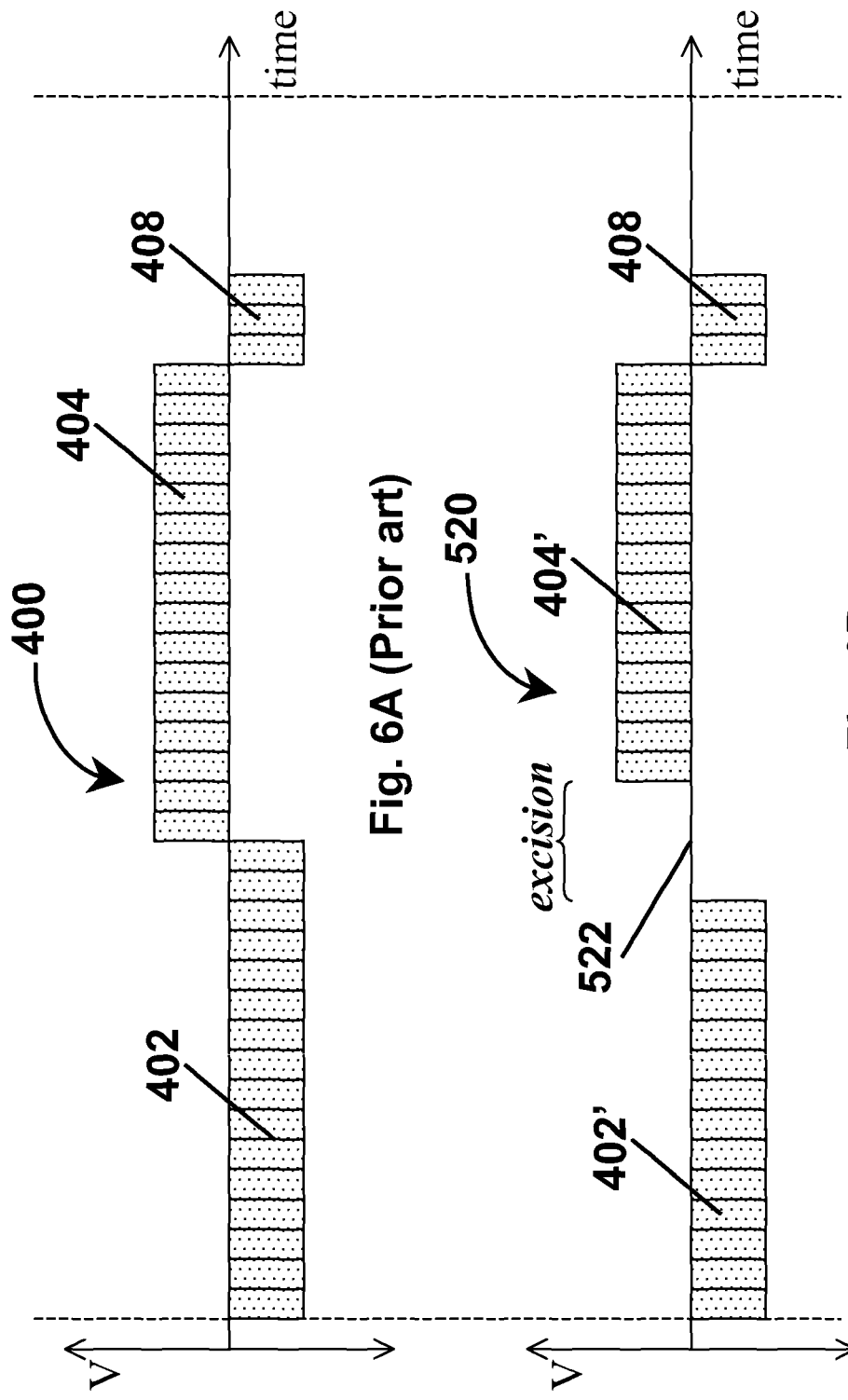

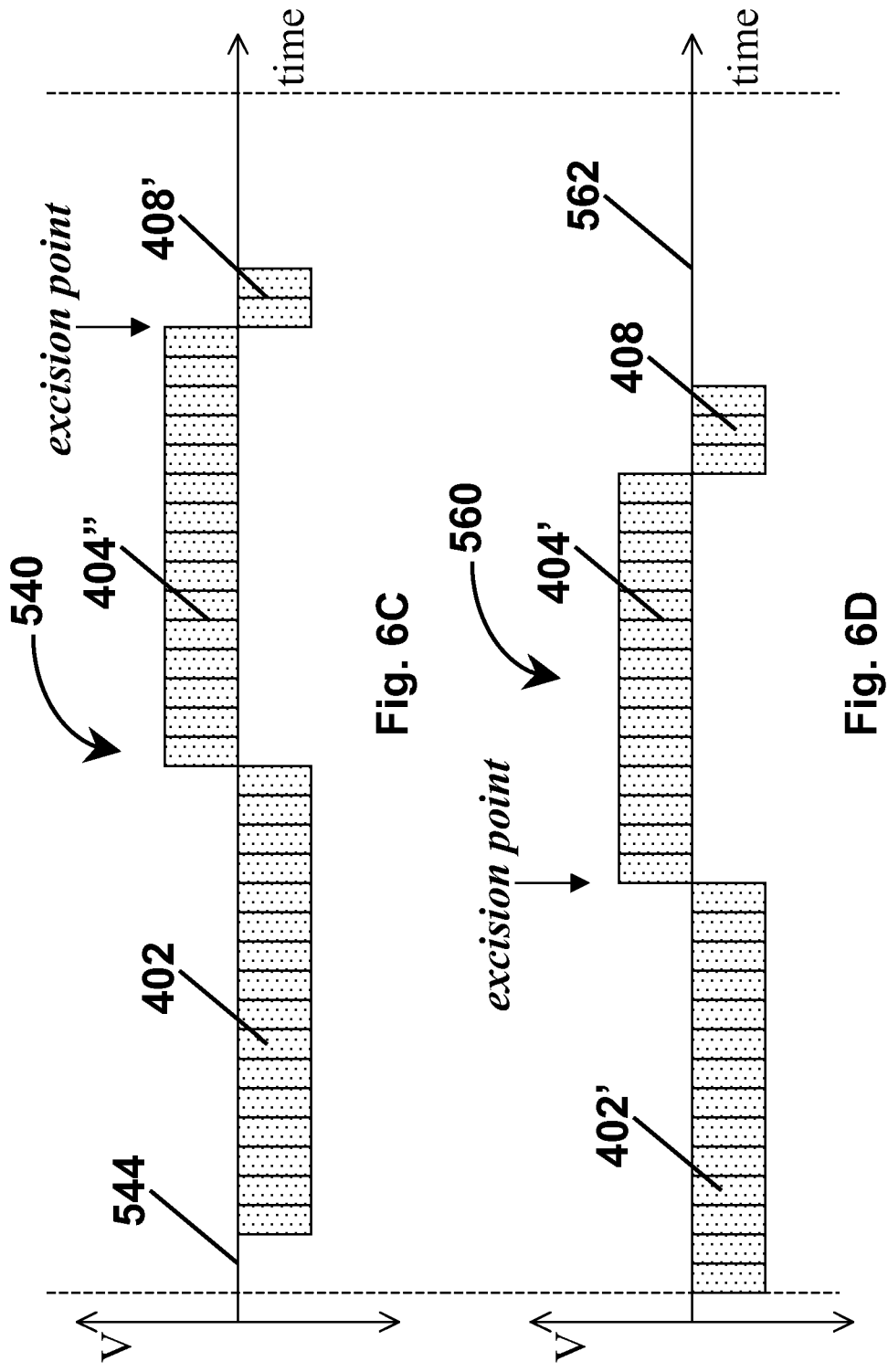

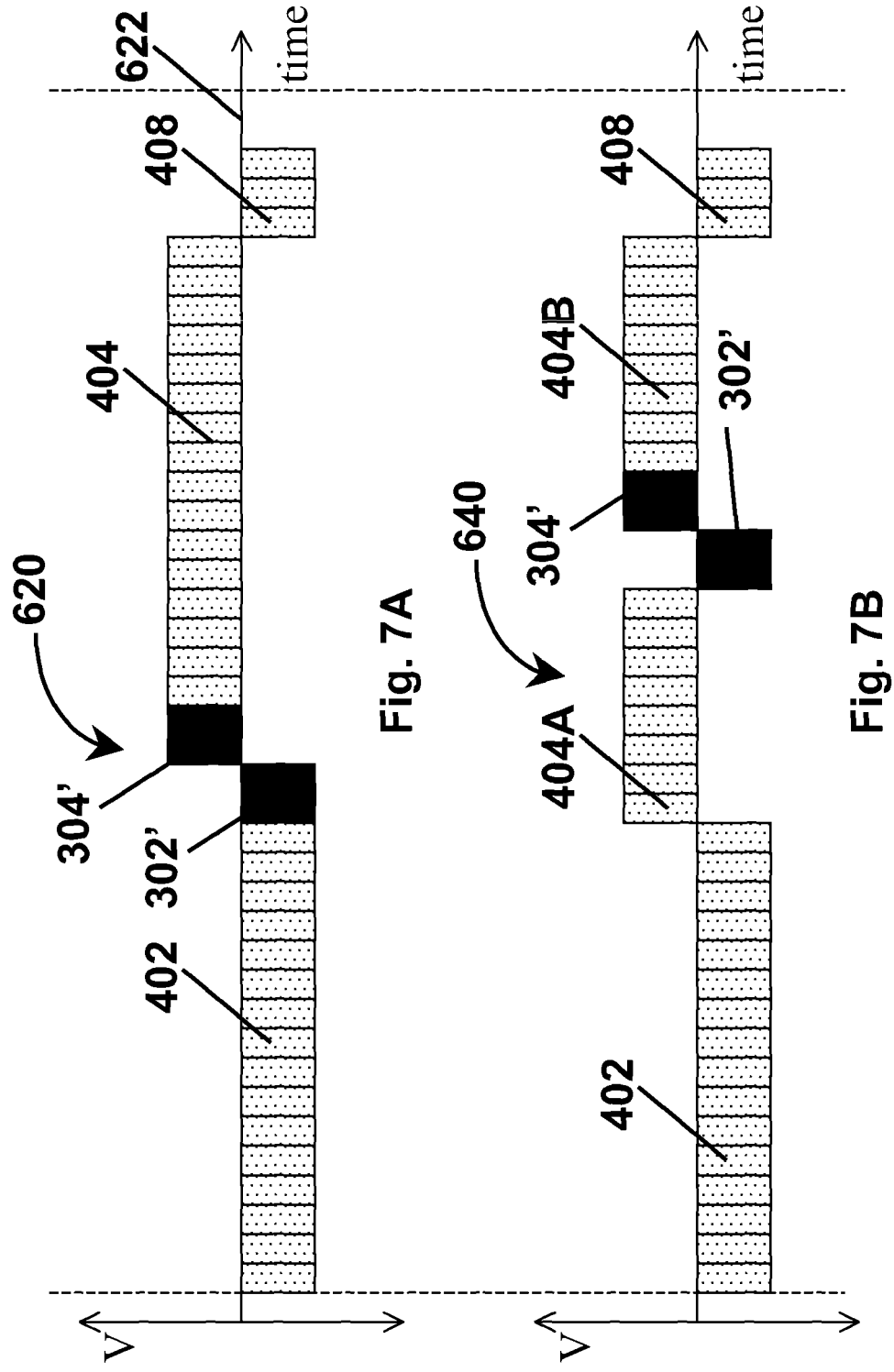

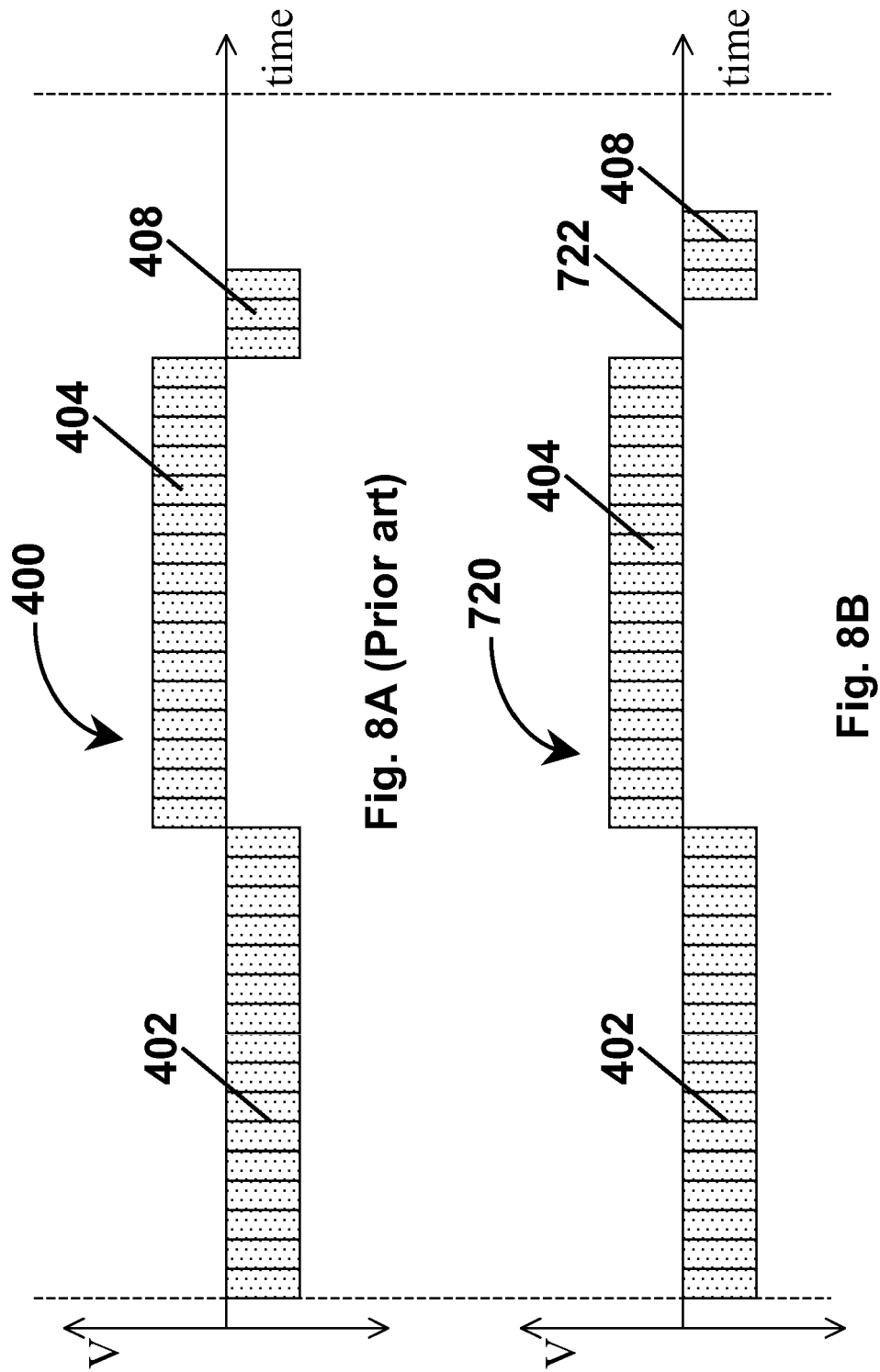

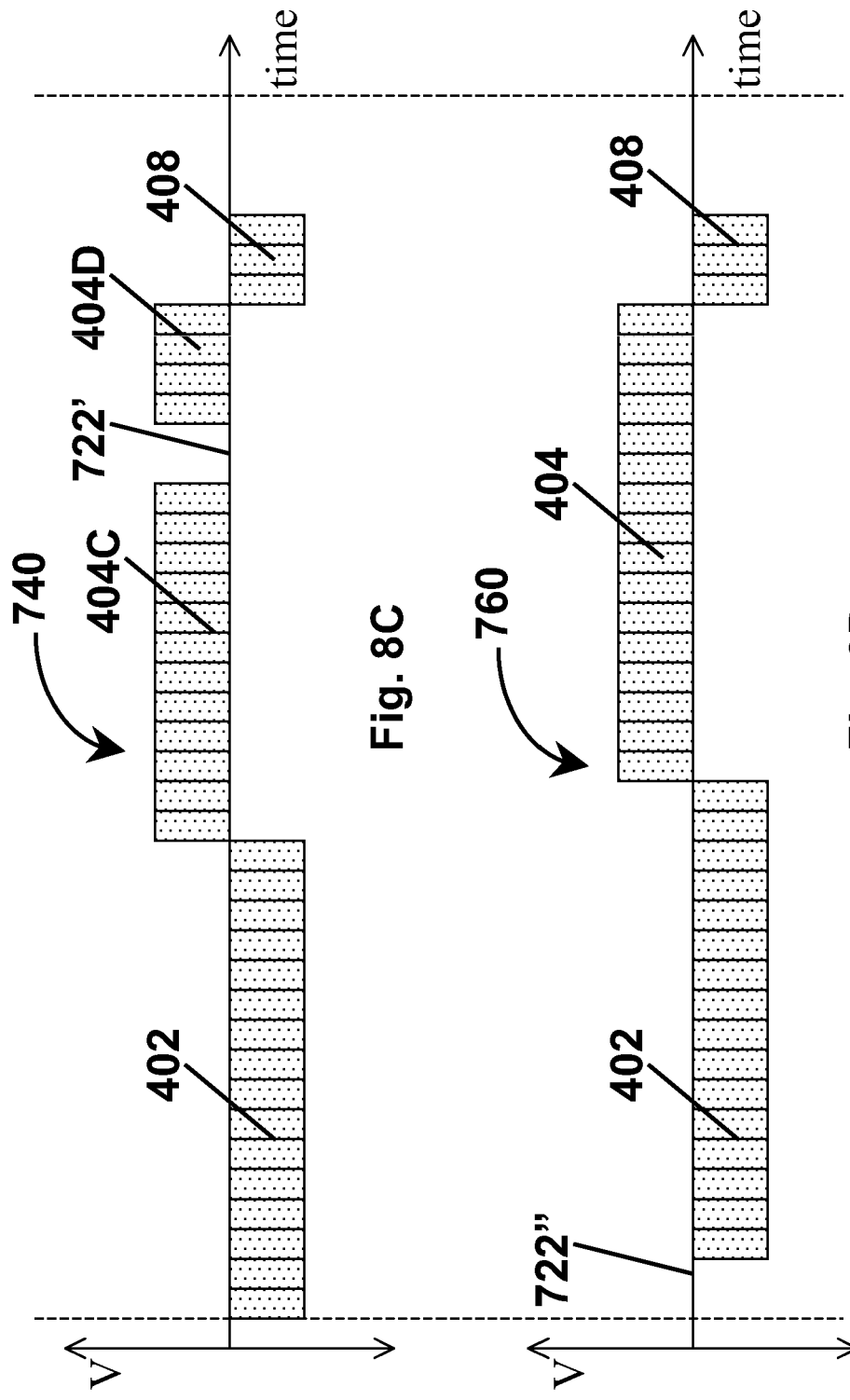

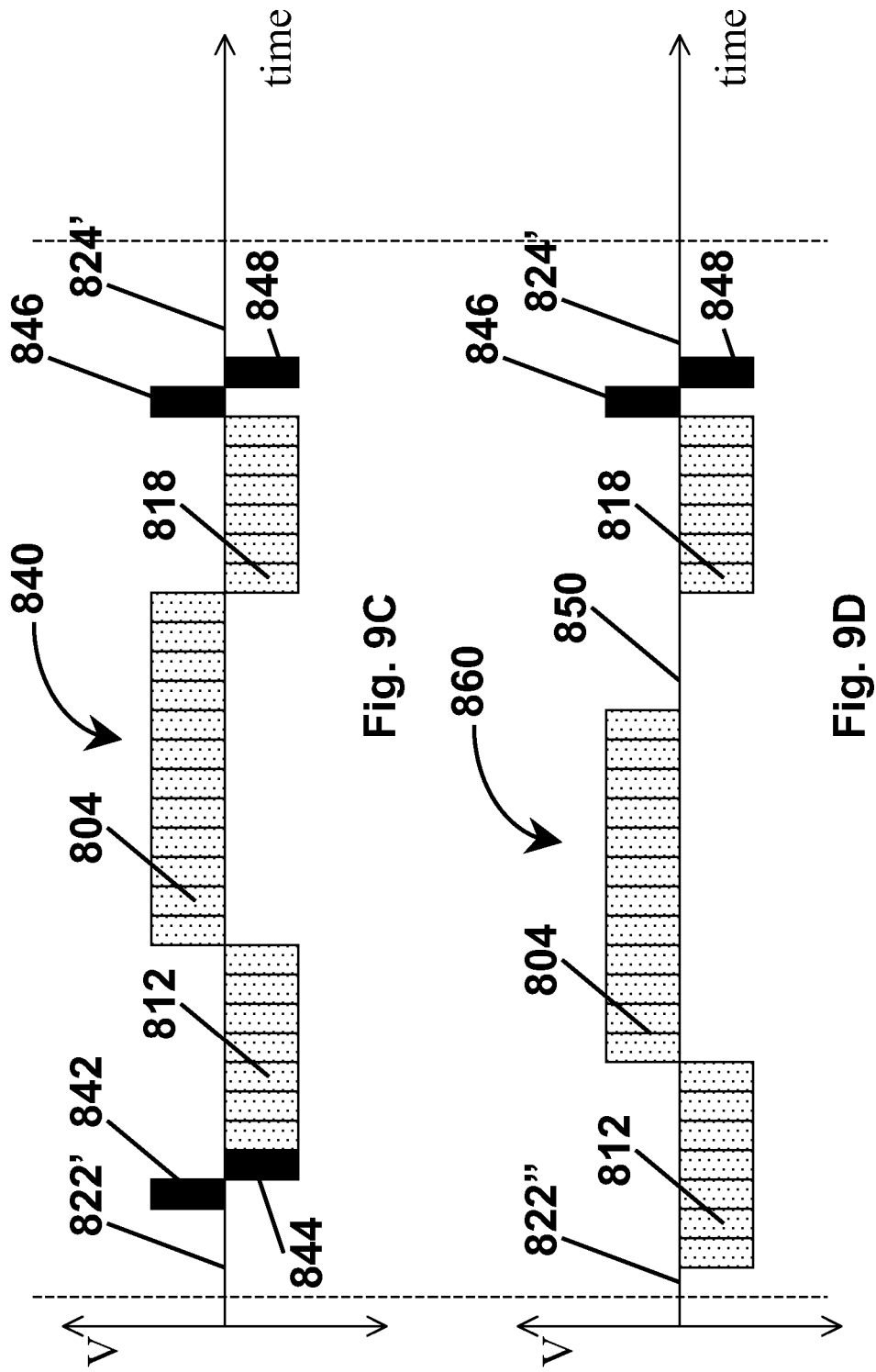

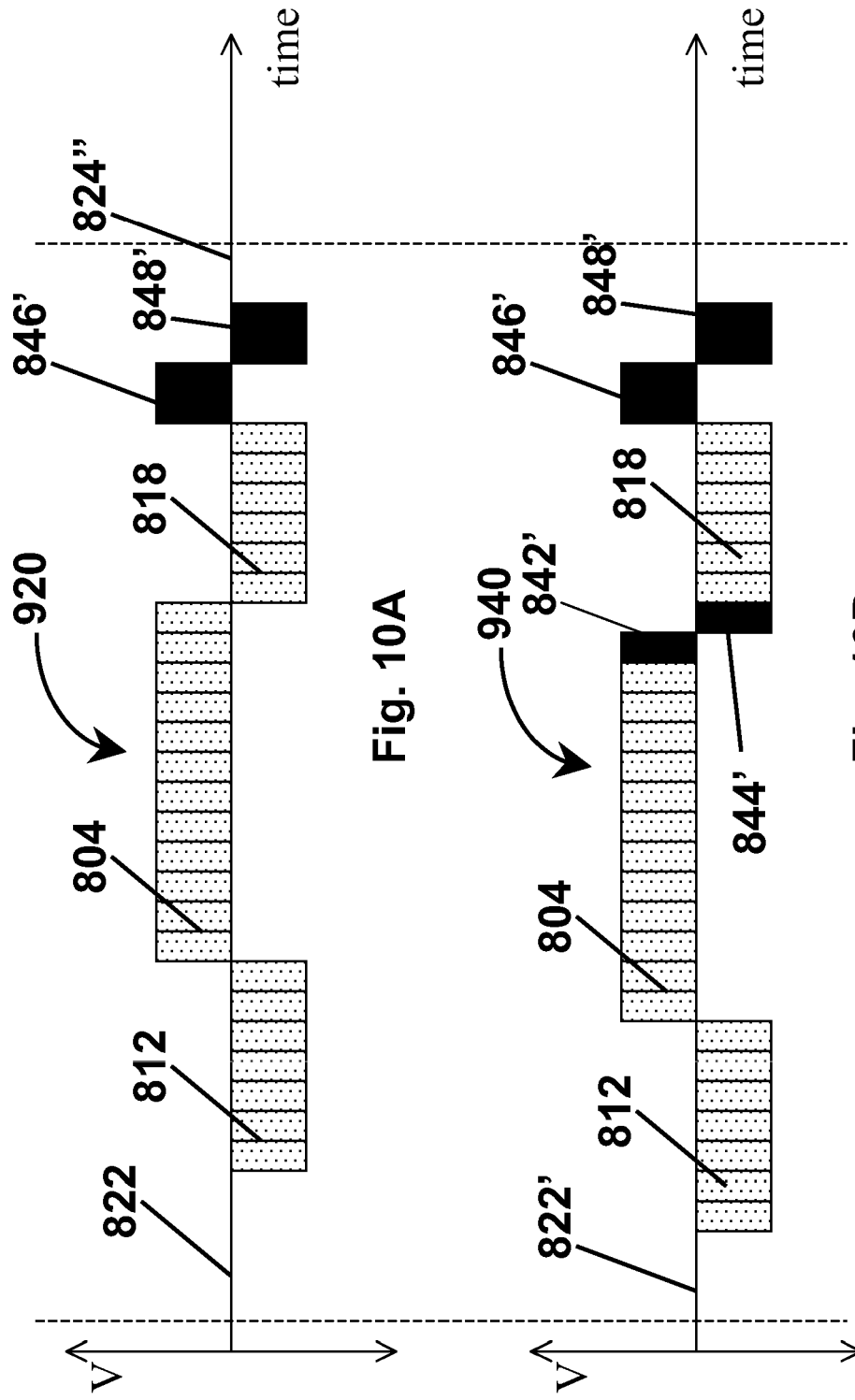

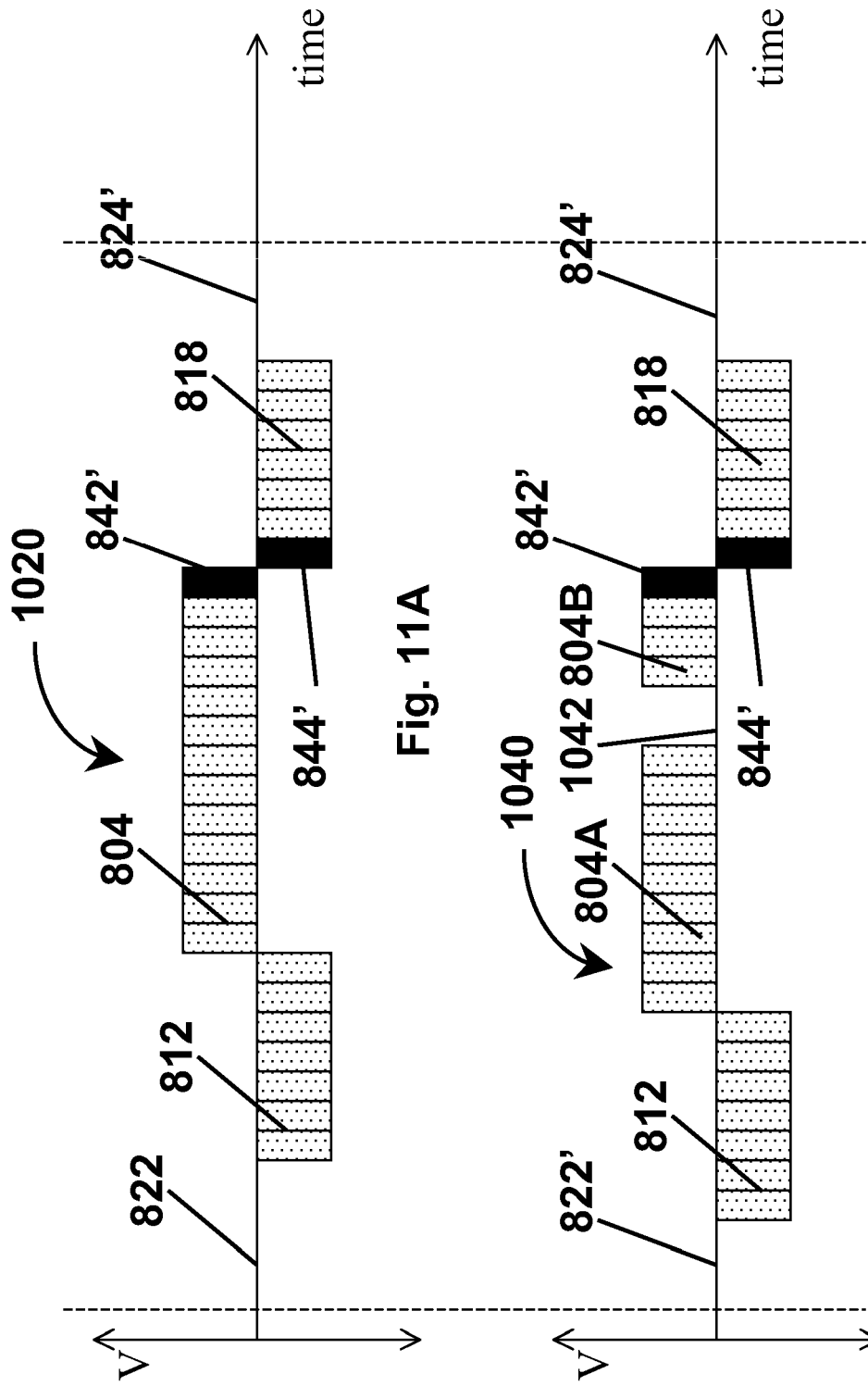

$$R_2 \rightarrow R_{1,m} \rightarrow \overline{R_{1,m}} \rightarrow R_1 \qquad \text{(Scheme 2)}$$

$$R_2 \rightarrow B \rightarrow W \rightarrow R_{1,m} \rightarrow \overline{R_{1,m}} \rightarrow R_1$$

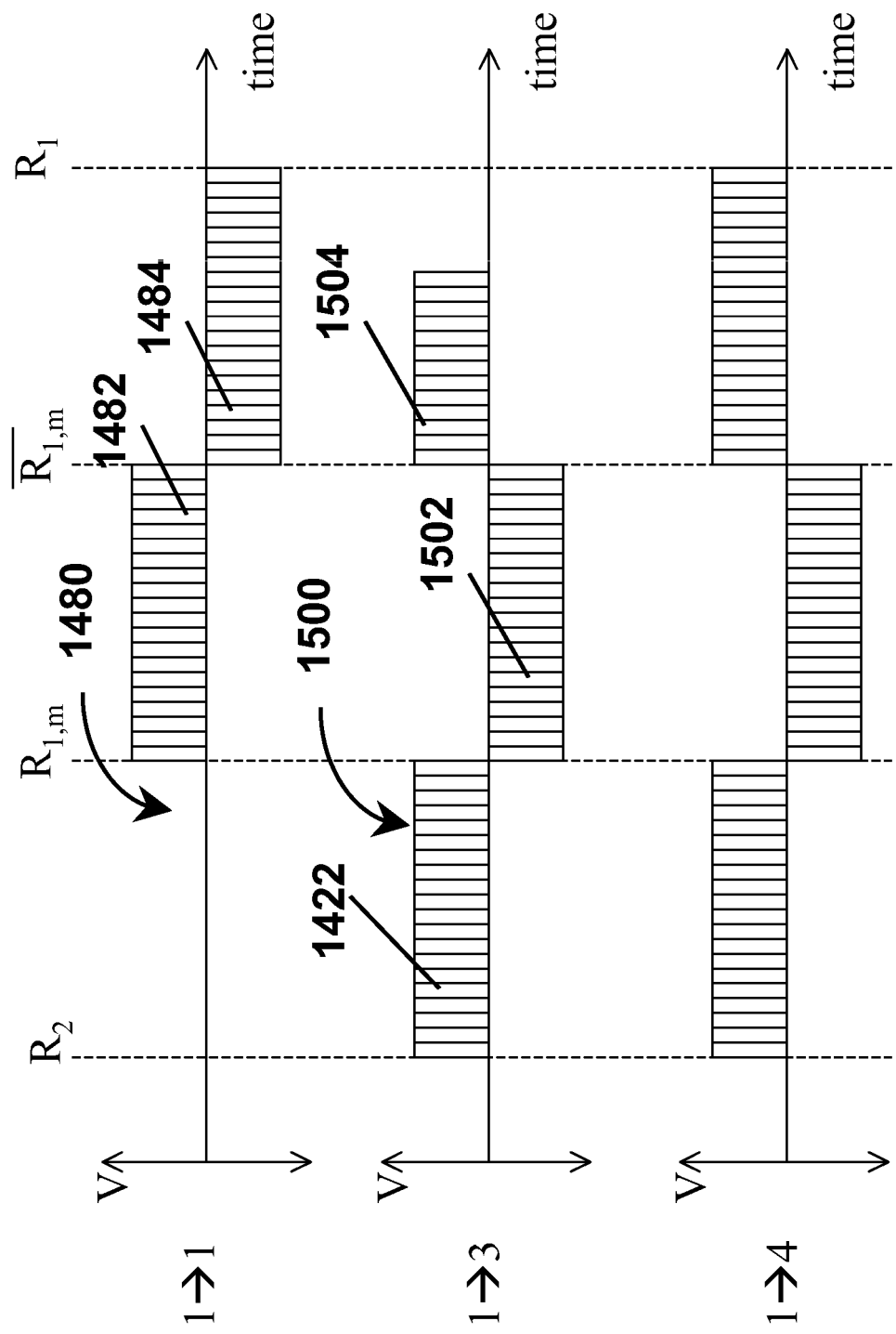

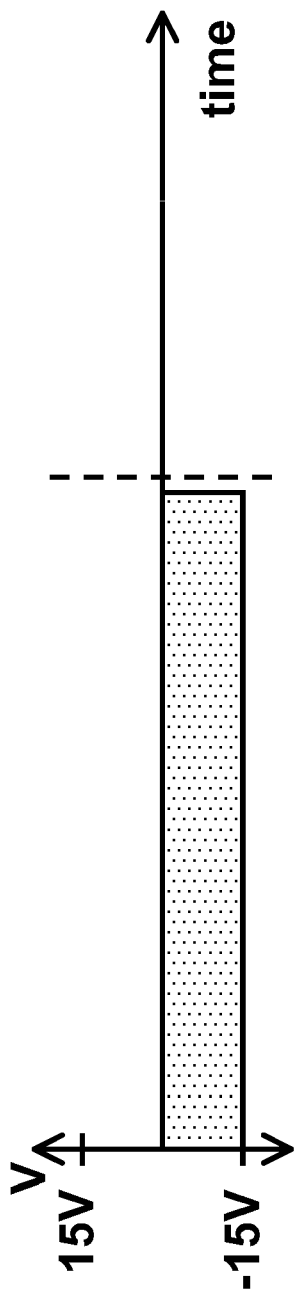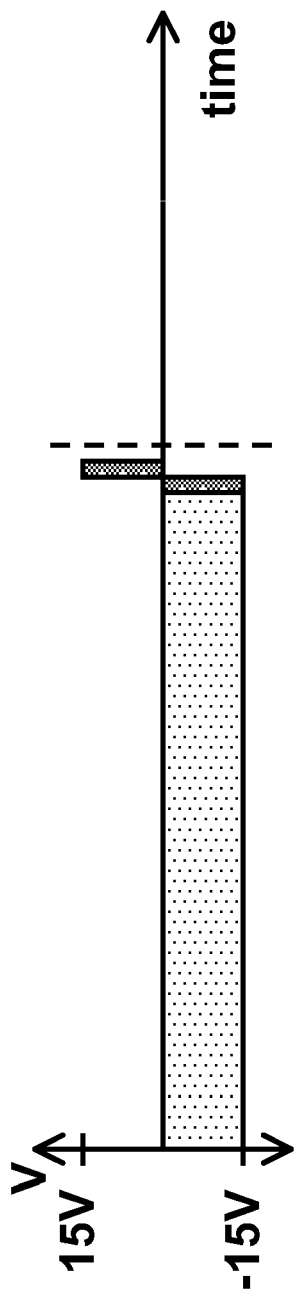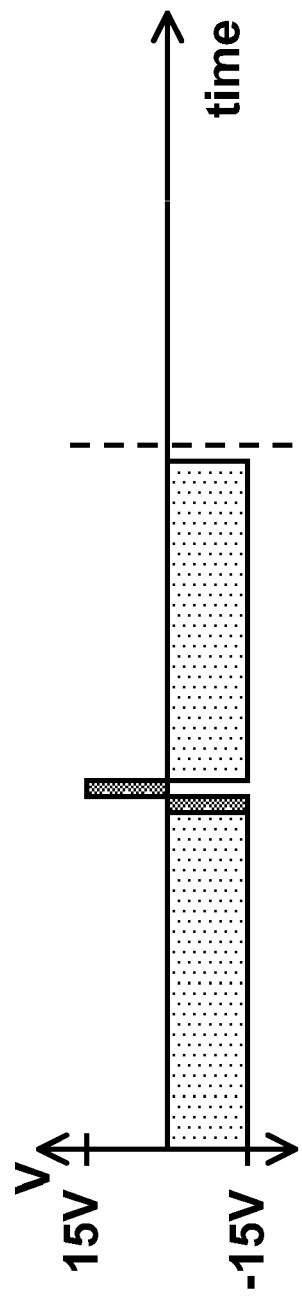

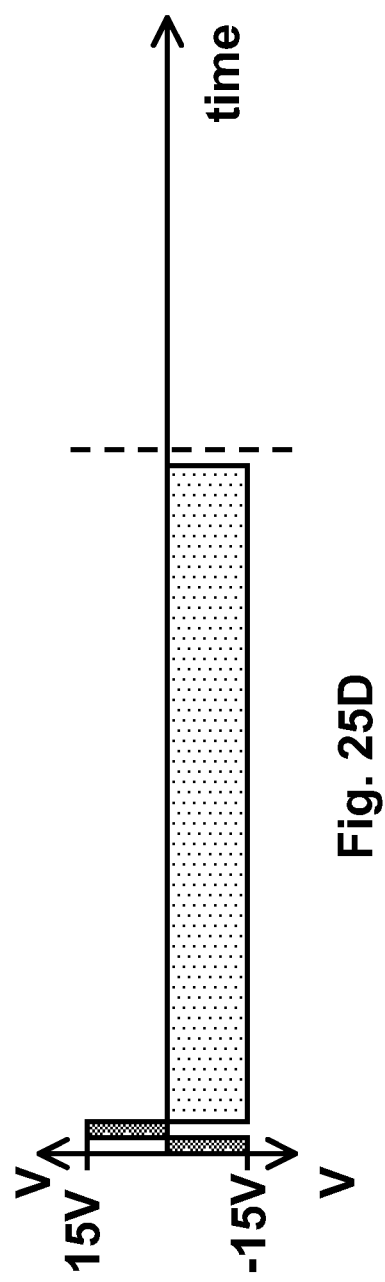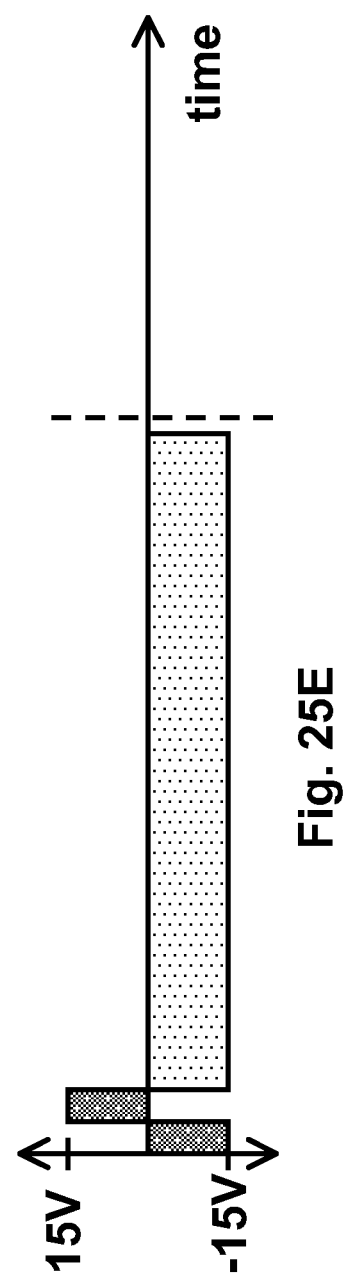

METHODS AND APPARATUS FOR DRIVING ELECTRO-OPTIC DISPLAYS

REFERENCE TO RELATED APPLICATIONS

This application is a division of copending application Ser. No. 13/086,066, filed Apr. 13, 2011 (Publication No. 2011/0187684), which itself is a division of application Ser. No. 11/161,715, filed Aug. 13, 2005 (Publication No. 2005/0280626) which claims benefit of the following provisional applications: (a) Application Ser. No. 60/601,242, filed Aug. 13, 2004; (b) Application Ser. No. 60/522,372, filed Sep. 21, 2004; and (c) Application Ser. No. 60/522,393, filed Sep. 24, 2004.

The aforementioned copending application Ser. No. 11/161,715 is also a continuation-in-part of application Ser. No. 10/904,707, filed Nov. 24, 2004 (Publication No. 2005/0179642), which itself claims benefit of provisional Application Ser. Nos. 60/481,711 and 60/481,713, both filed Nov. 26, 2003.

The aforementioned application Ser. No. 10/904,707 is a continuation-in-part of application Ser. No. 10/879,335, filed Jun. 29, 2004 (Publication No. 2005/0024353, now U.S. Pat. No. 7,528,822, issued May 5, 2009), which claims benefit of the following provisional applications: Ser. No. 60/481,040, filed Jun. 30, 2003; Ser. No. 60/481,053, filed Jul. 2, 2003; and Ser. No. 60/481,405, filed Sep. 23, 2003.

The aforementioned application Ser. No. 10/879,335 is also a continuation-in-part of application Ser. No. 10/814,205, filed Mar. 31, 2004 (Publication No. 2005/0001812, now U.S. Pat. No. 7,119,772, issued Oct. 10, 2006), which claims benefit of the following provisional applications: Ser. No. 60/320,070, filed Mar. 31, 2003; Ser. No. 60/320,207, filed May 5, 2003; Ser. No. 60/481,669, filed Nov. 19, 2003; Ser. No. 60/481,675, filed Nov. 20, 2003; and Ser. No. 60/557,094, filed Mar. 26, 2004.

The aforementioned application Ser. No. 10/814,205 is related to application Ser. No. 10/249,973, filed May 23, 2003 (Publication No. 2005/0270261, now U.S. Pat. No. 7,193,625, issued Mar. 20, 2007), which claims benefit of provisional Application Ser. Nos. 60/319,315, filed Jun. 13, 2002 and Ser. No. 60/319,321, filed Jun. 18, 2002.

The aforementioned application Ser. No. 10/249,973 is also a continuation-in-part of application Ser. No. 10/065,795, filed Nov. 20, 2002 (Publication No. 2003/0137521, now U.S. Pat. No. 7,012,600, Mar. 14, 2006), which itself claims benefit of the following provisional applications: Ser. No. 60/319,007, filed Nov. 20, 2001; Ser. No. 60/319,010, filed Nov. 21, 2001; Ser. No. 60/319,034, filed Dec. 18, 2001; Ser. No. 60/319,037, filed Dec. 20, 2001; and Ser. No. 60/319,040, filed Dec. 21, 2001.

This application is also related to copending application Ser. No. 10/063,236, filed Apr. 2, 2002 (Publication No. 2002/0180687, now U.S. Pat. No. 7,170,670); application Ser. No. 10/064,279, filed Jun. 28, 2002 (now U.S. Pat. No. 6,657,772); application Ser. No. 10/064,389, filed Jul. 9, 2002 (Publication No. 2003/0025855, now U.S. Pat. No. 6,831,769); and application Ser. No. 10/249,957, filed May 22, 2003 (Publication No. 2004/0027327, now U.S. Pat. No. 6,982,178).

The aforementioned application Ser. Nos. 10/904,707; 10/879,335; 10/814,205; 10/249,973; and 10/065,795 may hereinafter for convenience collectively be referred to as the "MEDEOD" (MEthods for Driving Electro-Optic Displays) applications.

The entire contents of these copending applications, and of all other U.S. patents and published and copending applications mentioned below, are herein incorporated by reference.

BACKGROUND OF INVENTION

This invention relates to methods for driving electro-optic displays, especially bistable electro-optic displays, and to apparatus (controllers) for use in such methods. More specifically, this invention relates to driving methods which are intended to enable more accurate control of gray states of the pixels of an electro-optic display. This invention also relates to driving methods which are intended to enable such displays to be driven in a manner which allows compensation for the "dwell time" during which a pixel has remained in a particular optical state prior to a transition, while still allowing the drive scheme used to drive the display to be DC balanced. This invention is especially, but not exclusively, intended for use with particle-based electrophoretic displays in which one or more types of electrically charged particles are suspended in a liquid and are moved through the liquid under the influence of an electric field to change the appearance of the display.

The electro-optic displays in which the methods of the present invention are used often contain an electro-optic material which is a solid in the sense that the electro-optic material has solid external surfaces, although the material may, and often does, have internal liquid- or gas-filled space. Such displays using solid electro-optic materials may hereinafter for convenience be referred to as "solid electro-optic displays".

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all. The term "gray level" is used herein to denote the possible optical states of a pixel, including the two extreme optical states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically, as illustrated below, such a waveform will comprise a plurality of waveform elements; where these elements are essentially rectangular (i.e., there a given element comprises application of a constant voltage for a period of time), the elements may be called "voltage pulses" or "drive pulses". The term "drive scheme" denotes a set of waveforms sufficient to effect all possible transitions between gray levels for a specific display.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a fluid, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; and 6,922,276; and U.S. Patent Applications Publication Nos. 2002/0060321; 2002/0063661; 2002/0090980; 2002/0113770; 2002/0130832; 2002/0180687; 2003/0011560; 2003/0020844; 2003/0025855; 2003/0102858; 2003/0132908; 2003/0137521; 2003/0214695; 2003/0222315; 2004/0012839; 2004/0014265; 2004/0027327; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0252360; 2004/0257635; 2004/0263947; 2005/0000813; 2005/0001812; 2005/0007336;

2005/0007653; 2005/0012980; 2005/0017944; 2005/0018273; 2005/0024353; 2005/0035941; 2005/0041004; 2005/0062714; 2005/0067656; 2005/0078099; 2005/0105159; 2005/0122284; 2005/0122306; 2005/0122563; 2005/0122564; 2005/0122565; 2005/0151709; and 2005/0152022; and International Applications Publication Nos. WO 99/67678; WO 00/05704; WO 00/38000; WO 00/36560; WO 00/67110; WO 00/67327; WO 01/07961; and WO 03/107,315.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Other types of electro-optic media may also be used in the displays of the present invention.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required that longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R_0)^{1/3} - 16,$$

where R is the reflectance and R0 is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned 2003/0137521, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Almost all electro-optic medium have a built-in resetting (error limiting) mechanism, namely their extreme (typically black and white) optical states, which function as "optical rails". After a specific impulse has been applied to a pixel of an electro-optic display, that pixel cannot get any whiter (or blacker). For example, in an encapsulated electrophoretic display, after a specific impulse has been applied, all the electrophoretic particles are forced against one another or against the capsule wall, and cannot move further, thus producing a limiting optical state or optical rail. Because there is a distribution of electrophoretic particle sizes and charges in such a medium, some particles hit the rails before others, creating a "soft rails" phenomenon, whereby the impulse precision required is reduced when the final optical state of a transition approaches the extreme black and white states, whereas the optical precision required increases dramatically in transitions ending near the middle of the optical range of the pixel.

Various types of drive schemes for electro-optic displays are known which take advantage of optical rails. For example, FIGS. 9 and 10 of the aforementioned 2003/0137521, and the related description at Paragraphs [0177] to [0180], describe a "slide show" drive scheme in which the entire display is driven to at least one optical rail before any new image is written. Obviously, a pure general grayscale image flow drive scheme cannot rely upon using the optical rails to prevent errors in gray levels since in such a drive scheme any given pixel can undergo an infinitely large number of changes in gray level without ever touching either optical rail.

Before proceeding further, it is desirable to define slide-show drive schemes more precisely. The fundamental slide-show drive scheme is that a transition from an initial optical state (gray level) to a final (desired) optical state (gray level) is achieved by making transitions to a finite number of intermediate states, where the minimum number of intermediate states is one. Preferably, the intermediate states are at or near the extreme states of the electro-optic medium used. The transitions will differ from pixel to pixel in a display, because they depend upon the initial and final optical states. The waveform for a specific transition for a given pixel of a display may be expressed as:

$$R_2 \Rightarrow goal_1 \Rightarrow goal_2 \Rightarrow \ldots \Rightarrow goal_n \Rightarrow R_1 \quad \text{(Scheme 1)}$$

where there is at least one intermediate or goal state between the initial state $R_2$ and the final state $R_1$. The goal states are, in general, functions of the initial and final optical states. The presently preferred number of intermediate states is two, but more or fewer intermediate states may be used. Each of the individual transitions within the overall transition is achieved using a waveform element (typically a voltage pulse) sufficient to drive the pixel from one state of the sequence to the next state. For example, in the waveform indicated symbolically above, the transition from $R_2$ to $goal_1$ is typically achieved with a waveform element or voltage pulse. This waveform element may be of a single voltage for a finite time (i.e., a single voltage pulse), or may include a variety of voltages so that a precise $goal_1$ state is achieved. This waveform element is followed by a second waveform element to achieve the transition from $goal_1$ to $goal_2$. If only two goal states are used, the second waveform element is followed by a third waveform element that drives the pixel from the $goal_2$ state to the final optical state $R_1$. The goal states may be independent of both $R_2$ and $R_1$, or may depend upon one or both.

This invention seeks to provide improved slide show drive schemes for electro-optic displays which achieve improved control of gray levels. This invention is particularly, although not exclusively, intended for use in pulse width modulated drive schemes in which the voltage applied to any given pixel of a display at any given moment can only be −V, 0 or +V, where V is an arbitrary voltage. More specifically, this invention relates to two distinct types of improvements in slide show drive schemes, namely (a) insertion of certain modifying elements into base waveforms for such a drive scheme; and (b) arranging the drive scheme so that at least certain gray levels are approached from the optical rail further from the desired gray level.

In another aspect, this invention relates to dwell time compensation in drive schemes for electro-optic displays. As discussed in the MEDEOD applications, it has been found, at least in the case of many particle-based electro-optic displays, that the impulses necessary to change a given pixel through equal changes in gray level (as judged by eye or by standard optical instruments) are not necessarily constant, nor are they necessarily commutative. For example, consider a display in which each pixel can display gray levels of 0 (white), 1, 2 or 3 (black), beneficially spaced apart. (The spacing between the levels may be linear in percentage reflectance, as measured by eye or by instruments but other spacings may also be used. For example, the spacings may be linear in L* or may be selected to provide a specific gamma; a gamma of 2.2 is often adopted for monitors, and when electro-optic displays are be used as a replacement for monitors, use of a similar gamma may be desirable.) It has been found that the impulse necessary to change the pixel from level 0 to level 1 (hereinafter for convenience referred to as a "0-1 transition") is often not the same as that required for a 1-2 or 2-3 transition. Furthermore, the impulse needed for a 1-0 transition is not necessarily the same as the reverse of that needed for a 0-1 transition. In addition, some systems appear to display a "memory" effect, such that the impulse needed for (say) a 0-1 transition varies somewhat depending upon whether a particular pixel undergoes 0-0-1, 1-0-1 or 3-0-1 transitions. (Where, the notation "x-y-z", where x, y, and z are all optical states 0, 1, 2 or 3 denotes a sequence of optical states visited sequentially in time.) Although these problems can be reduced or overcome by driving all pixels of the display to one of the extreme states for a substantial period before driving the required pixels to other states, the resultant "flash" of solid color is often unacceptable; for example, a reader of an electronic book may desire the text of the book to scroll down the screen, and may be distracted, or lose his place, if the display is required to flash solid black or white at frequent intervals. Furthermore, such flashing of the display increases its energy consumption and may reduce the working lifetime of the display. Finally, it has been found that, at least in some cases, the impulse required for a particular transition is affected by the temperature and the total operating time of the display, and that compensating for these factors is desirable to secure accurate gray scale rendition.

As briefly mentioned above, it has been found that, at least in some cases, the impulse necessary for a given transition in a bistable electro-optic display varies with the residence time of a pixel in its optical state, this phenomenon hereinafter being referred to as "dwell time dependence" or "DTD", although the term "dwell time sensitivity" was used in the aforementioned Application Ser. No. 60/320,070. Thus, it may be desirable or even in some cases in practice necessary, to vary the impulse applied for a given transition as a function of the dwell time of the pixel in its initial optical state.

The phenomenon of dwell time dependence will now be explained in more detail with reference to FIG. 1 of the accompanying drawings, which shows the reflectance of a pixel a function of time for a sequence of transitions denoted $R_3 \rightarrow R_2 \rightarrow R_1$, where (generalizing the nomenclature used above) each of the $R_k$ terms indicates a gray level in a sequence of gray levels, with R's with larger indices occurring before R's with smaller indices. The transitions between $R_3$ and $R_2$ and between $R_2$ and $R_1$ are also indicated. DTD is the variation of the final optical state $R_1$ caused by variation in the time spent in the optical state $R_2$, referred to as the dwell time. One can compensate for DTD by choosing different waveforms for different dwell times or different ranges of dwell times in the previous optical state. This method of compensation is called "dwell-time compensation," "DTC", or simply "time compensation".

However, such DTC may conflict with other desirable properties of drive schemes. In particular, for reasons discussed in detail in the MEDEOD applications, with many electro-optic displays it is highly desirable to ensure that the drive scheme used is direct current (DC) balanced, in the sense that, for any arbitrary series of transitions beginning and ending in the same optical state, the applied impulse (i.e., the integral of the applied voltage with respect to time) is zero. This guarantees that the net impulse (also called "DC imbalance") experienced by any pixel of the display is bounded by a known value regardless of the exact series of transitions undergone by that pixel. For example, a 15 V, 300 msec pulse may be used to drive a pixel from a white to a black state. After this transition, the pixel has experienced 4.5 V sec of DC imbalance impulse. If a −15 V, 300 msec pulse is used to drive the pixel back to white, then the pixel is DC balanced for the overall excursion from white to black and back to white. This DC balance should hold for all possible excursions from one original optical state, to a series of optical states the same as or different from the original optical state, then back to the original optical state.

A drive scheme can be dwell-time-compensated by adding or removing voltage features to or from a base drive scheme. For example, one might begin with a drive scheme for a two optical state (black and white) display, the drive scheme including the following four waveforms:

TABLE 1

| Transition | Waveform |
| --- | --- |
| black to black | 0 V for 420 msec |
| black to white | −15 V for 400 msec, then 0 V for 20 msec |
| white to black | +15 V for 400 msec, then 0 V for 20 msec |
| white to white | 0 V for 420 msec |

This drive scheme is DC balanced, because any series of transitions that brings a pixel back to its initial optical state is DC balanced, that is, the net area under the voltage profile for the entire series of transitions is zero.

Optical errors can arise from DTD of a display. For example, a pixel may can start in the white state, drive to the black state, dwell for a time, and then drive back to the white state. The final white state reflectance is a function of the time spent in the black state.

It is desirable to have a very small DTD. If this is not possible for a specific electro-optic display, it is desirable to compensate for DTD, in accordance with one aspect of the present invention, by selecting different waveforms for different ranges of dwell times in the prior optical state. For example, one may find that the final white state in the example just given is brighter after short dwell times in the previous black state than after long dwell times in the previous black state. One dwell-time-compensation scheme would be to modify the duration of the pulse that brings the pixel layer from black to white to counteract this DTD of the final optical state. For example, one could shorten the pulse length in the black-to-white transition when the dwell time in the previous black state is short, and keep the pulse longer for long dwell times in the previous black state. This tends to produce a darker white state for shorter prior-state dwell times, which counteracts the effects of DTD. For example, one could choose a black-to-white waveform that varies with dwell time in the black state according to Table 2 below.

TABLE 2

| Dwell time | Waveform |
| --- | --- |
| 0 to 0.3 sec | −15 V for 280 msec, 0 V for 140 msec |
| 0.3 sec to 1 sec | −15 V for 340 msec, 0 V for 80 msec |
| 1 sec to 3 sec | −15 V for 380 msec, 0 V for 40 msec |
| 3 sec or greater | −15 V for 400 msec, 0 V for 20 msec |

The problem with this approach to DTC of a drive scheme is that the drive scheme as a whole is no longer DC balanced. Because the impulse for a black-to-white transition is a function of the time spent in the black state, and similarly the impulse for a white-to-black transition may be a function of the dwell time in the white state, the net impulse over a black-to-white-to-black sequence is, in general, not DC balanced. For example, suppose this sequence is carried out with a black-to-white transition after a short dwell time in black using a voltage pulse of −15 V for 280 msec=−4.2 V sec impulse, followed, after a long dwell in the white state, by a white-to-black transition using a voltage pulse of 15 V for 400 msec, for an impulse of 6 V sec. The net impulse in this sequence (black-white-black loop) is −4.2 V sec+6 V sec=1.8 V sec. Repeating this loop causes a build-up of DC imbalance, which can be detrimental to the performance of the display.

Thus, this aspect of the present invention provides a method for dwell time compensation of a DC balanced waveform or drive scheme that preserves the DC balance of the waveform or drive scheme.

Another aspect of the present invention relates to methods and apparatus for driving electro-optic displays which permits rapid response to user input. The aforementioned MEDEOD applications describe several methods and controllers for driving electro-optic displays. Most of these methods and controllers make use of a memory having two image buffers, the first of which stores a first or initial image (present on the display at the beginning of a transition or rewriting of the display) and the second of which stores a final image, which it desired to place upon the display after the rewrite. The controller compares the initial and final images and, if they differ, applies to the various pixels of the display driving voltages which cause the pixels to undergo changes in optical state such that at the end of the rewrite (alternatively called an update) the final image is formed on the display.

However, in most of the aforementioned methods and controllers, the updating operation is "atomic" in the sense that once an update is started, the memory cannot accept any new image data until the update is complete. This causes difficulties when it is desired to use the display for applications that accept user input, for example via a keyboard or similar data input device, since the controller is not responsive to user input while an update is being effected. For electrophoretic media, in which the transition between the two extreme optical states may take several hundred milliseconds, this unresponsive period may vary from about 800 to about 1800 milliseconds, the majority of this period be attributable to the update cycle required by the electro-optic material. Although the duration of the unresponsive period may be reduced by removing some of the performance artefacts that increase update time, and by improving the speed of response of the electro-optic material, it is unlikely that such techniques alone will reduce the unresponsive period below about 500 milliseconds. This is still longer than is desirable for interactive applications, such example an electronic dictionary, where the user expects rapid response to user input. Accordingly, there is a need for an image updating method and controller with a reduced unresponsive period.

This aspect of the present invention makes use of the known concept of asynchronous image updating to reduce substantially the duration of the unresponsive period. It is known to use structures already developed for gray scale image displays to reduce the unresponsive period by up to 65 percent, as compared with prior art methods and controllers, with only modest increases in the complexity and memory requirements of the controller.

Finally, this invention relates to a method and apparatus for driving an electro-optic display in which the data used to define the drive scheme is compressed in a specific manner. The aforementioned MEDEOD applications describe methods and apparatus for driving electro-optic displays in which the data defining the drive scheme (or plurality of drive schemes) used are stored in one or more look-up tables ("LUT's"). Such LUT's must of course contain data defining the waveform for each waveform of the or each drive scheme, and a single waveform will typically require multiple bytes. As described in the MEDEOD applications, the LUT may have to take account of more than two optical states, together with adjustments for such factors as temperature, humidity, operating time of the medium etc. Thus, the amount of memory necessary for holding the waveform information can be substantial. It is desirable to reduce the amount of memory allocated to waveform information in order to reduce the cost of the display controller. A simple compression scheme that can be realistically accommodated in a display controller or host computer would be helpful in reducing the display controller cost. This invention relates to a simple compression scheme that appears particularly advantageous for electro-optic displays.

SUMMARY OF INVENTION

Accordingly, in one aspect this invention provides a method for driving an electro-optic display having at least one pixel capable of achieving at least three different gray levels including two extreme optical states. The method comprises applying to the pixel a base waveform comprising at least one reset pulse sufficient to drive the pixel to or close to one of the extreme optical states followed by at least one set pulse sufficient to drive the pixel to a gray level different from said one extreme optical state. The base waveform is, however, modified by at least one of the following:
 (a) insertion of at least one balanced pulse pair into the base waveform;
 (b) excision of at least one balanced pulse pair from the base waveform; and
 (c) insertion of at least one period of zero voltage into the base waveform, where "balanced pulse pair" denotes a sequence of two pulses of opposite polarity such that the total impulse of the balanced pulse pair is essentially zero.

Hereinafter, for convenience, this method of the present invention may be referred to as the "balanced pulse pair slide show" or "BPPSS" method of the invention. When such a method includes modification of the base waveform by insertion or excision of at least one balanced pulse pair ("BPP") the two pulses of the balanced pulse pair may each be of constant voltage but of opposite polarity and be equal in length. When the modification of the base waveform includes excision of at least one BPP, the period in the base waveform occupied by the or each excised BPP may be replaced by a period of zero voltage; alternatively, other elements of the base waveform may be shifted in time to occupy the period formerly occupied by the or each excised BPP, and a period of zero voltage may be inserted at a point in time different from that occupied by the or each excised BPP.

In a preferred form of the BPPSS method of the present invention, the base waveform comprises, in succession, a first reset pulse sufficient to drive the pixel to or close to one of its extreme optical states, a second reset pulse sufficient to drive the pixel to or close to its other extreme optical state, and the at least one set pulse.

The BPPSS method may be carried out using drive circuitry capable of voltage modulation, pulse width modulation or both. However, it is found especially useful with tri-level drive schemes in which there is applied to the pixel at any point in time, a voltage of 0, +V or −V, where V is a predetermined drive voltage.

For reasons explained in detail below, in the BPPSS method, it is desirable to limit the total number of modifications to the base waveform (i.e., the total number of inserted or excised balanced pulse pairs and inserted periods of zero voltage). In general, this total number of modifications will not exceed six, desirably will not exceed four and preferably will not exceed two.

As discussed in the aforementioned MEDEOD applications, and as discussed below, it is desirable that the BPPSS method of the present invention be DC balanced, and, as far as possible, it is also desirable that each individual waveform of the drive scheme used be DC balanced.

The BPPSS method of the present invention may be used with any of the types of electro-optic display discussed above. Thus, for example, the display may comprise a rotating bichromal member or electrochromic medium. Alternatively, the display may comprise an electrophoretic electro-optic medium comprising a plurality of electrically charged particles in a fluid and capable of moving through the fluid on application of an electric field to the fluid. In this type of display, the fluid may be gaseous or liquid. The charged particles and the fluid may be confined within a plurality of capsules or microcells.

The present invention extends to a display controller, application specific integrated circuit or software code arranged to carry out the BPPSS method of the invention.

In another aspect, this invention provides a method for driving an electro-optic display having a plurality of pixels each capable of achieving at least four different gray levels including two extreme optical states, the method comprising applying to each pixel a waveform comprising a reset pulse sufficient to drive the pixel to or close to one of its extreme optical states followed by a set pulse sufficient to drive the pixel to a final gray level different from said one extreme optical state, wherein the reset pulses are chosen such that the image on the display immediately prior to the set pulses is substantially an inverse monochrome projection of the final image following the set pulses.

Hereinafter, for convenience, this method of the present invention may be referred to as the "inverse monochrome projection" or "IMP" method of the invention. As explained in more detail below, a monochrome projection of a gray scale image is a projection in which all pixels in the gray scale image which are in one extreme optical state or in gray states closer to that one extreme optical state than a predetermined threshold (for example, white and light gray pixels) are changed to that extreme optical state (for example, white) or to a state close thereto, while pixels in the opposed extreme optical state or in gray states closer to this opposed extreme optical state than the threshold (for example, black and dark gray) are changed to the opposed extreme optical state (for example, black) or a state close thereto. An inverse monochrome projection is the reverse of a monochrome projection.

In a preferred form of the IMP method of the present invention, there is applied to each pixel a waveform comprising a first reset pulse sufficient to drive each pixel to or close to one of its extreme optical states, a second reset pulse sufficient to drive each pixel to or close to the other of its extreme optical states, and the set pulse, and the first reset pulses are chosen so that the image on the display immediately prior to the second reset pulse is substantially a monochrome projection of the final image following the set pulses.

In the IMP method, the waveform may be modified by:
 (a) insertion of at least one balanced pulse pair into the waveform;
 (b) excision of at least one balanced pulse pair from the waveform; and
 (c) insertion of at least one period of zero voltage into the waveform, where "balanced pulse pair" is as defined above. In such a modified waveform, the two pulses of the balanced pulse pair may each be of constant voltage but of opposite polarity and be equal in length. When the modification of the base waveform includes excision of at least one BPP, the period in the base waveform occupied by the or each excised BPP may be replaced by a period of zero voltage; alternatively, other elements of the base waveform may be shifted in time to occupy the period formerly occupied by the or each excised BPP, and a period of zero voltage may be inserted at a point in time different from that occupied by the or each excised BPP.

As with the BPPSS method, the IMP method of the present invention may be carried out using drive circuitry capable of voltage modulation, pulse width modulation or both. However, the IMP method is found especially useful with tri-level drive schemes in which there is applied to the pixel at any point in time, a voltage of 0, +V or −V, where V is a predetermined drive voltage. Also, as with the BPPSS method, the IMP method may be used with any of the types of electro-optic display discussed above. Thus, for example, the display may comprise a rotating bichromal member or electrochromic medium. Alternatively, the display may comprise an electrophoretic electro-optic medium comprising a plurality of electrically charged particles in a fluid and capable of moving through the fluid on application of an electric field to the fluid. In this type of display, the fluid may be gaseous or liquid. The charged particles and the fluid may be confined within a plurality of capsules or microcells.

The present invention extends to a display controller, application specific integrated circuit or software code arranged to carry out the IMP method of the invention.

In another aspect, this invention provides a method for driving an electro-optic display having at least one pixel capable of achieving at least two different gray levels, wherein at least two different waveforms are used for the same transition between specific gray levels depending upon the duration of the dwell time of the pixel in the state from which the transition begins, these two waveforms differ from each other by at least one of the following:

(a) insertion of at least one balanced pulse pair;
(b) excision of at least one balanced pulse pair; and
(c) insertion of at least one period of zero voltage, where "balanced pulse pair" is as defined above.

Hereinafter, for convenience, this method of the present invention may be referred to as the "dwell time compensation balanced pulse pair" or "DTCBPP" method of the invention. In such a method, the overall drive scheme is very desirably DC balanced, and preferably all waveforms are themselves DC balanced. When such a method includes modification of the base waveform by insertion or excision of at least one BPP, the two pulses of the balanced pulse pair may each be of constant voltage but of opposite polarity and be equal in length. When the modification of the base waveform includes excision of at least one BPP, the period in the base waveform occupied by the or each excised BPP may be replaced by a period of zero voltage; alternatively, other elements of the base waveform may be shifted in time to occupy the period formerly occupied by the or each excised BPP, and a period of zero voltage may be inserted at a point in time different from that occupied by the or each excised BPP.

As with the BPPSS and IMP methods, the DTCBPP method of the present invention may be carried out using drive circuitry capable of voltage modulation, pulse width modulation or both. However, the DTCBPP method is found especially useful with tri-level drive schemes in which there is applied to the pixel at any point in time, a voltage of 0, +V or −V, where V is a predetermined drive voltage. For reasons explained in detail below, in the DTCBPP method, it is desirable to limit the total number of modifications to the base waveform (i.e., the total number of inserted or excised balanced pulse pairs and inserted periods of zero voltage). In general, this total number of modifications will not exceed six, desirably will not exceed four and preferably will not exceed two.

Also, as with the BPPSS and IMP methods, the DTCBPP method may be used with any of the types of electro-optic display discussed above. Thus, for example, the display may comprise a rotating bichromal member or electrochromic medium. Alternatively, the display may comprise an electrophoretic electro-optic medium comprising a plurality of electrically charged particles in a fluid and capable of moving through the fluid on application of an electric field to the fluid. In this type of display, the fluid may be gaseous or liquid. The charged particles and the fluid may be confined within a plurality of capsules or microcells.

The present invention extends to a display controller, application specific integrated circuit or software code arranged to carry out the DTCBPP method of the invention.

In another aspect, this invention provides two related methods for reducing the unresponsive period when an electro-optic display is being updated. The first of these methods is for use in driving an electro-optic display having a plurality of pixels, each of which is capable of achieving at least two different gray levels, the method comprising:

(a) providing a final data buffer arranged to receive data defining a desired final state of each pixel of the display;
(b) providing an initial data buffer arranged to store data defining an initial state of each pixel of the display;
(c) providing a target data buffer arranged to store data defining a target state of each pixel of the display;
(d) determining when the data in the initial and final data buffers differ, and when such a difference is found, updating the values in the target data buffer by (i) when the initial and final data buffers contain the same value for a specific pixel, setting the target data buffer to this value; (ii) when the initial data buffer contains a larger value for a specific pixel than the final data buffer, setting the target data buffer to the value of the initial data buffer plus an increment; and (iii) when the initial data buffer contains a smaller value for a specific pixel than the final data buffer, setting the target data buffer to the value of the initial data buffer minus said increment;
(e) updating the image on the display using the data in the initial data buffer and the target data buffer as the initial and final states of each pixel respectively;
(f) after step (e), copying the data from the target data buffer into the initial data buffer; and
(g) repeating steps (d) to (f) until the initial and final data buffers contain the same data.

The second of these two methods is for use in driving an electro-optic display having a plurality of pixels, each of which is capable of achieving at least three different gray levels, the method comprising:

(a) providing a final data buffer arranged to receive data defining a desired final state of each pixel of the display;
(b) providing an initial data buffer arranged to store data defining an initial state of each pixel of the display;
(c) providing a target data buffer arranged to store data defining a target state of each pixel of the display;
(d) providing a polarity bit array arranged to store a polarity bit for each pixel of the display;
(e) determining when the data in the initial and final data buffers differ, and when such a difference is found, updating the values in the polarity bit array and target data buffer by (i) when the values for a specific pixel in the initial and final data buffers differ and the value in the initial data buffer represents an extreme optical state of the pixel, setting the polarity bit for the pixel to a value representing a transition towards the opposite extreme optical state; and (ii) when the values for a specific pixel in the initial and final data buffers differ, setting the target data buffer to the value of the initial data buffer plus or minus an increment, depending upon the relevant value in the polarity bit array;
(f) updating the image on the display using the data in the initial data buffer and the target data buffer as the initial and final states of each pixel respectively;
(g) after step (f), copying the data from the target data buffer into the initial data buffer; and
(h) repeating steps (e) to (g) until the initial and final data buffers contain the same data.

Hereinafter, for convenience, these two related methods may be referred to as the "target buffer" or "TB" methods of the invention. When it is desirable to distinguish between the two methods, the former may be referred to as the "non-polarity target buffer" or "NPTB" method, and the latter as the "polarity target buffer" or "PTB" method. This invention extends to a display controller, application specific integrated circuit or software code arranged to carry out the TB methods of the invention.

Finally, this invention provides a method for reducing the amount of data which needs to be stored in order to drive an electro-optic display. Accordingly, this invention provides a method for driving an electro-optic display having a plurality of pixels, each of which is capable of achieving at least two different gray levels, the method comprising:
  storing a base waveform defining a sequence of voltages to be applied during a specific transition by a pixel between gray levels;
  storing a multiplication factor; and
  effecting said specific transition by applying to said pixel said sequence of voltages for periods dependent upon said multiplication factor.

Hereinafter, for convenience, this method may be referred to as the "waveform compression" or "WC" method of the present invention.

BRIEF DESCRIPTION OF DRAWINGS

As already mentioned, FIG. 1 of the accompanying drawings shows the reflectance of a pixel of an electro-optic display as a function of time, and illustrates the phenomenon of dwell time dependence.

FIGS. 2A and 2B illustrate waveforms for two different transitions in a prior art three reset pulse slide show drive scheme of a type described in the aforementioned MEDEOD applications.

FIGS. 3A and 3B illustrate waveforms for two different transitions in a prior art two reset pulse slide show drive scheme of a type described in the aforementioned MEDEOD applications.

FIG. 5A illustrates a waveform of a prior art two reset pulse slide show drive scheme.

FIGS. 5B-5D illustrate BPPSS waveforms of the present invention produced by modifying the waveform of FIG. 5A.

FIG. 6A illustrates the same prior art base waveform as FIG. 5A.

FIGS. 6B-6D illustrate BPPSS waveforms of the present invention produced by excision of balanced pulse pairs from the base waveform of FIG. 6A.

FIG. 7A illustrates a BPPSS waveform of the present invention produced by inserting a balanced pulse pair between two base waveform elements of a base waveform.

FIG. 7B illustrates a further BPPSS waveform of the present invention produced by inserting the same balanced pulse pair as in FIG. 7A within a single base waveform element of the same base waveform as in FIG. 7A.

FIG. 8A illustrates the same prior art base waveform as FIGS. 5A and 6A.

FIGS. 8B-8D illustrate BPPSS waveforms of the present invention produced by insertion of periods of zero voltage at differing locations in the base waveform of FIG. 8A.

FIG. 9C illustrates a BPPSS waveform of the present invention produced by insertion of two balanced pulse pairs into the base waveform of FIG. 9B.

FIG. 9D illustrates a BPPSS waveform of the present invention produced by insertion of a balanced pulse pair and a period of zero voltage into the base waveform of FIG. 9B.

FIGS. 10A-10C and 11A-11C illustrate further BPPSS waveforms of the present invention produced by modifying the base waveforms of FIGS. 9A and 9B.

FIGS. 14 and 15 show selected waveforms used during a first inverse monochrome projection method of the present invention.

FIGS. 25A-25E illustrate a set of dwell time compensated waveforms used in a first dwell time compensation balanced pulse pair drive scheme of the present invention.

DETAILED DESCRIPTION

Figure 1:
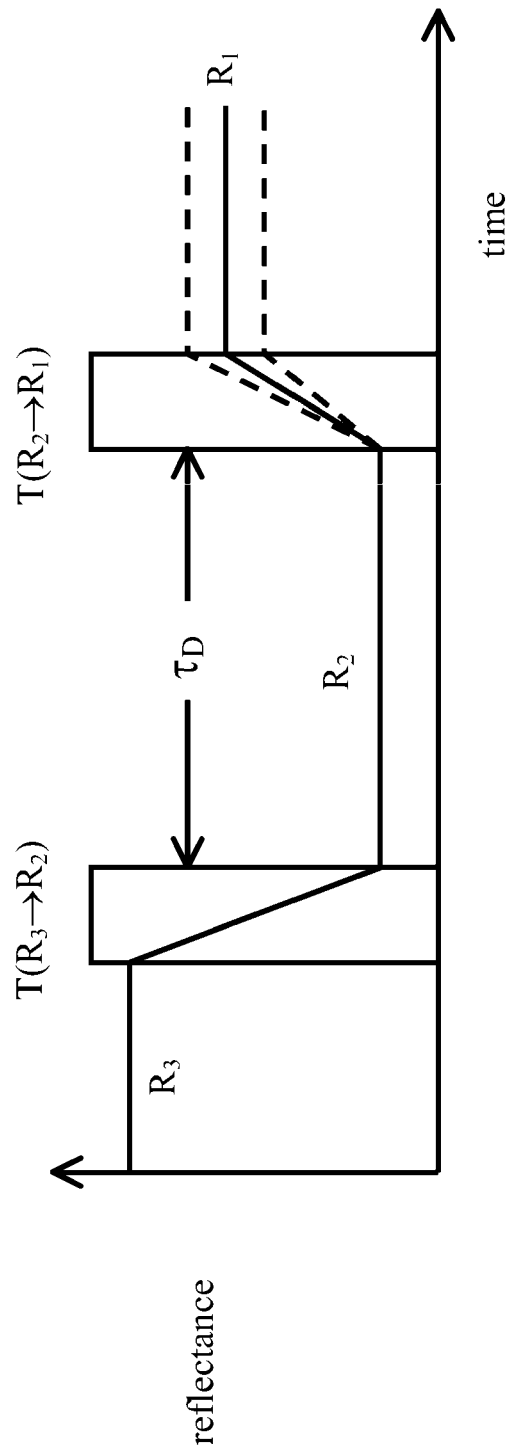

From the foregoing Summary, it will be seen that the present invention provides a number of differing methods for driving electro-optic displays, especially bistable electro-optic displays, and apparatus and software code adapted to carry out such methods. The various methods of the invention will mainly be described separately below, but it should be understood that a single electro-optic display, or component thereof, may make use of more than one aspect of the present invention. For example, a single electro-optic display might make use of the BPPSS, IMP and DTCBPP aspects of the present invention. It should also be noted that the preferred forms of balanced pulse pairs are common to all aspects of the present invention which make use of such pulse pairs, as are the preferred limitations on the sizes of such pulse pairs and the methods for adjusting the length of waveforms to accommodate insertion or excision of such pairs and/or periods of zero voltage. Finally, it should be noted that the desirably of DC balanced drive schemes and DC balanced waveforms, as discussed in the aforementioned MEDEOD applications and below, is also common to all aspects of the present invention.

Section A: Balanced Pulse Pair Slide Show Method and Apparatus

As already mentioned, the BPPSS method of the present invention is a method for driving an electro-optic display having at least one pixel capable of achieving at least three different gray levels including two extreme optical states. The method comprises applying to the pixel a base waveform comprising at least one reset pulse sufficient to drive the pixel to or close to one of the extreme optical states followed by at least one set pulse sufficient to drive the pixel to a gray level different from said one extreme optical state, the base waveform being modified by at least one of the following:

(a) insertion of at least one balanced pulse pair into the base waveform;
(b) excision of at least one balanced pulse pair from the base waveform; and
(c) insertion of at least one period of zero voltage into the base waveform.

Also, as already mentioned, the term "balanced pulse pair" denotes a sequence of two pulses of opposite polarity such that the total impulse of the balanced pulse pair is essentially zero. In a preferred form of the BPPSS method, the two pulses of the balanced pulse pair are each of constant voltage but of opposite polarity and are equal in length. The term "base waveform element" or "BWE" may be used hereinafter to refer to any reset or set pulse of the base waveform. The insertion of the balanced pulse pair and/or of the zero voltage period (which may hereinafter be called a "gap") may be effected either within a single base waveform element or between two successive waveform elements. All these modifications have the property that they do not affect the net impulse of the waveform; by net impulse is meant the integral of the waveform voltage curve integrated over the time duration of the waveform. Balanced pulse pairs and zero voltage pauses have of course zero net impulse. Although typically the pulses of a BPP will be inserted adjacent each other, this is not essential and the two pulses may be inserted at separate locations.

Where the modification of the base waveform in accordance with the BPPSS method includes excision of at least one BPP, the period formerly occupied by the or each excised BPP may be left as a period of zero voltage. Alternatively, this period may be "closed up" by moving some or all of the later waveform elements earlier in time, but in this case it will normally be necessary to insert a period of zero voltage at some later stage in the waveform, typically at the end thereof, in order to ensure that the overall length of the waveform is maintained, since it is normally necessary to ensure that all pixels of a display are driven with waveforms of equal length. Alternatively, of course, the period may be "closed up" by moving some or all of the earlier waveform elements later in time, with insertion of a period of zero voltage at some earlier stage of the waveform, typically at the beginning thereof.

As already indicated, the BPPSS waveforms of the present invention are modifications of base slide show waveforms described in the aforementioned MEDEOD applications. As discussed above, slide show waveforms comprise one or more reset pulses that cause a pixel to move to, or at least close to, one extreme optical state (optical rail); if the waveform includes two or more reset pulses, each reset pulse after the first will cause the pixel to move to the opposed extreme optical state, and thus to traverse substantially its entire optical range. (For example, if the display uses an electro-optic medium that has a range of (say) 4 to 40 percent reflectance, each reset pulse after the first might cause the pixel to traverse from 8 to 35 percent reflectance.) If more than one reset pulse is used, successive reset pulses must of course be of alternating polarity.

A slide show waveform further comprises a set pulse which drives the pixel from the extreme optical state in which it has been left by the last reset pulse to the desired final gray level of the pixel. Note that when this desired final gray level is one of the extreme optical states, and the last reset pulse leaves the pixel at this desired extreme optical state, the set pulse may be of zero duration. Similarly, if the initial state of the pixel before application of the slide show waveform is at one of the extreme optical states, the first reset pulse may be of zero duration.

Preferred BPPSS waveforms of the present invention will now be described, though by way of illustration only, with reference to the accompanying drawings.

Figure 2C:
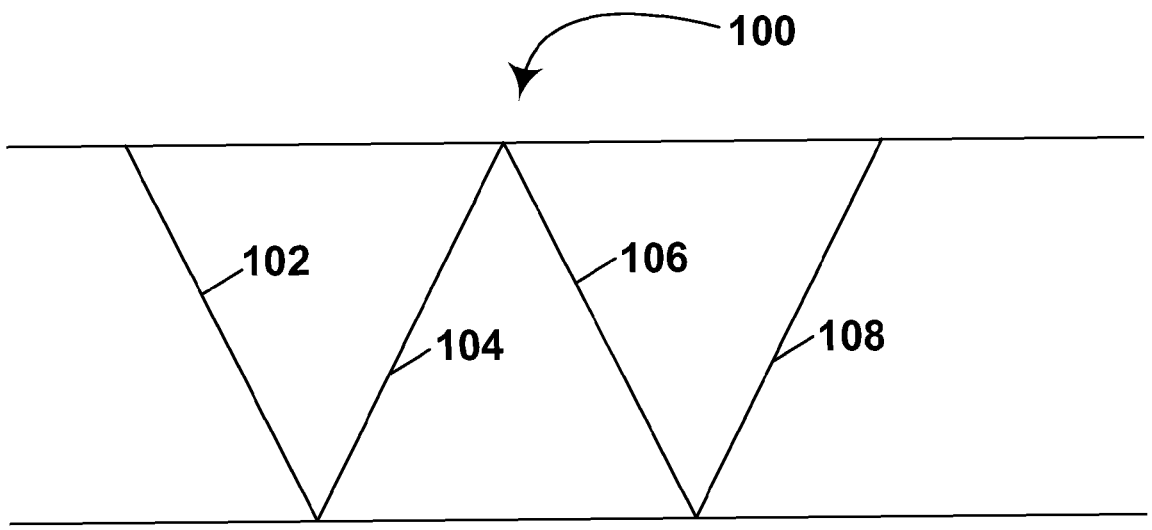
FIGS. 2C and 2D illustrate the variations with time of the reflectances of two pixels of an electro-optic display to which the waveforms of FIGS. 2A and 2B respectively are applied.
Figure 2D:
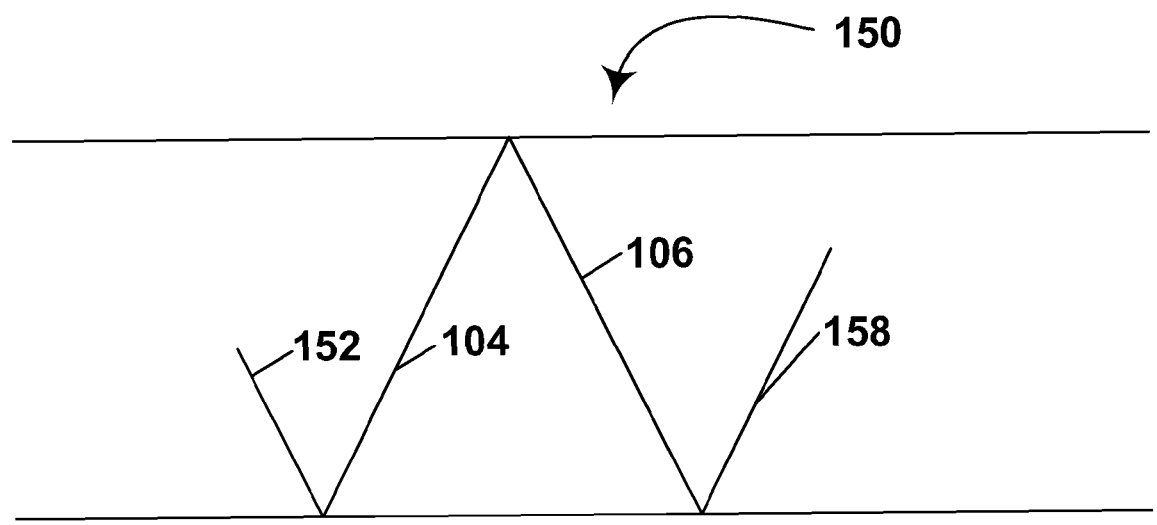

FIGS. 2A and 2B of the accompanying drawings illustrate the waveforms used for two different transitions in a prior art (base) slide show drive scheme of a type described In the aforementioned MEDEOD applications. This slide show drive scheme uses three reset pulses for each transition. FIGS. 2C and 2D show the corresponding variations with respect to time in optical state (reflectance) of pixels to which the waveforms of FIGS. 2A and 2B respectively are applied. In accordance with the convention used in the aforementioned copending application Ser. Nos. 10/065,795 and 10/879,335, FIGS. 2C and 2D are drawn so that the bottom horizontal line represents the black extreme optical state, the top horizontal line represents the white extreme optical state, and intervening levels represent gray states. The beginning and end of the reset and set pulses of the waveforms are indicated in FIGS. 2A and 2B by broken vertical lines, and the various BWE's (i.e., the reset and set pulses) are shown as consisting of ten or less equal length pulses, although in general the BWE's may be of more arbitrary length and if comprised of a series of equal length pulses, more than ten such pulses would normally be used for a maximum length BWE.

The base waveform (generally designated 100) shown in FIGS. 2A and 2C effects a white-to-white transition (i.e., a "transition" in which both the initial and the final states of the pixel are the white extreme optical state). The waveform 100 comprises a first negative (i.e., black-going) reset pulse 102, which drives the pixel to its black extreme optical state, a second positive (white-going) reset pulse 104, which drives the pixel to its white extreme optical state, a third negative (black-going) reset pulse 106, which drives the pixel to its black extreme optical state, and a set pulse 108, which drives the pixel to its white extreme optical state. Each of the four pulses 102, 104, 106 and 108 has the maximum ten-unit duration. (To avoid the awkwardness of continual references to "units of duration", these units may hereinafter be referred to as "time units" or "TU's".)

FIGS. 2B and 2D illustrate a waveform (generally designated 150) for a dark gray to light gray transition using the same three reset pulse drive scheme as in FIGS. 2A and 2C. The waveform 150 comprises a first reset pulse 152 which, like the first reset pulse 102 of waveform 100, is negative and black-going. However, since the transition for which waveform 150 is used begins from a dark gray level, the duration (illustrated as four TU's) of the first reset pulse 152 is shorter than that of reset pulse 102, since a shorter first reset pulse is needed to bring the pixel to its black extreme optical state at the end of the first reset pulse. For the remaining six TU's of the first reset pulse 152, zero voltage is applied to the pixel. (FIGS. 2B and 2D illustrate the first reset pulse 152 with the four TU's of negative voltage at the end of the relevant period, but this is arbitrary and the periods of negative and zero voltage may be arranged as desired.)

The second and third reset pulses 104 and 106 of waveform 150 are identical to the corresponding pulses of waveform 100. The set pulse 158 of waveform 150, like the set pulse 108 of waveform 100, is positive and white-going. However, since the transition for which waveform 150 is used ends at a light gray level, the duration (illustrated as seven TU's) of the set pulse 158 is shorter than that of set pulse 108, since a shorter set pulse is needed to bring the pixel to its final light gray level. For the remaining three TU's of set pulse 158, zero voltage is applied to the pixel. (Again, the distribution of periods of positive and zero voltage within set pulse 158 is arbitrary and the periods may be arranged as desired.)

From the foregoing, it will be seen that, in the prior art slide show drive scheme shown in FIGS. 2A-2D, the duration of the first reset pulse and of the set pulse will vary depending upon the initial and final states of the pixel respectively, and in certain cases one or both of these pulses may be of zero duration. For example, in the drive scheme of FIGS. 2A-2D, a black-to-black transition could have a first reset pulse of zero duration (since the pixel is already at the black extreme optical state which is reached at the ends of the first reset pulses 102 and 152), and a set pulse of zero duration (since at the end of the third reset pulse 106 the pixel is already at the desired extreme black optical state).

In general, it is desirable to keep the overall duration of waveforms as short as possible so that a display can be rapidly rewritten; for obvious reasons, users prefer displays that display new images quickly. Since each reset pulse occupies a substantial period, it is desirable to reduce the number of reset pulses to the minimum consistent with acceptable gray scale performance by the display, and in general one or two reset pulse slide show drive schemes are preferred. FIGS. 3A and 3B of the accompanying drawings illustrate waveforms for two different transitions in a two reset pulse prior art slide show drive scheme of the type described in the aforementioned MEDEOD applications.

FIG. 3A illustrates a white to light gray single reset pulse waveform (generally designated 200) comprising a reset pulse 202, which drives a pixel from its initial white state to black, and a set pulse 208 (identical to pulse 158 in FIG. 2B), which drives the pixel from black to a light gray. Although waveform 200 uses only a single reset pulse, it will be appreciated that it is actually part of a two reset pulse slide show drive scheme with a first reset pulse of zero duration, as indicated by the period of zero voltage at the left hand side of FIG. 3A.

FIG. 3B illustrates a black to light gray two reset pulse waveform (generally designated 250) comprising a first reset pulse 252, which drives a pixel from its initial black state to white, a second reset pulse 254, which drives the pixel from white to black, and a set pulse 208, identical to the reset pulse in FIG. 3A, which drives the pixel from black to light gray.

As already mentioned, the BPPSS waveforms of the present invention are derived from base slide show waveforms such as those illustrated in FIGS. 2A, 2B, 3A and 3B by insertion of at least one balanced pulse pair into the base waveform, excision of at least one balanced pulse pair from the base waveform, or insertion of at least one period of zero voltage into the base waveform. In the case of excision of a BPP, the resultant gap may be either closed up or left as a period of zero voltage. Combinations of these modifications may be used.

Figure 4B:
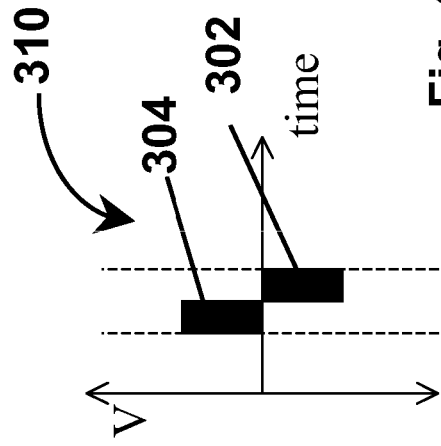
FIGS. 4A, 4B and 4C illustrate balanced pulse pairs which, in accordance with the BPPSS method of the present invention, may be used to modify prior art slide show waveforms such as those shown in FIGS. 2A, 2B, 3A and 3B.
Figure 4A:
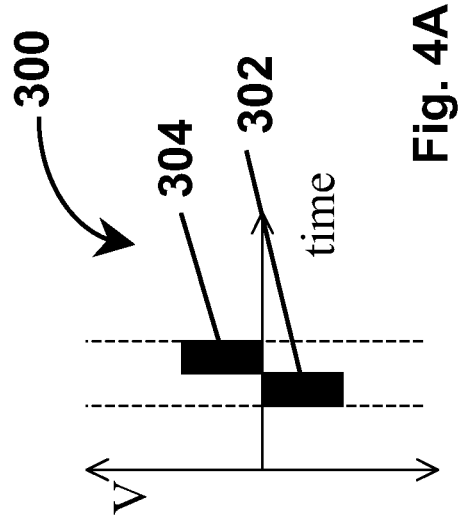
Figure 4C:
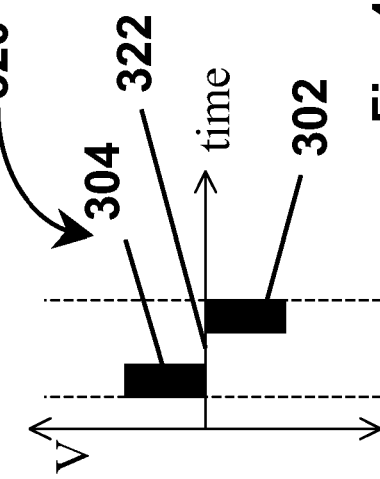

FIGS. 4A-4C illustrate preferred balanced pulse pairs for use in the BPPSS waveforms of the present invention. The BPP (generally designated 300) shown in FIG. 4A comprises a negative pulse 302 of constant voltage, followed immediately by a positive pulse 304 of the same duration and voltage as pulse 302 but of opposite polarity. It will be apparent that the BPP 300 applies zero net impulse to a pixel. The BPP (generally designated 310) shown in FIG. 4B is identical to the BPP 300 except that the order of the pulses is reversed. The BPP (generally designated 320) shown in FIG. 4C is derived from the BPP 310 by introducing a period 322 of zero voltage between the positive and negative pulses 304 and 302 respectively.

Figure 5C:
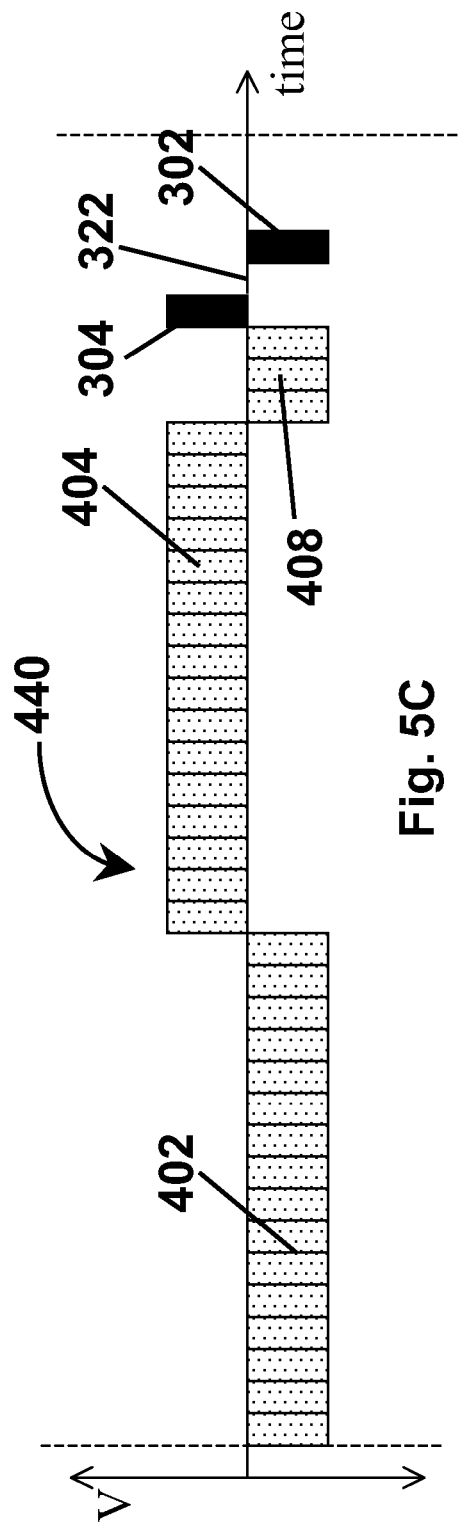

FIGS. 5A-5D illustrate modifications of a base two reset pulse slide show waveform by a BPP in accordance with the present invention. FIG. 5A illustrates the base waveform (generally designated 400) used for a white to light gray transition. The waveform 400 is generally similar to the waveform 250 illustrated in FIG. 3B except that the order of the two reset pulses is reversed. Thus, the waveform 400 comprises a 16-TU negative black-going first reset pulse 402 (which drives the pixel from its original white state to its black extreme optical state), a 16-TU positive white-going second reset pulse 404 (which drives the pixel from its black extreme optical state to its white extreme optical state) and a 3-TU negative black-going set pulse 408, which drives the pixel from its white extreme optical state to the desired final light gray state.

FIG. 5B illustrates a BPPSS waveform (generally designated 420) of the present invention produced by inserting the BPP of FIG. 4B into the waveform 400 of FIG. 5A between the second reset pulse 404 and the set pulse 408 thereof. As will be seen from FIG. 5B, the effect of this insertion is that the positive pulse 304 of the BPP lengthens the second reset pulse 404 to 17 TU's, while the negative pulse 302 of the BPP lengthens the set pulse 408 to 4 TU's.

FIG. 5C illustrates a BPPSS waveform (generally designated 440) of the present invention produced by inserting the BPP of FIG. 4C into the waveform 400 of FIG. 5A after the set pulse 408 thereof.

Figure 5D:
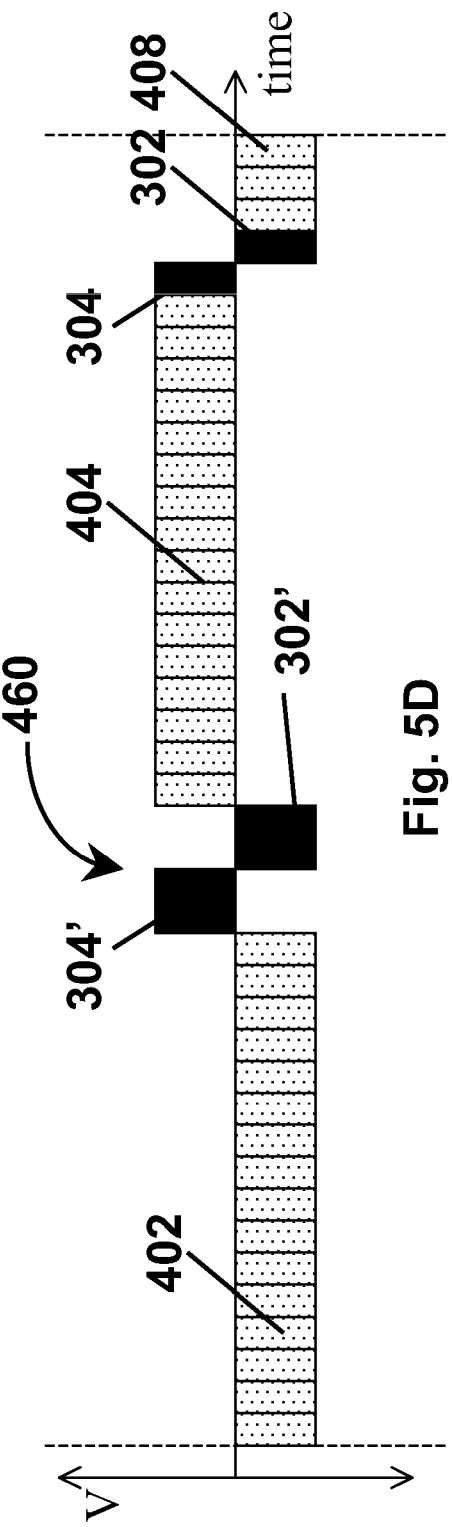

FIG. 5D illustrates a BPPSS waveform (generally designated 460) of the present invention produced by further modification of the waveform 420 shown in FIG. 5B. The waveform 460 has a second BPP 304', 302', inserted between its first and second reset pulses 402 and 404 respectively; this second BPP is similar to the BPP 304, 302 except that the duration of both pulses is doubled.

As already noted and as illustrated in FIG. 5D, the BPPSS waveforms of the present invention may include a plurality of BPP's, excisions, pauses and combinations thereof (hereinafter referred to collectively as "additional waveform elements" or "AWE's"). However, in general it is preferred to use the minimum number of AWE's consistent with the desired degree of precision in control of the final gray level produced by the waveform. BPP's and pauses both lengthen the waveform, and incorporation of several such BPP's and/or pauses may require an undesirable lengthening of the period required for rewriting of the display. For example, although the waveform 460 of FIG. 5D uses only a short 3-TU set pulse 408, the waveform 460 occupies the full period for updating of the display (the period between the broken vertical lines in FIG. 5D), and introduction of any further BPP's or pauses would require extending this period. Thus, the total length of a modified waveform of the present invention desirably does not exceed that of the corresponding base waveform in which the duration of the set pulse is sufficient to drive the pixel from one extreme optical state to the other. In many cases (depending of course upon the exact electro-optic medium used in the display and other characteristics of the drive electronics), it has been found that good control of gray levels can be achieved with waveforms comprising not more than two AWE's; in other cases, not more than four, or less commonly not more than six, AWE's may be required, but any further increase in AWE's is generally undesirable.

FIGS. 6A-6D illustrate modifications of a base two reset pulse waveform by excision of a BPP in accordance with the present invention. For purposes of comparison, FIG. 6A illustrates the same waveform 400 as FIG. 5A. Note that the waveform 400 is regarded as terminating 7 TU's after the end of set pulse 408 since FIG. 6A assumes that, as in FIGS. 2A, 2B, 3A and 3B, 10 TU's of the applied voltage is required to drive the pixel completely between its extreme optical states, so that in other waveforms of the same drive scheme, it will be necessary to lengthen set pulse 408 up to a maximum of 10 TU's. FIG. 6B illustrates a modified BPPSS waveform (generally designated 520) of the present invention produced by excising from the waveform 400 a BPP comprising the last two TU's of the first reset pulse 402 and the first two TU's of the second reset pulse 404, leaving a modified 14-TU first reset pulse 402' and a modified 14-TU second reset pulse 404', separated by a 4-TU pause 522, during which zero voltage is applied to the pixel.

FIG. 6C illustrates a BPPSS waveform (generally designated 540) of the present invention produced by an alternative modification of the waveform 400 of FIG. 6A. The waveform 540 is produced by excising from the waveform 400 a BPP comprising the last TU of the second reset pulse 404 and the first TU of the set pulse 408, and "closing up" the period originally occupied by the excised BPP by moving the first and second reset pulses later in time by 2 TU's. Thus, the waveform 540 comprises a 2-TU pause 544, a 16-TU first reset pulse 402, a 15-TU second reset pulse 404" and a 2-TU set pulse 408; note that the set pulse 408' terminates at exactly the same time as the set pulse 408 of the base waveform 400, 7 TU's before the end of the waveform.

FIG. 6D illustrates a BPPSS waveform (generally designated 560) of the present invention produced by a further modification of the waveform 400 of FIG. 6A. The waveform 560 is produced by excising from the waveform 400 a BPP comprising the last 2 TU's of the first reset pulse 402 and the first 2 TU's of the second reset pulse 404, and "closing up" the period originally occupied by the excised BPP by moving the second reset pulse and the set pulse earlier in time by 4 TU's. Thus, the waveform 560 comprises a 14-TU first reset pulse 402' (identical to that in FIG. 5B), a 14-TU second reset pulse 404' (identical except for timing to that in FIG. 5B) and a 3-TU set pulse 408. Note that because of the shift of the second reset pulse 404' and the set pulse 408, the final period 562 of zero voltage following the set pulse 408 is extended from 7 to 11 TU's.

The preferred BPPSS waveform modifications discussed so far have involved insertion or excision of BPP's between successive base waveform elements or at the end of the base waveform. However, the BPPSS aspect of the present invention is not limited to such modifications, but extends to modifications in which a BPP is inserted within a single BWE, as will now be illustrated with reference to FIGS. 7A and 7B. FIG. 7A illustrates a BPPSS waveform 620 of the present invention produced by modifying base waveform 400 (FIG. 5A or 6A) by insertion between the first reset pulse 402 and the second reset pulse 404 of a BPP 302', 304' similar to that shown in FIG. 5D except that the order of the positive and negative pulses is reversed. FIG. 7B illustrates a further BPPSS waveform 640 of the present invention also produced by modifying base waveform 400 by insertion of a BPP 302', 304', but in waveform 640 the BPP 302', 304' is inserted at the mid-point of the second reset pulse 404, thus splitting this pulse into two separate sections 404A and 404B. Thus, waveform 640 comprises, in succession, a 16-TU first reset pulse 402 (identical to that of waveform 400), the 8-TU pulse 404A, the first section of the second reset pulse, the BPP 302', 304', the 8-TU pulse 404B, the second section of the second reset pulse, and a 3-TU reset pulse 408 (identical to that of waveform 400).

As already mentioned, the BPPSS aspect of the present invention includes not only the insertion or excision of BPP's from base waveforms but also the insertion of pauses (periods of zero voltage) into base waveforms, and such insertion of pauses will now be illustrated with reference to FIGS. 8A-8D. For purposes of comparison, FIG. 8A illustrates the same base waveform 400 as FIGS. 5A and 6A. FIG. 8B illustrates a modified BPPSS waveform (generally designated 720) of the present invention produced by introducing into the base waveform 400 between the second reset pulse 404 and the set pulse 408 thereof a 2-TU pause 722. It should be noted that insertion of the pause 722 necessarily reduces the length of the period of zero voltage following set pulse 408 from 7 to 5 TU's. FIG. 8C illustrates another BPPSS waveform (generally designated 740) of the present invention generally similar to waveform 720 except that the 2-TU pause is inserted after the first 12 TU's of the second reset pulse 404, thus splitting this second reset pulse into a first section 404C and a second section 404D. Thus, waveform 740 comprises, in succession, a 16-TU first reset pulse 402 (identical to that of waveform 400), the 12-TU pulse 404C, the first section of the second reset pulse, the 2-TU pause 722', the 4-TU pulse 404D, the second section of the second reset pulse, and the 3-TU reset pulse 408 (identical to that of waveform 400).

FIG. 8D illustrates a BPPSS waveform (generally designated 760) of the present invention which is again produced by insertion of a 2-TU pause into the base waveform 400. However, in the waveform 760, the pause 722" is inserted prior to the first reset pulse 402. Thus, the waveform 760 comprises, in succession, the pause 722", the first reset pulse 402, the second reset pulse 404 and the set pulse 408, the last three elements all being identical to the corresponding elements of the base waveform 400.

As already indicated, the BPPSS waveforms provided by the present invention are useful for improving the gray level performance of electro-optic displays, especially bistable electro-optic displays. The BPPSS waveforms of the present invention can achieve such improved gray level performance while still preserving long term DC balancing of the display. (For reasons discussed in detail in the aforementioned MED-EOD applications, it is important that drive schemes used to drive at least some electro-optic displays be DC balanced, in the sense that the integral of the applied voltage with respect to time for an given pixel be bounded regardless of the series of optical states through which that pixel is driven.) It has been found that the final gray level of a pixel can be adjusted by insertion or excision of BPP's and/or insertion of pauses in accordance with the BPPSS aspect of the present invention. It has also been found that the final gray level of a pixel is affected by the position(s) at which the insertion or excision of BPP's and/or insertion of pauses is effected. While in general good control of final gray levels can be effected by inserting BPP's between adjacent BWE's, BPP's may be inserted within a single BWE, as illustrated in FIG. 7B, to change the degree of "tunability" of the final gray level; for example, if a BPP added between two reset pulses does not provide sufficiently fine tunability of the final gray level, moving the BPP to a point in the middle of a BWE can give finer adjustment of the final gray level.

For example, the waveform 420 of FIG. 5B would normally produce a gray level slightly darker than the gray level produced by the corresponding base waveform 400 of FIG. 5A because the pulse 304 of the BPP 304, 302 will have little or no effect on the gray level of the pixel, since this gray level will already be at the white extreme optical state at the end of the second reset pulse 404, whereas the pulse 302, by effectively lengthening the set pulse 408, will cause the final gray level to be somewhat further from the white extreme optical state (i.e., slightly darker in color). In contrast, the waveform 540 shown in FIG. 6C would normally produce a gray level slightly lighter than the gray level produced by the corresponding base waveform 400 of FIG. 6A. Since FIGS. 5A, 6A and 6C are based upon the assumption that the pixel can be shifted between its extreme optical states by application of the illustrated voltage for 10 TU's (as mentioned above), the 16-TU second reset pulse 404 of base waveform 400 effects substantial "over-driving" of the pixel into the white optical rail (white extreme optical state), i.e., the second reset pulse 404 continues for a substantial period after the pixel has already reached its extreme white optical state. Hence, shortening the 16-TU second reset pulse 404 by 1 TU to produce the 15-TU second reset pulse 404" of waveform 540 will have little or no effect on the gray level at the end of the second reset pulse 404". In contrast, the shortening of the 3-TU set pulse 408 of waveform 400 by 1 TU to produce the 2-TU set pulse 408' of waveform 540 will significantly reduce the extent to which the white extreme optical state present at the end of the second reset pulse 404" is driven towards black, so that the final gray level at the end of waveform 540 will be significantly darker than at the end of base waveform 400.

As already indicated, it has also been found that pauses (periods of zero voltage) can be used to adjust the final gray level. For example, adding a pause between the last reset pulse and the set pulse affects the final gray level. Moving the pause to an earlier point in the last reset pulse also induces slight changes in the final gray level. Thus, pause location can be used to adjust the final gray level produced by a BPPSS waveform. In general pauses can be added at any point in a waveform. Furthermore, it may be advantageous to shift all the BWE's of a waveform earlier or later in time within an allotted update time interval for full rewriting of a display, thereby shifting the relative temporal positioning of the various transitions taking place within the overall transition from an initial state to a final state. Such temporal shifting may be advantageous for several reasons, for example to reduce undesirable transient behavior of the display during transitions, or to lead to a more pleasing final image, for example by reducing variations between pixels which are intended to be at the same gray level.

Figures 9A, 9B:
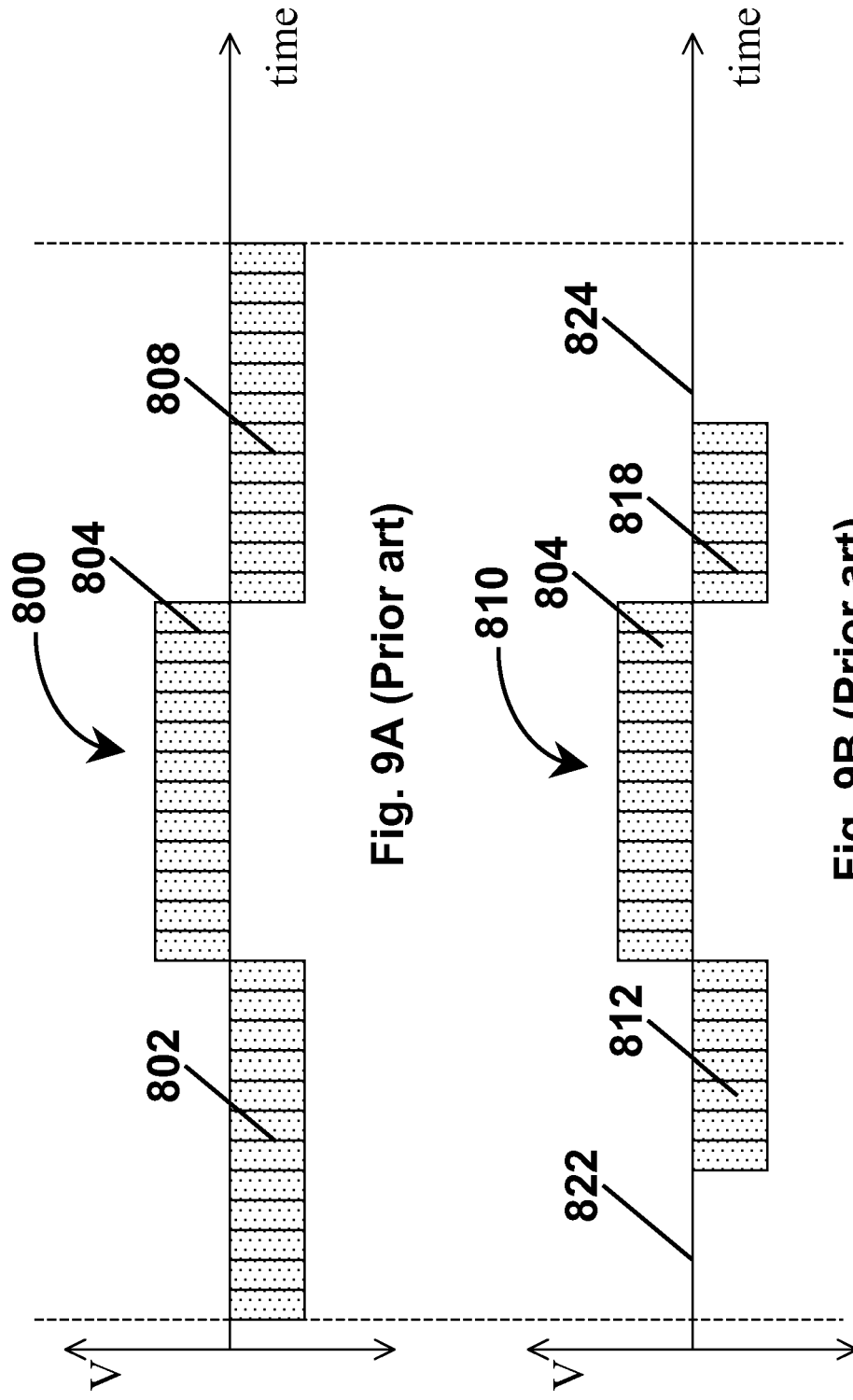
FIGS. 9A and 9B illustrate prior art base waveforms which may be modified to produce BPPSS waveforms of the present invention.

Further preferred BPPSS waveforms and drive schemes of the present invention will now be described with reference to FIGS. 9A-9D, 10A-10C and 11A-11C of the accompanying drawings. FIGS. 9A and 9B illustrate two base waveforms of a prior art two reset pulse slide show drive scheme, in which each of the first and second reset pulses and the set pulse may occupy a maximum of 12 TU's. FIG. 9A illustrates a waveform 800 for effecting a white-to-black transition, and comprising a 12-TU black-going first reset pulse 802, a 12-TU second white-going reset pulse 804, and a 12-TU black-going set pulse 808. As discussed above with reference to FIGS. 2A and 2B, if the initial and final states of a pixel are intermediate gray levels lying between the black and white extreme optical states of the pixel, the first reset and set pulses need to be adjusted in length, and FIG. 9B shows a base waveform 810 comprising a 7-TU first reset pulse 812, a 12-TU second reset pulse 804 (identical to the corresponding pulse of waveform 800) and a 6-TU set pulse 818. To "pad" the waveform 810 to the same overall 36-TU length as the waveform 800, a 5-TU period 822 of zero voltage precedes the first reset pulse 812 and a 6-TU period 824 of zero voltage follows the set pulse 824.

FIG. 9C shows a BPPSS waveform (generally designated 840) of the present invention produced by modification of the waveform 810 shown in FIG. 9B. Specifically, waveform 840 is derived from waveform 810 by inserting a first BPP, comprising a positive 1-TU pulse 842 and a similar negative pulse 844, immediately before the first reset pulse 812 and a second, similar BPP 846, 848 immediately after the set pulse 818. The pulses 812, 804 and 818 are unaltered, but to accommodate the BPP's while maintaining the overall length of the waveform 840, the initial period 822' of zero voltage is reduced to 3 TU's, and the final period 824' of zero voltage is reduced to 4 TU's.

The use of two BPP's in the manner illustrated in FIG. 9C can, in at least some cases, enable more precise control of final gray level than can be achieved with a single BPP. It has been found that a BPP disposed after the set pulse (such as the BPP 846, 848 in waveform 840) can cause a significant change in the final gray level, and if the driver used only allows relatively coarse adjustment of the duration of each half of the BPP (if, for example, this duration can only be adjusted in increments of 1 TU in FIG. 9C), the difference between the gray levels available by changing the duration of each half of the BPP by the minimum increment may be unacceptably large. A BPP (such as the BPP 842, 844 in waveform 840) inserted at a much earlier point in the waveform has a much smaller effect on final gray level than a BPP inserted after the set pulse, and hence allows for finer variation of final gray level. Thus, the waveform 840 permits adjustment of final gray level over a considerable range by controlling the duration of the BPP 846, 848 to effect coarse adjustment of the final gray level and controlling the duration of the BPP 842, 844 to effect fine adjustment of this gray level.

FIG. 9D illustrates a BPPSS waveform (generally designated 860) of the present invention produced by an alternative modification of waveform 810. Like waveform 840, waveform 860 comprises a BPP 846, 848 following the set pulse 818. However, the waveform 860 does not include a second BPP earlier in the waveform, but instead includes a 4-TU pause 850 between the second reset pulse 804 and the set pulse 818. The effect of a pause tends to be smaller than a BPP of the same length at the same point in the waveform, and the pause 850 acts in a similar manner to the BPP 842, 844 of waveform with variation of the length of the pause 850 serving to effect fine adjustment of the final gray level. Note than in waveform 860 the final period 824' of zero voltage is of the same 4-TU length as in waveform 840, but the duration of the initial period 822" of zero voltage is reduced to 1 TU to accommodate the 4-TU pause 850 while still maintaining the overall 36-TU length of the waveform.

Figure 10C:
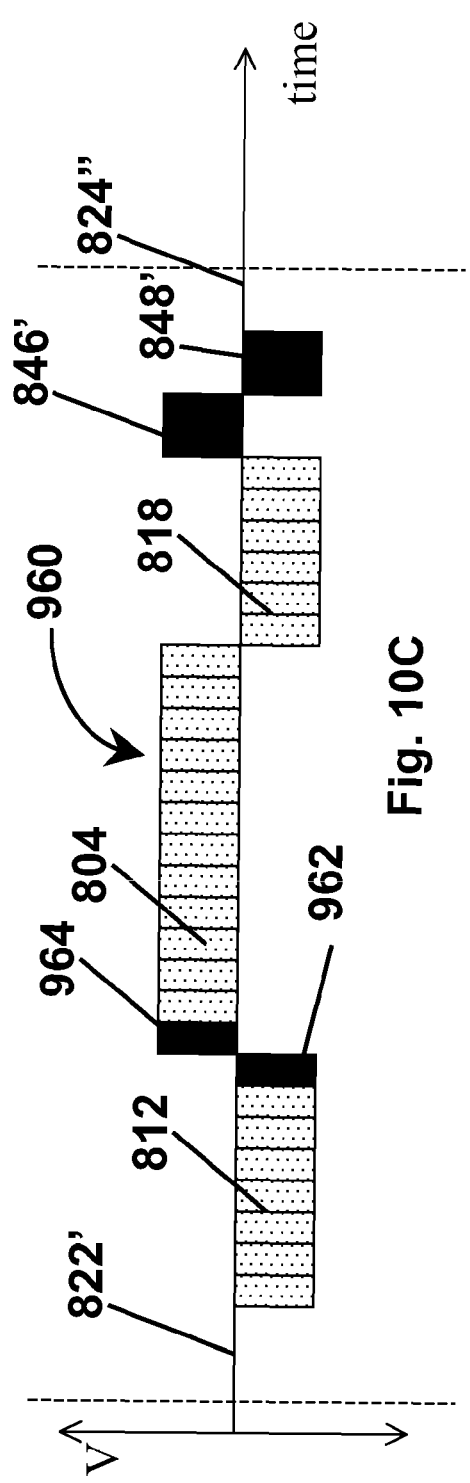

FIGS. 10A-10C show three further BPPSS waveforms of the invention produced by various modifications of the waveform 810 of FIG. 9B. The waveform (generally designated 920) of FIG. 10A is formed by adding a BPP 846', 848' after the set pulse 818 of waveform 810 (FIG. 9B), each pulse 846' and 848' of the BPP being 2 TU's in length. The final period 824" of zero voltage is reduced to 2 TU's to accommodate the 4-TU length of the BPP.

As discussed above with reference to FIG. 9C, varying the length of a BPP following the set pulse may not provide sufficiently fine adjustment of the final gray level, and FIG. 10B illustrates a waveform (generally designated 940) produced by further modifying waveform 920 to overcome this fine tuning problem. The waveform 940 incorporates a second BPP 842', 844' between the second reset pulse 804 and the set pulse 818. The effect on the final gray level of varying the length of BPP 842', 844' is less than a corresponding variation of the length of BPP 846', 848', and hence BPP 842', 844' can be used for fine adjustment of the final gray level.

Although the effect of varying the length of BPP 842', 844' is less than a corresponding variation of the length of BPP 846', 848', it is still greater than the effect of varying the length of a BPP inserted still earlier in the waveform, for example BPP 842, 844 in FIG. 9C. If BPP 842', 844' in waveform 940 fails to provide sufficiently fine adjustment of the final gray level, the second BPP may be inserted earlier in the waveform; in general, the earlier in the waveform a BPP is inserted, the smaller the variation in final gray level produced by an given change in the length of the BPP. For example, FIG. 10C illustrates a BPPSS waveform (generally designated 960) of the present invention which is similar to waveform 940 except that the BPP 842', 844' is replaced by a BPP 962, 964 disposed between the first reset pulse 812 and the second reset pulse 804. (The BPP 962, 964 is of opposite polarity to BPP 842', 844' in the sense that the negative pulse 962 precedes the positive pulse 964; BPP's of either polarity may be used in any location within the waveform, although of course the polarity of a BPP does alter its effect upon the final gray level.)

Figure 11C:
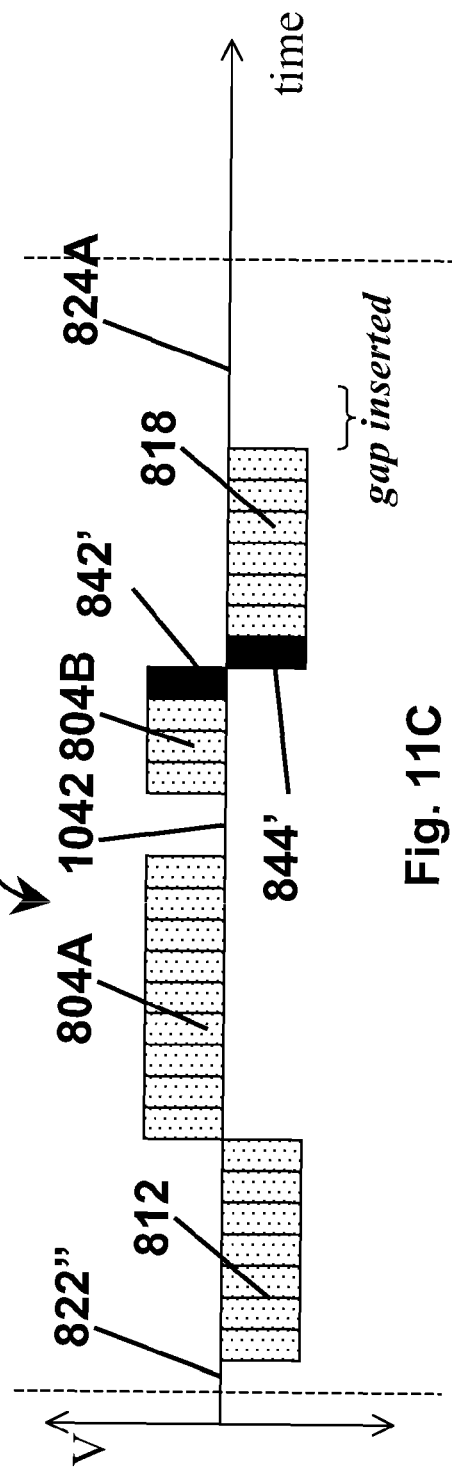

Finally, FIGS. 11A-11C illustrate modification of base waveforms by introducing both BPP's and pauses therein. FIG. 11A illustrates a waveform (generally designated 1020) produced by modifying base waveform 810 by inserting a BPP 842', 844' between the second reset pulse 804 and the set pulse 818, and with a corresponding reduction of the length of the final period 824' of zero voltage to 4 TU's. For reasons discussed above, variation of the length of BPP 842', 844' may not provide sufficiently fine adjustment of the final gray level, and FIG. 11B shows a BPPSS waveform (generally designated 1040) produced by further modification of waveform 1020, specifically by introduction of a 2-TU pause 1042 within the second reset pulse, thus dividing this pulse into a first section 804A and a second section 804B. To accommodate the pause 1042, the length of the initial period 822' of zero voltage is reduced to 3 TU's; the length of the final period 824' of zero voltage remains at 5 TU's.

The pause 1042 is used for fine adjustment of the final gray level. Such fine adjustment may be effected by varying the duration of the pause 1042 and/or its position within the second reset pulse 804A, 804B; as with a BPP, the effect of a pause on the final gray level varies not only with its length but also with its position within the waveform. The BPPSS aspect of the present invention is of course not confined to the use of a single pause; for example, the pause 1042 could be replaced by two separate pauses each of 1 TU duration, so that the second reset pulse would be split into three sections rather than two.

As already mentioned, when a waveform does not occupy the full period available for updating the display (as for example with the waveform 810 of FIG. 9B, which occupies only 25 TU's, whereas a period of at least 36 TU's is needed for updating the display to accommodate the longer waveform 800 of the same drive scheme), it may be advantageous to shift the overall waveform within the updating period, for example to reduce transient visual effects during updating. FIG. 11C illustrates a waveform (generally designated 1060) which is produced by shifting the entire waveform 1040 of FIG. 11B earlier in time by 2 TU's (in effect inserting a 2-TU gap immediately after the set pulse 818, as indicated in FIG. 11C), thus reducing the initial period 822'' of zero voltage to only 1 TU, and increasing the length of the final period 824A of zero voltage to 6 TU's.

Section B: Inverse Monochrome Projection Method and Apparatus

As already mentioned, a second aspect of the present invention provides a method for driving an electro-optic display having a plurality of pixels each capable of achieving at least four different gray levels including two extreme optical states. The method comprises applying to each pixel a waveform comprising a reset pulse sufficient to drive the pixel to or close to one of its extreme optical states followed by a set pulse sufficient to drive the pixel to a final gray level different from said one extreme optical state. The reset pulses are chosen such that the image on the display immediately prior to the set pulses is substantially an inverse monochrome projection of the final image following the set pulses. Such a process is referred to herein as an "inverse monochrome projection" or "IMP" method.

Using the "goal state" nomenclature as used in Scheme 1 above, an IMP method may be defined as one in which the final goal state is approximately an inverse monochrome projection of the desired final state ($R_1$) of the display. In a preferred form of the IMP method, the goal state immediately prior to the final goal state (goal$_{n-1}$ in the nomenclature of Scheme 1) is approximately a monochrome projection of the desired final state ($R_1$) of the display. Such a preferred IMP process may be represented symbolically as in Scheme 2 shown in FIG. 12, in which $R_{1,m}$ represents the monochrome projection of $R_1$, and the over-lining indicates image reversal.

A monochrome projection of an optical state is a mapping of all possible gray levels in the image to one of the two extreme optical states of each pixel or (for reasons explained below) a state close to one of the extreme optical states. For present purposes, the gray levels may be denoted 1, 2, 3, . . . , N, where N is the number of gray levels, and the gray level with the smallest reflectance (typically, black) is denoted 1, the gray level with the next smallest reflectance 2, and so on up to the gray level (typically, white) with the largest reflectance being denoted N. A monochrome projection of a gray scale image is one whereby the gray levels equal to or below a threshold are mapped to gray level 1, or a state close thereto and the gray levels greater than the threshold are mapped to gray level N, or a state close thereto. The threshold is most desirably N/2, but in practice can usefully be set anywhere within the middle half of the range from 1 to N, that is, the threshold is at least N/4 and at most 3N/4.

Figures 12, 13, 16:
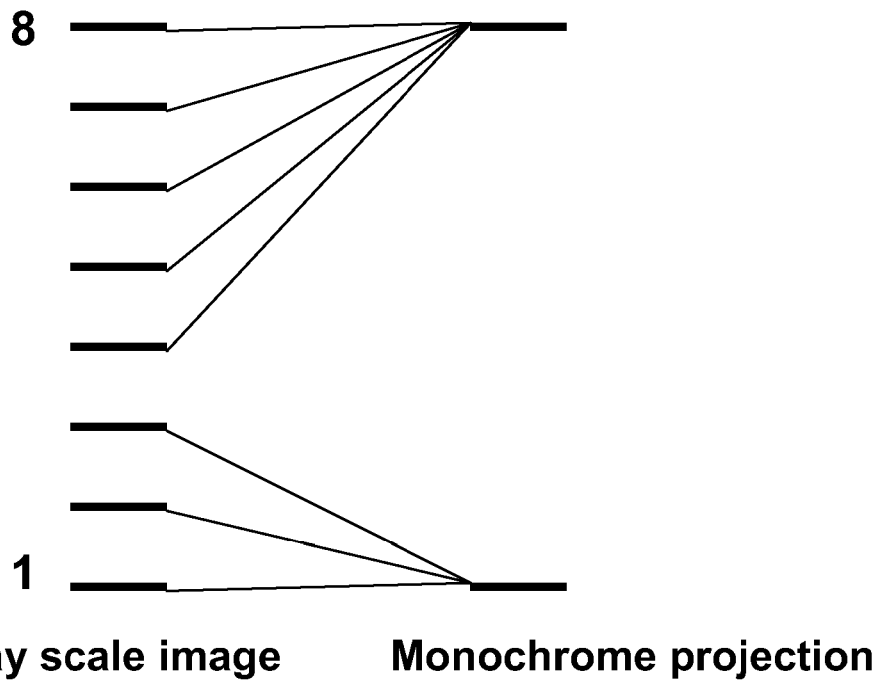
FIG. 12 is a symbolic representation of an inverse monochrome projection method of the present invention.
FIG. 13 shows the manner in which the gray levels of a gray scale image are mapped to a monochrome projection of the image, as may be effected in preferred inverse monochrome projection methods of the present invention.
FIG. 16 is a symbolic representation, similar to that of FIG. 12, of a further inverse monochrome projection method of the present invention.

An example of a monochrome projection is shown in FIG. 13. In this example, the gray scale image (illustrated in a symbolic manner on the left hand side of FIG. 13) contains eight gray levels, denoted 1 to 8. Gray levels 1 to 3 are mapped, in the monochrome projection shown symbolically on the right hand side of the Figure, to gray level 1, as indicated by the connecting lines, while gray levels 4 to 8 are mapped to gray level 8. An inverse monochrome projection is of course produced simply by reversing the two states used in a monochrome projection The preceding references to the IMP method producing "substantially" an inverse monochrome projection, and such a projection involving optical states "close to" one of the extreme optical states, require explanation. In principle, monochrome projections and inverse monochrome projections require projection to one of the extreme optical states. However, in practice drive schemes and waveforms for driving electro-optic displays are defined in terms of the voltage pulses or other waveform elements applied to the individual pixels of a display, not in terms of the exact optical states which result from application of the defined voltage pulses or other waveform elements (although the two are closely related). As discussed in detail in the aforementioned MED-EOD applications, the response of at least some bistable electro-optic media to a given waveform or waveform element depends not only upon the initial optical state of the pixel and the exact waveform or waveform element, but also upon factors such as certain prior optical states of the pixel, and how long the pixel has remained in the same optical state before the waveform or waveform element is applied (the aforementioned dwell time dependency problem). Since slide show waveforms typically do not allow for all such relevant factors, the actual optical states achieved by various pixels in a monochrome projection or inverse monochrome projection may differ slightly from the extreme optical states theoretically achieved in such projections.

Figure 14:
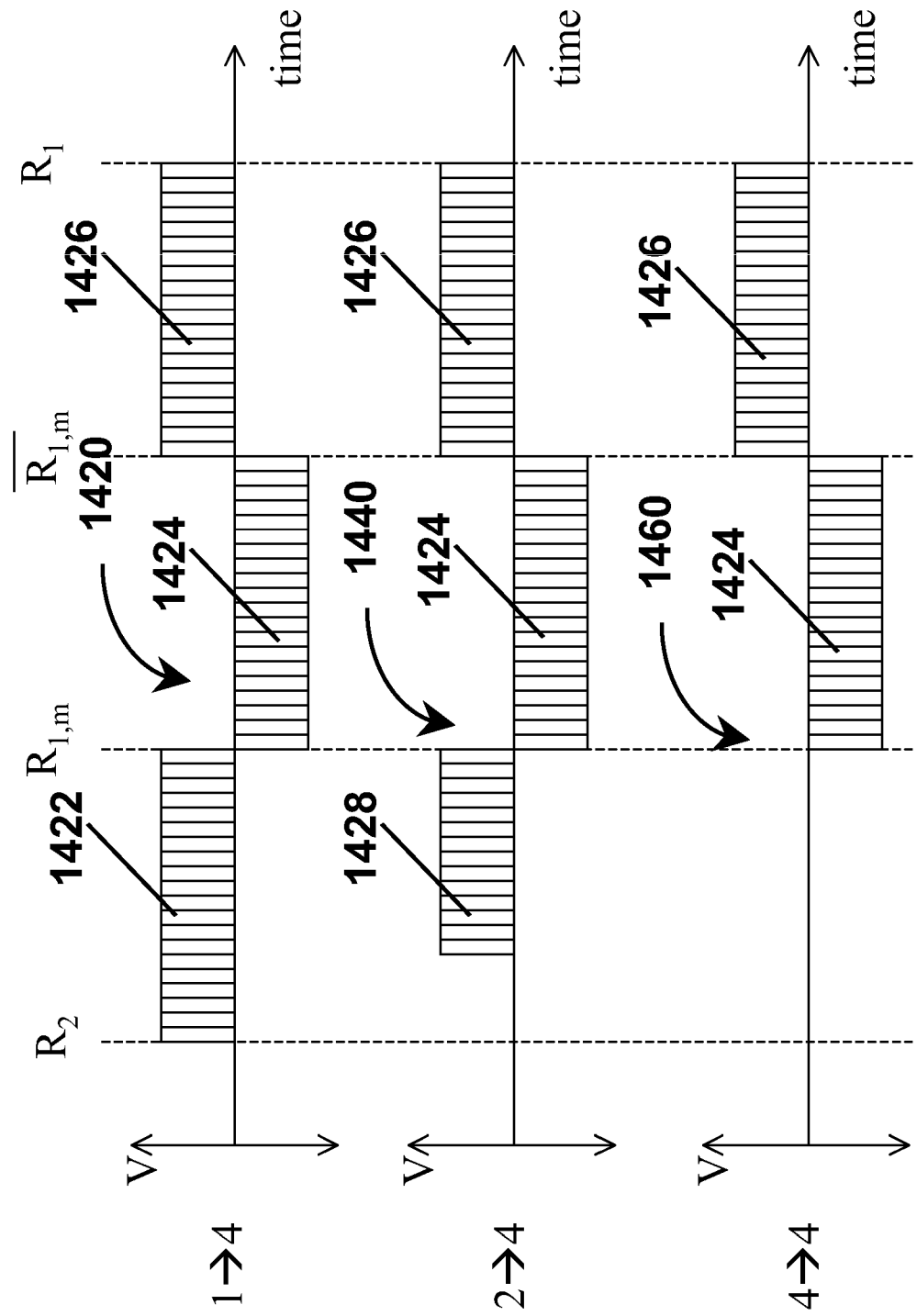

This deviation of the actual optical states of pixels from extreme optical states may be illustrated with reference to FIGS. 14 and 15, which show waveforms used for certain selected transitions in an two reset pulse slide show IMP method of the present invention using a four gray level electro-optic medium which can be driven from black (gray level 1) to white (gray level 4) using a +15 V 200 msec pulse, and from white to black using a −15V 200 msec pulse. The first waveform (generally designated 1420) shown in FIG. 14 is for the black (gray level 1) to white (gray level 4) transition, and comprises a first reset pulse 1422, which drives the pixel from black to white, a second reset pulse 1424, which drives the pixel from white to black, and a set pulse 1426, which drives the pixel from black to white. FIG. 14 also shows a waveform 1440 for the gray level 2 (dark gray) to gray level 4 (white) transition; this waveform 1440 has a first reset pulse 1428 which is only 140 msec in length, rather than 200 msec as in the case of reset pulse 1422 of waveform 1420. The second reset pulse 1424 and the set pulse 1426 of waveform 1440 are identical to those of waveform 1420. Finally, FIG. 14 also shows a waveform 1460 for the gray level 4 (white) to gray level 4 transition; in this case, the first reset pulse is of zero duration (i.e., there is simply a 200 msec period of zero voltage at the beginning of the waveform) but the second reset pulse 1424 and the set pulse 1426 of waveform 1460 are identical to those of waveform 1420.

FIG. 15 shows additional waveforms from the same drive scheme as in FIG. 14. The first waveform (generally designated 1480) shown in FIG. 15 is for the gray level 1 (black) to gray level 1 transitions and, is essentially the inverse of waveform 1460 shown in FIG. 14. Waveform 1480 has a first reset pulse is of zero duration (i.e., there is simply a 200 msec period of zero voltage at the beginning of the waveform), a second reset pulse 1482, which drives the pixel from black to white, and a set pulse 1484, which drives the pixel from white to black. FIG. 15 also illustrates a waveform 1500 used for the gray level 1 (black) to gray level 3 (light gray) transition. This waveform 1500 has a first reset pulse 1422 which is identical to that of waveform 1420 shown in FIG. 14 and drives the pixel from black to white. Waveform 1500 also has a second reset pulse 1502, which drives the pixel from white to black, and a 130 msec set pulse 1504, which drives the pixel from black to gray level 3 (light gray). Finally, for completeness, FIG. 15 repeats the black to white (gray level 1 to gray level 4) waveform from FIG. 14.

From FIGS. 14 and 15, it will be seen that the drive scheme illustrated is an IMP drive scheme in that, as indicated by the over-lined R1, m immediately before the set pulses in the various waveforms, the image on the display immediately before the set pulses is an inverse monochrome projection of the final image after the set pulses; more specifically, in all transitions which end at gray level 3 or 4, the pixel is black immediately before the set pulse, whereas for all transitions which end at gray level 1 or 2, the pixel is white immediately before the set pulses. Furthermore, in accordance with the preferred variant of the IMP method, as indicated by the R1, m immediately before the second reset pulses in the various waveforms, the image on the display immediately before the second reset pulses is an monochrome projection of the final image after the set pulses; more specifically, in all transitions which end at gray level 3 or 4, the pixel is white immediately before the second reset pulse, whereas for all transitions which end at gray level 1 or 2, the pixel is black immediately before the second reset pulse.

However, it can be deduced from FIGS. 14 and 15 that the reflectance of a given gray level achieved at various points in the various waveforms is not necessarily precisely the same, although the differences between pixels supposedly at the same gray level will be small relative to the total dynamic range (the difference between the reflectances of the two extreme optical states) of the display. For example, immediately before the second reset pulse, pixels undergoing waveforms 1420 and 1460 in FIG. 14 should both be at gray level 4 (white). However, a pixel undergoing waveform 1420 will at this point have just completed a black-to-white transition, whereas a pixel undergoing the waveform 1460 may have been in the white state for some time and (as discussed in some of the aforementioned MEDEOD applications) there is a tendency for optical states of bistable electro-optic media to "drift" (i.e., change gradually with time) while they are not being driven. Hence, the actual white state of a pixel undergoing the waveform 1460 may differ slightly that of a freshly re-written pixel undergoing the waveform 1420. Modifications to an IMP drive scheme, such as those discussed below, may modify the reflectances achieved at the various goal states and other points in waveforms, and thus the reflectance of the various goal and other states can deviate considerably from the reflectance at the goal state one would have achieved without such modification.

Although the IMP drive scheme illustrated in FIGS. 14 and 15 uses only two reset pulses and thus two goal states, the IMP aspect of the present invention is of course not confined to a specific number of reset pulses and goal states; for example, FIG. 16 illustrates symbolically, in the same way as FIG. 12, an IMP drive scheme which includes intermediate black (B) and white (W) states prior to the monochrome projection and inverse monochrome projection goal states.

It should be noted that not all pixels of a display necessarily reach a given goal state (for example, the inverse monochrome projections goal state) at the same point in time during rewriting of a display from an initial image to a desired final image. The time point in a transition at which the goal states are reached are functions of the initial and desired final gray levels, R2 and R1, respectively. Ideally (and as normally illustrated herein), the time points for R2 and R1 match, with the entire display being driven through various goal states, and these goal states being reached simultaneously by all pixels. However, it is often desirable to shift the relative timing of the various waveforms of a drive scheme. Time shifting of the waveforms may be done for aesthetic reasons, for example, to improve the appearance of the transition or the appearance of the resulting image. Also, modifications such as those discussed below may shift the relative time positions of the goal states, so that for various combinations of R1 and R2, the goal states are reached at different times during a transition.

It is possible to give an alternative definition of an IMP drive scheme without explicit reference to inverse monochrome projections. An IMP drive scheme is one in which the various gray levels of a display can be divided by a threshold such that one extreme optical state and at least one non-extreme optical state lie on each side of the threshold, and the set pulses of a slide show drive scheme are defined such that each set pulse effects a transition across the threshold. As this definition makes clear, in an IMP drive scheme, the final set pulse of each waveform drives the pixel to the desired final gray level from the extreme optical state further from this desired final gray level, where "further" is used to indicate "on the opposed side of the threshold" rather than simply counting the number of gray levels difference between the desired final gray level and the two extreme optical states.

It has been found that IMP drive schemes allow precise control of final gray levels and offer wide temperature performance ranges. It is believed (although the invention is in no way limited by this belief) that these advantages are linked to the relatively long set pulses used to drive from the "further" extreme optical state to the final gray level, and the consequent relatively constant power drain on the drive electronics during display updating.

The basic IMP drive schemes described above can usefully be modified in several different ways to make small adjustments in the final gray levels achieved, to change the appearance of the display during transitions and to achieve desirable image quality.

The first type of modification of IMP drive schemes is insertion or excision of balanced pulse pairs, and/or insertion of period of zero voltage into the waveforms, in a manner similar to that effected in BPPSS drive schemes, as discussed in Section A above. The balanced pulse pairs used may, for example, have any of the forms shown in FIGS. 4A-4C. The modifications of a basic IMP waveform to insert or excise BPP's or insert periods of zero voltage (pauses) may be effected in any of the ways previously described. A BPP may be inserted between two consecutive base waveform elements or within a single base waveform element. In many cases, this has the effect of increasing the pulse length both to and away from a particular goal state. An excised BPP may be replaced by a period of zero voltage, or other base waveform elements may be shifted in time to "close up" the period previously occupied by the excised BPP, and periods of zero voltage may be inserted at other points in the waveform. As in BPPSS drive schemes, the final gray level achieved is sensitive not only to the presence of BPP's and pauses in the waveform but also to their positioning within the waveform, with the general rule being that the earlier in a waveform a BPP is inserted or excised or a pause is inserted, the smaller the effect of the change on the final gray level.

It is important to realize that such waveform modifications will affect not only the reflectance not only of the final optical state (i.e., the final gray level), but also the intermediate goal states. While the goal states of a basic IMP waveform are generally near one of the extreme optical states (optical rails), and, by definition, are near the optical rails for the last goal state, or last two goal states in the preferred form of an IMP drive scheme, the modifications described above can shift the reflectance at a goal state away from an optical rail. It is the change in the degree of drive toward an optical rail that gives small adjustments in the final optical state (gray level).

It has been found desirable to keep the impulses of each of the voltage pulses comprising a BPP relatively small. The magnitude of a BPP may be defined by a parameter d, the absolute value of which describes the length of each of the two voltage pulses of a BPP, and the sign of which denotes the sign of the second of the two pulses. For example, the BPP's shown in FIGS. 4A and 4B can be assigned d values +1 and −1, respectively (while the BPP of FIG. 4C is then, in a consistent scheme, assigned a d value of −1 with a gap modification inserted between the two pulses). In a preferred embodiment of the IMP drive scheme, all BPP's used have d values whose magnitudes are less than PL, and preferably less than PL/2, where PL (in the same units used to measure the BPP's) is defined as the length of the voltage pulse required to drive a pixel from one extreme optical state to the other, or the average value of this voltage pulse where the lengths for transitions in the two directions are not the same, at a drive voltage characteristic of the drive scheme. In the example just given, d is expressed in units of display scan frames, and the BPP's of FIGS. 4A and 4B have voltage pulses each one scan frame in length. In this case, PL would also be defined in scan frames. All quantities could of course alternatively be expressed in a time unit, such as seconds or milliseconds.

Figure 17:
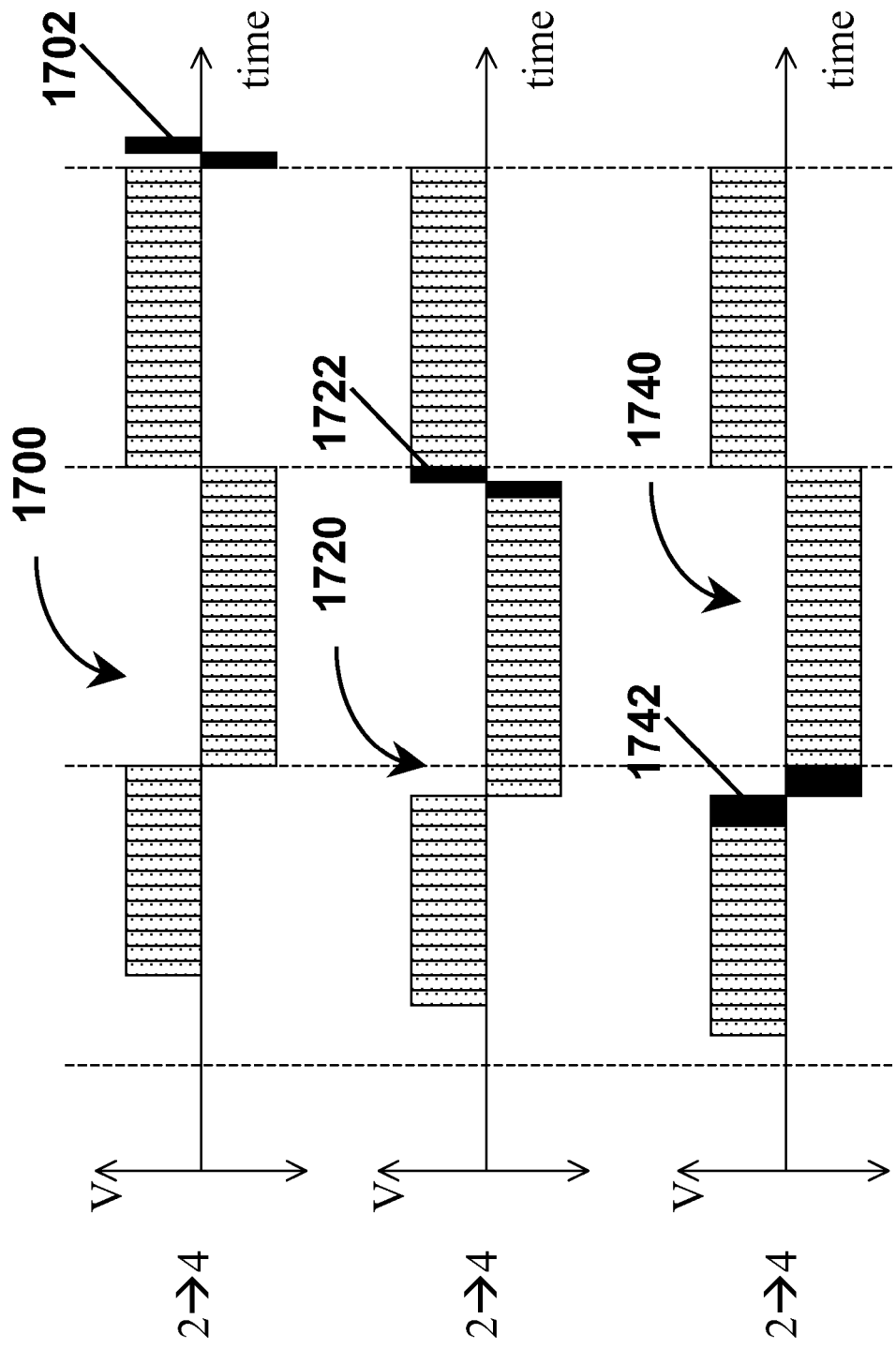
FIG. 17 illustrates modifications of one of the IMP waveforms shown in FIG. 14 by insertion of balanced pulse pairs into the waveform.

FIG. 17 of the accompanying drawings illustrates three waveforms produced by modifying the IMP waveform 1440 shown in FIG. 14 by insertion of a BPP. The first waveform (generally designated 1700) shown in FIG. 17 is identical to waveform 1440 except that a BPP 1702, comprising a −15V 10 msec pulse followed by a +15V 10 msec pulse is inserted at the end of the waveform. The second waveform (generally designated 1720) shown in FIG. 17 inserts a BPP 1722, identical to the BPP 1702, but inserted between the second reset pulse and the set pulse of the waveform; to accommodate BPP 1722, the two reset pulses are shifted earlier in time by 20 msec, with a corresponding reduction in the period of zero voltage at the beginning of the waveform. The third waveform (generally designated 1740) shown in FIG. 17 has a BPP 1742 inserted between the first and second reset pulses of the waveform; BPP 1742 has the order of its pulses reversed as compared with BPP's 1702 and 1722 and each pulse is 20 msec in length. To accommodate BPP 1742, the first reset pulse is shifted earlier in time by 40 msec, with a corresponding reduction in the period of zero voltage at the beginning of the waveform.

Figure 18:
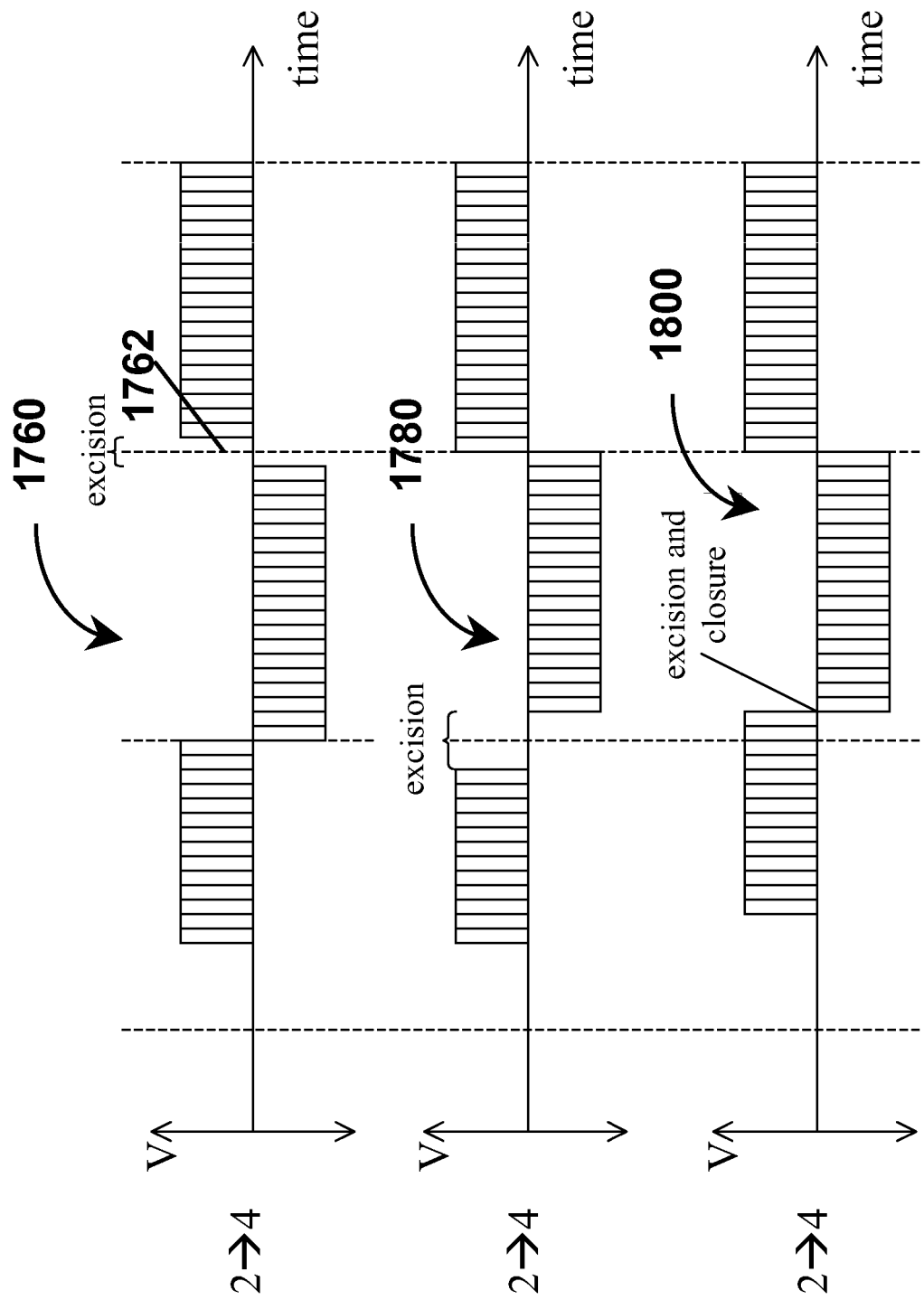
FIG. 18 illustrates modifications of one of the IMP waveforms shown in FIG. 14 by excision of balanced pulse pairs from the waveform.

FIG. 18 of the accompanying drawings illustrates three waveforms produced by modifying the IMP waveform 1440 shown in FIG. 14 by excision of a BPP therefrom. The first waveform (generally designated 1760) shown in FIG. 18 is produced by excising from waveform 1440 a BPP 1762 comprising the last 10 msec scan frame of the second reset pulse and the first scan frame of the set pulse, with no change in the remaining waveform elements. The second waveform (generally designated 1780) shown in FIG. 18 is similarly produced by excising from waveform 1440 a BPP 1782 comprising the last two scan frames of the first reset pulse and the first two scan frames of the second reset pulse, with no change in the remaining waveform elements, thus leaving a 40 msec period of zero voltage at the point occupied by the excised BPP. Finally, the third waveform (generally designated 1800) shown in FIG. 18 is produced by excising from waveform 1440 a BPP comprising the last scan frame of the first reset pulse and the first scan frame of the second reset pulse, and closing up the resultant gap by moving the remaining scan frames of the first reset pulse 20 msec later in time, with a corresponding increase in the period of zero voltage at the beginning of the waveform.

Figure 19:
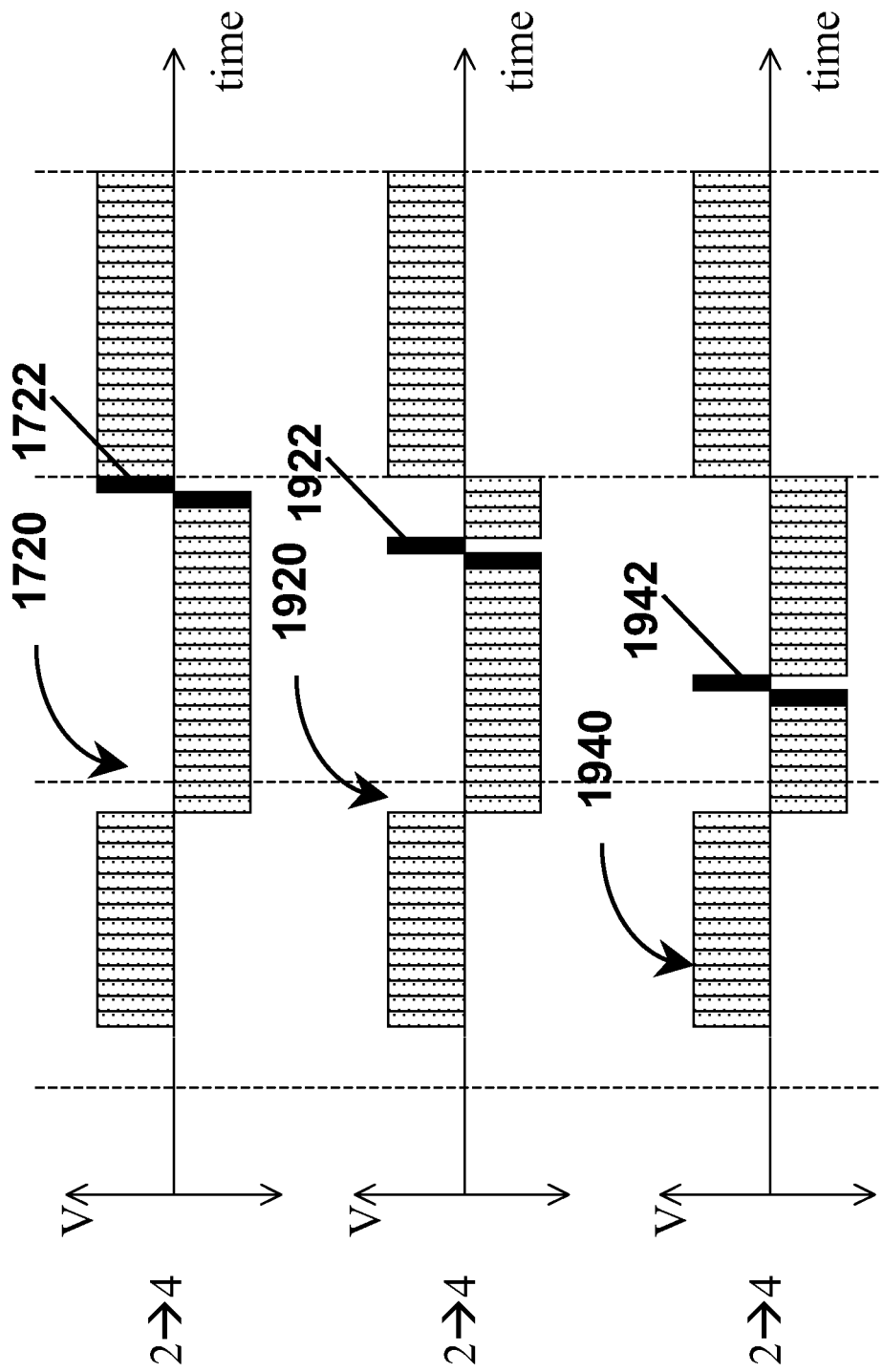
FIG. 19 illustrates further modifications of one of the IMP waveforms shown in FIG. 17 by variation in the position of insertion of the balanced pulse pair.

FIG. 19 of the accompanying drawings illustrates possible further modification of the waveform 1720 shown in FIG. 17. The upper part of FIG. 19 repeats the basic waveform 1720, including BPP 1722, from FIG. 17. FIG. 19 also illustrates a modified waveform (generally designated 1920) which comprises a BPP 1922 similar to BPP 1722 but inserted 40 msec earlier in time, before the last four scan frames of the second reset pulse. FIG. 19 also illustrates a second modified waveform (generally designated 1940) which comprises a BPP 1942 similar to BPP 1722 but inserted 130 msec earlier in time, before the last thirteen scan frames of the second reset pulse. As already noted, the final gray level achieved by waveforms such as those shown in FIG. 19 is a function of the position of insertion of the balanced pulse pair, so modifications such as those shown in FIG. 19 can be used for fine tuning of the final gray level.

Figure 20:
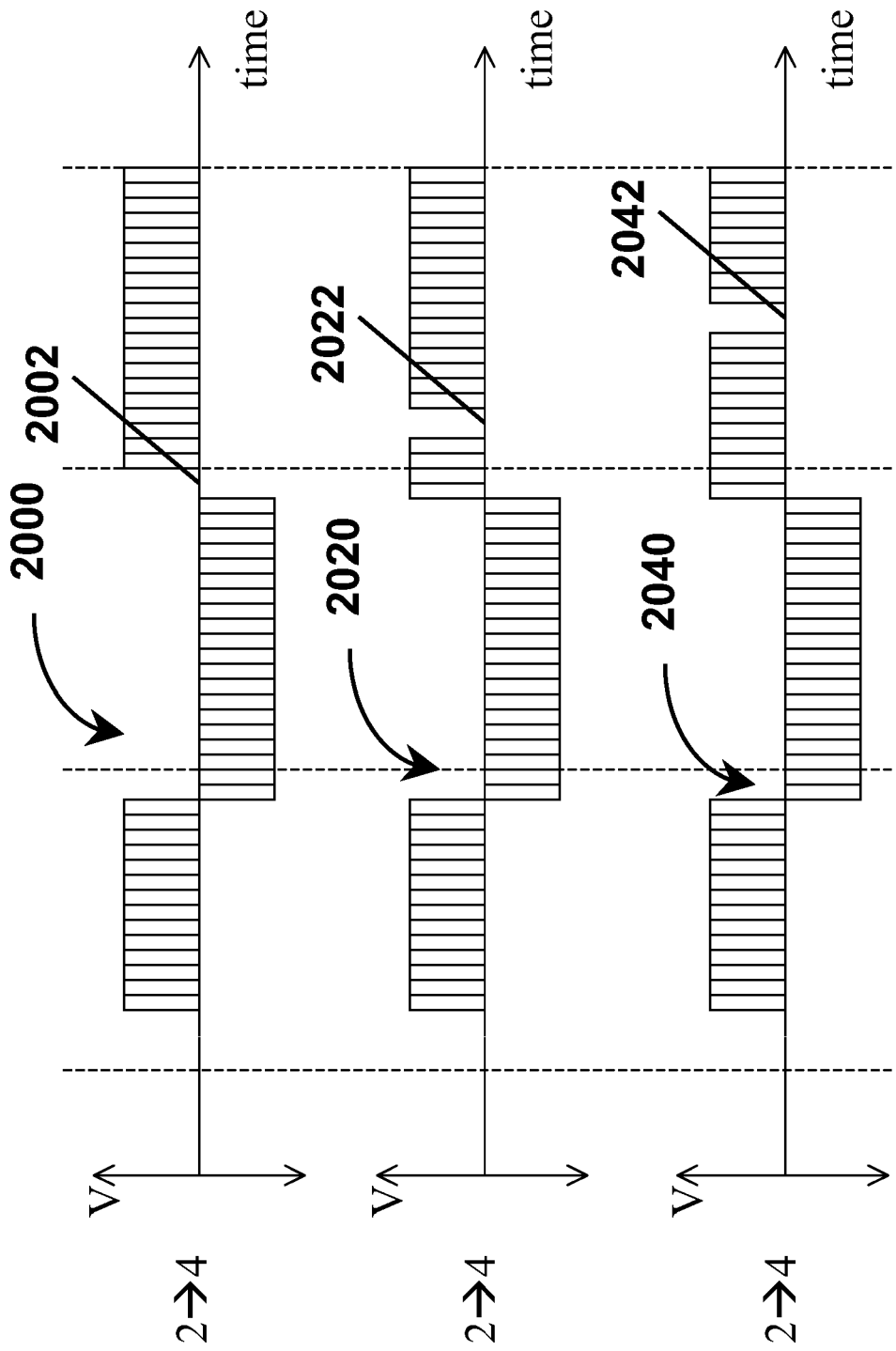
FIG. 20 illustrates further modifications of one of the IMP waveforms shown in FIG. 18 by variation in the position from which the balanced pulse pair is excised.

FIG. 20 of the accompanying drawings illustrates modified IMP waveforms produced by inserting periods of zero voltage (pauses) into the basic IMP waveform 1440 shown in FIG. 14. The first waveform (generally designated 2000) shown in FIG. 20 is produced by inserting a 20 msec pause (denoted 2002) between the second reset pulse and the set pulse of the waveform, with the two reset pulses shifted 20 msec earlier in time, and with a corresponding reduction in the period of zero voltage at the beginning of the waveform. The second waveform (generally designated 2020) shown in FIG. 20 is generally similar to waveform 2000 but waveform 2020 has its pause (denoted 2022) inserted 40 msec later than pause 2002, after the first four scan frames of the set pulse. The third waveform (generally designated 2040) shown in FIG. 20 is also generally similar to waveform 2000 but waveform 2040 has its pause (denoted 2042) inserted 130 msec later than pause 2002, after the first thirteen scan frames of the set pulse. In both waveforms 2020 and 2040, the scan frames of the set pulse preceding the pause 2022 or 2042 respectively are moved earlier in time by 20 msec, as compared with waveform 2000, to accommodate the pause. As already mentioned, the final gray level achieved by the waveform is sensitive to both the presence and the location of pauses, so modifications of a base waveform such as those shown in FIG. 20 can be used to fine tune the final gray level produced by the waveform.

As already noted, it is desirable that IMP drive schemes be DC balanced, in the sense that for any gray level loop (i.e., any sequence of gray levels beginning and ending at the same gray level), the algebraic sum of the impulses applied to a pixel is zero. Example of gray level loops are:

$1 \rightarrow 1$
$2 \rightarrow 3 \rightarrow 2$
$4 \rightarrow 4 \rightarrow 3 \rightarrow 2 \rightarrow 4$.

As discussed in Application Ser. No. 60/595,729, filed Aug. 1, 2005 (the entire disclosure of which is herein incorporated by reference), one can define an irreducible gray level loop as a sequence of gray levels, starting at a first gray level, passing through zero or more gray levels to end up at the first gray level, and not visiting any gray level more than once, except for the final gray level, which as already noted must be the same as the first. Obviously, for any gray scale, there are a finite number of irreducible loops. Furthermore, it can be shown that any sequence of gray levels, for example the complex sequence:

$1 \rightarrow 4 \rightarrow 3 \rightarrow 2 \rightarrow 3 \rightarrow 2 \rightarrow 3 \rightarrow 2 \rightarrow 1 \rightarrow 2 \rightarrow 1$ can be reduced to sequences of irreducible loops and irreducible loops embedded within irreducible loops. For example, the above sequence can be decomposed into a finite set of irreducible loops, namely two consecutive $2 \rightarrow 3 \rightarrow 2$ loops embedded into a $1 \rightarrow 4 \rightarrow 3 \rightarrow 2 \rightarrow 1$ loop, and followed by the loop $1 \rightarrow 2 \rightarrow 1$.

If all irreducible loops are DC balanced, all possible sequences that start and end at the same gray level are DC balanced. The preferred embodiment of the IMP drive scheme is one in which the net voltage impulses for all irreducible loops are zero, that is, the waveform is DC balanced.

It is not absolutely necessary to DC balance an IMP waveform. While large DC imbalances cause the imaging performance of the display to suffer, small amounts of DC imbalance can be acceptable. When it is not possible to achieve complete DC balancing, IMP drive schemes are desirably controlled so that the net impulse of any irreducible loop divided by the number of transitions in that loop is less than Q, where Q is one fourth of the lesser of the absolute values of the net impulses for transitions between the two extreme optical states of a pixel, where the impulse is determined using a characteristic voltage of the drive scheme. The net impulse required to drive the imaging film from one extreme optical state to the other represents a characteristic impulse of a medium and near DC imbalance should be measured relative to this characteristic impulse.

It is also often desirable that an IMP drive scheme be of the "picket fence" type. As described in the aforementioned MEDEOD applications, it is often necessary or desirable to drive electro-optic displays using drive circuitry which can supply only two drive voltages. Since bistable electro-optic media normally need to be driven in both directions between their extreme optical states, it might at first appear that at least three drive voltages would be required, namely 0, +V and −V, where V is an essentially arbitrary drive voltage, so that one electrode for a specific pixel (typically the common front electrode in a conventional active matrix display) could be held at 0, while the other electrode (typically the pixel electrode for that pixel) can be held at +V or −V depending upon the direction in which the pixel needs to be driven. When two-voltage drive circuitry is used, each waveform of a drive scheme is divided into time segments; typically these time segments are of equal duration, but this is not necessarily the case. In a non-picket fence drive scheme, there may be applied to any specific pixel, in any time segment, a positive, zero or negative driving voltage. For example, in a three drive voltage system, the common front electrode may be held at 0, while the individual pixel electrodes are held at +V, 0 or −V. In a picket fence drive scheme, each time segment is in effect divided into two; in one of the two resultant segments, there may be applied to any specific pixel only a negative or zero driving voltage, while in the other resultant segment, there may be applied to any specific pixel only a positive or zero driving voltage. For example, consider a two driving voltage system having driving voltages V and v, where V>v. In the first of each pair of segments, the common front electrode is set to V, and the pixel electrodes to either V (zero driving voltage) or v (negative driving voltage). In the second of each pair of segments, the common front electrode is set to v, and the pixel electrodes to either v (zero driving voltage) or V (positive driving voltage). The resultant waveform is twice as long as the corresponding non-picket fence waveform.

It is also often desirable that an IMP drive scheme be capable of local updates. As described in the aforementioned MEDEOD applications, it is often desirable to drive electro-optic displays in a manner which permits local updating of a specific area of the display which is undergoing changes while the rest of the display remains unchanged; for example, it may be desirable to update a dialogue box in which a user is entering text without updating the background image on the display. A local update version of any IMP drive scheme can be created by removing all non-zero voltages from the waveforms for zero transitions (i.e., transitions from one gray level to the same gray level). For example, the waveform from gray level 2 to gray level 2 normally is composed of a series of voltage pulses. Removing the non-zero voltages from this waveform, and doing so for all other zero transitions, results in a local update version of the IMP waveform. Such a local update version can be advantageous when it is desired to minimize extraneous flashing during transitions.

The following experiments illustrate the use of the modifications discussed above in fine control of gray levels produced by an IMP drive scheme.

Figure 21:
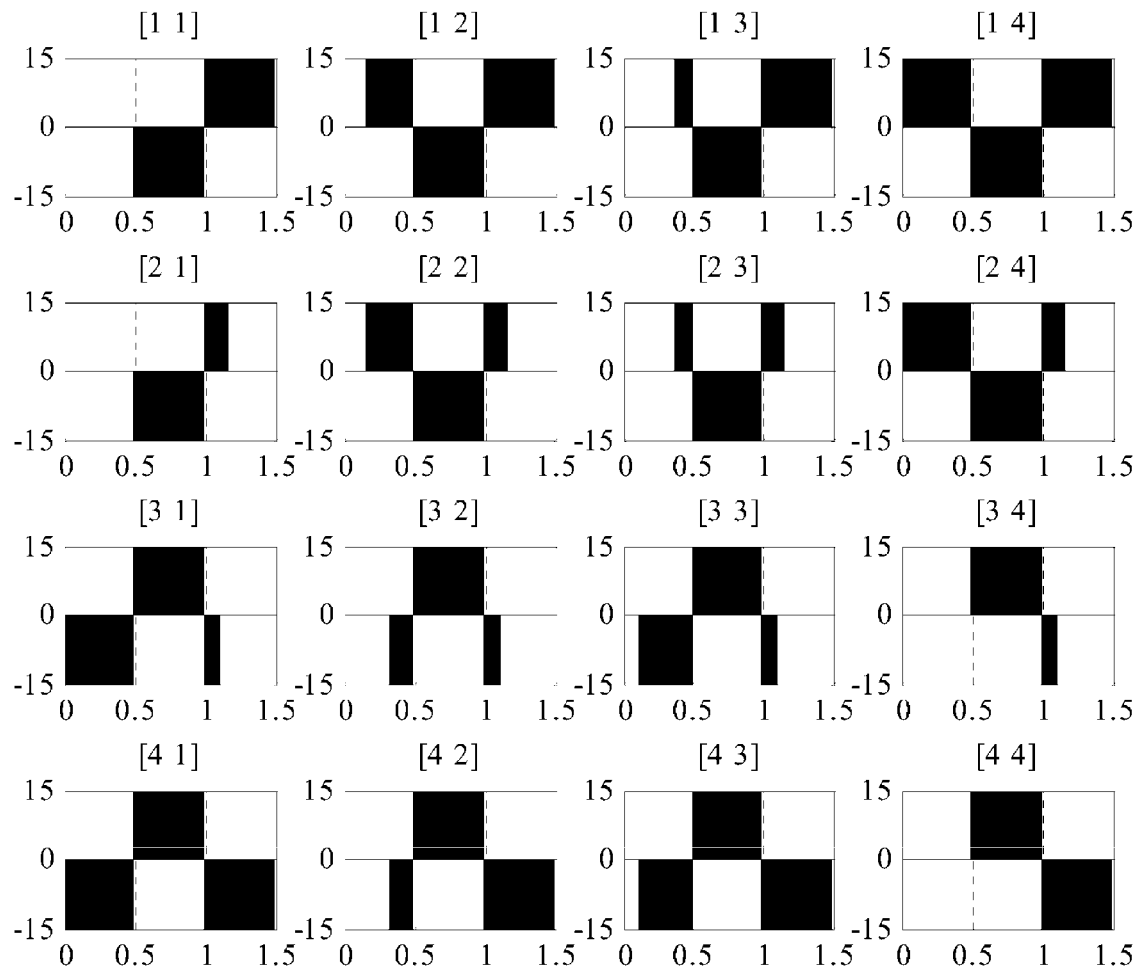
FIG. 21 illustrates, in a highly schematic manner, the waveforms of a further IMP drive scheme of the present invention.

An encapsulated electrophoretic medium comprising an internal phase, comprising polymer-coated titania and polymer-coated carbon black particles in a hydrocarbon liquid, encapsulated in gelatin/acacia capsules, was prepared and incorporated into experimental single-pixel displays, all substantially as described in Paragraphs [0069] to [0076] of the aforementioned 2002/0180687. The experimental displays were then driven using a four gray level IMP drive scheme. It was found that the displays could driven from gray level 4 (white) to gray level 1 (black) by a +15V, 500 msec pulse, and the reverse transition effected by a −15V, 500 msec pulse, and a basic two reset pulse IMP drive scheme was constructed accordingly. FIG. 21 of the accompanying drawings shows, in a highly schematic manner, all sixteen waveforms of this basic IMP drive scheme, which are labeled as [R1 R2] so that the first number given represents the final gray state. For example, the [1 4] waveform shown in the upper right hand corner of FIG. 21 effects the transition from gray level 4 (white) to gray level 1 (black) and comprises a first +15 V 500 msec reset pulse, which drives the pixel black, a second −15 V 500 msec reset pulse, which drives the pixel white, and a +15 V 500 msec set pulse, which drives the pixel black.

Figure 22:
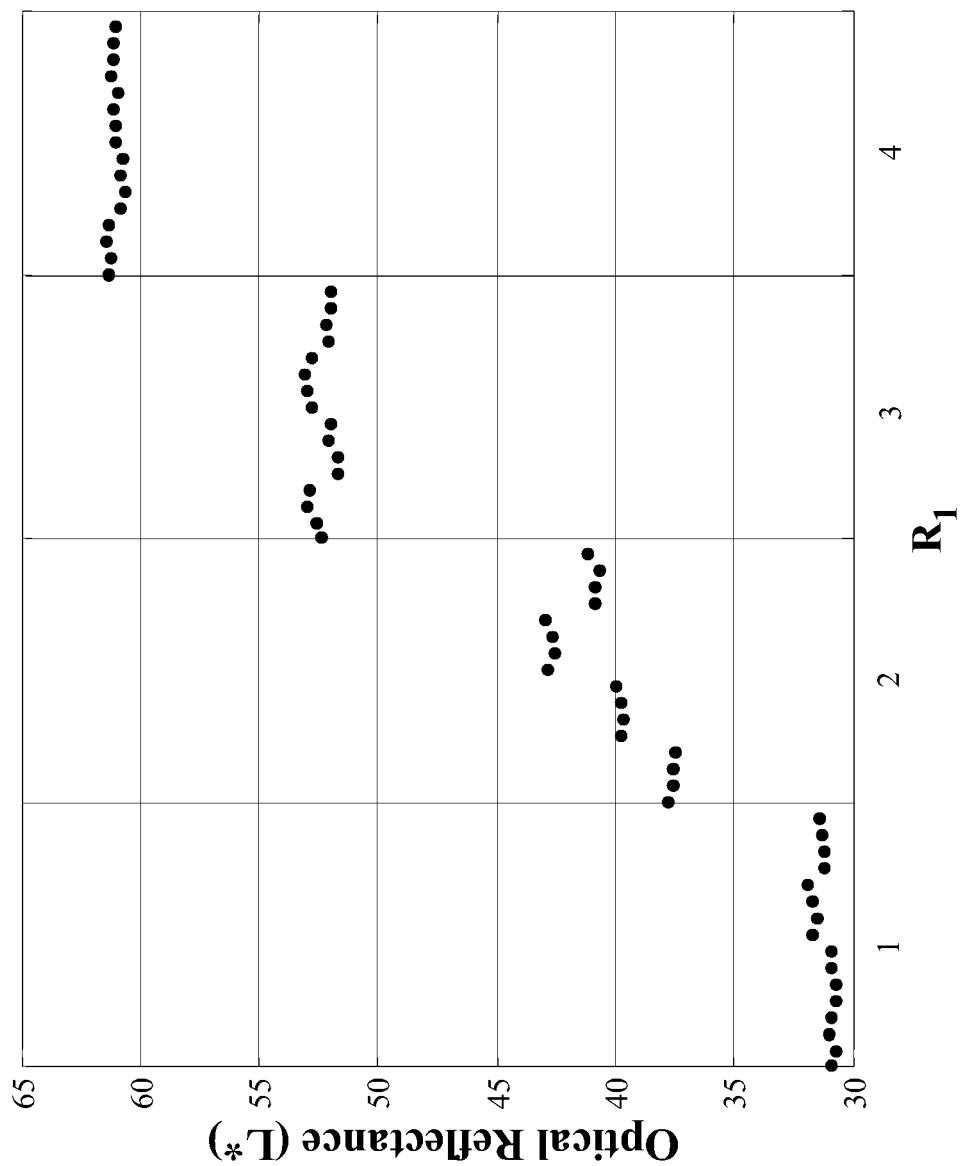
FIG. 22 is a graph showing the gray levels produced by the drive scheme shown in FIG. 21.

An experimental display was driven using this basic IMP drive scheme through varying sequences of gray levels and the reflectance of the display measured at the conclusion of each sequence; the results are shown in FIG. 22. Each point in FIG. 22 represents a reflectance following a different sequence of gray levels prior to reaching the final gray level shown on the abscissa. It will be seen from FIG. 22 that the reflectances achieved at the same nominal gray level varied considerably, and such variation if of course undesirable since it adversely affects the quality of the image produced by a multi-pixel display. In particular, the human eye is very sensitive to minor variations in gray level occurring within a block of pixels which are supposed to be at the same gray level, and FIG. 22 indicates that such variation could be expected as a result of differences in the prior gray levels of the pixels.

Figure 23:
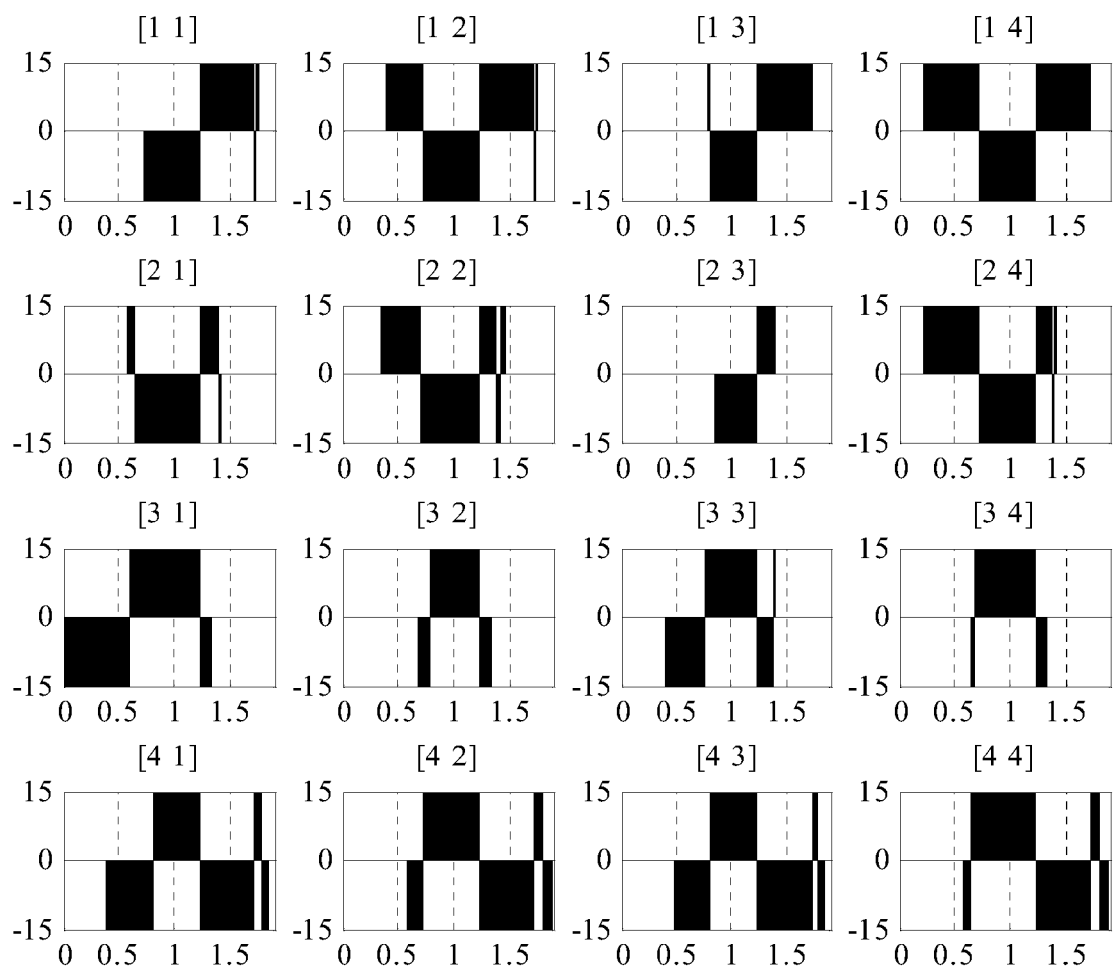
FIG. 23 illustrates, in the same manner as FIG. 21, a modified form of the IMP drive scheme shown in FIG. 21.
Figure 24:
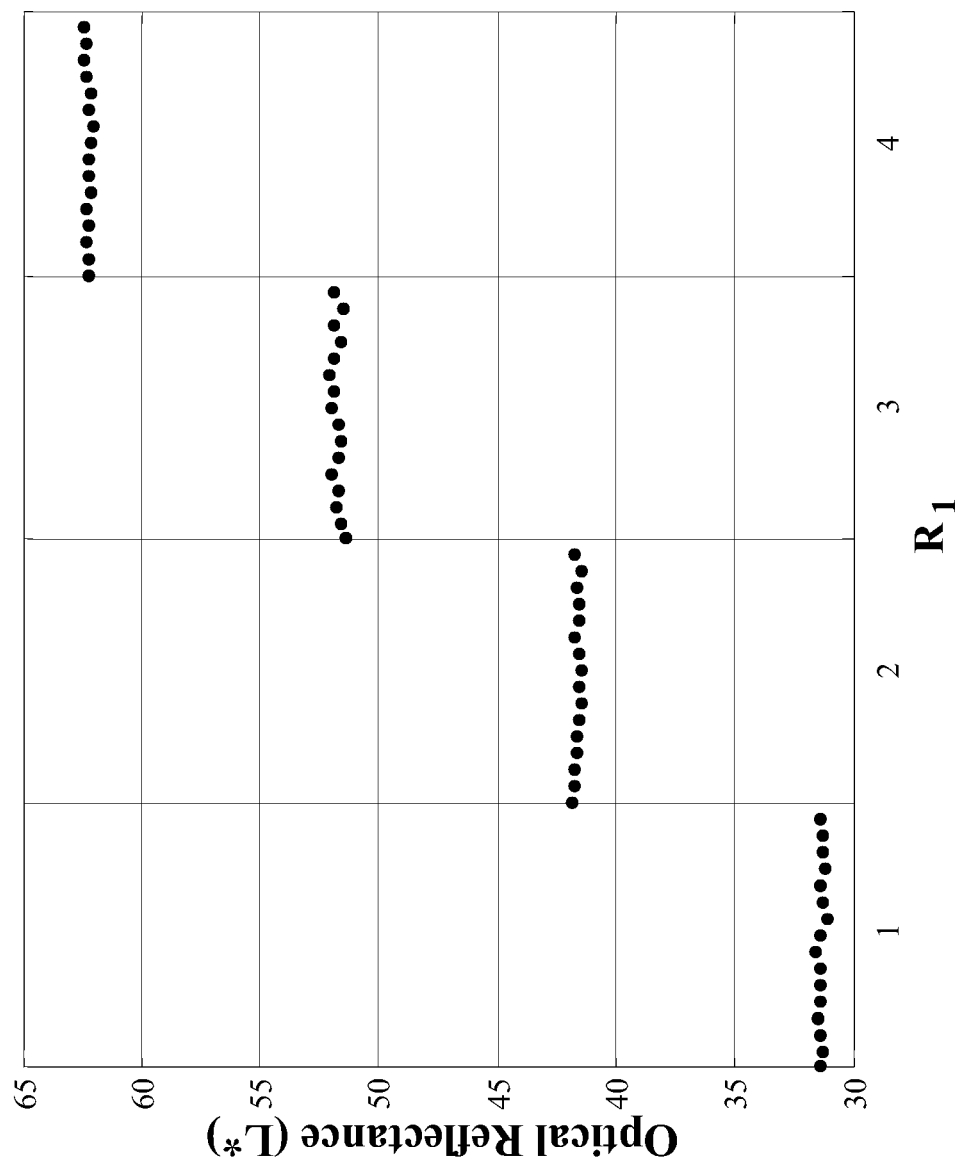
FIG. 24 is a graph showing the gray levels produced by the modified drive scheme shown in FIG. 23.

The IMP drive scheme was then modified in the manner described above by insertion and excision of balanced pulse pairs (with closing up of the resultant gaps in the case of excision) and insertion or removal of periods of zero voltage at the beginning or end of various waveforms, in order to achieve consistent gray levels after various gray level sequences, to produce the modified IMP drive scheme shown in FIG. 23. FIG. 24 shows the gray levels produced by the modified IMP drive scheme of FIG. 23 using the same gray level sequences as in FIG. 22. It will be seen from FIG. 24 that the modified IMP drive scheme of FIG. 24 produced much more consistent gray levels than the unmodified drive scheme of FIG. 21.

Section C: Balanced Pulse Pair Dwell Time Compensation Method and Apparatus

As already mentioned, in a third aspect, this invention provides a method for driving an electro-optic display having at least one pixel capable of achieving at least two different gray levels. In this method, at least two different waveforms are used for the same transition between specific gray levels depending upon the duration of the dwell time of the pixel in the state from which the transition begins; these two waveforms differ from each other by at least one insertion and/or excision of at least one balanced pulse pair, or insertion of at least one period of zero voltage, where "balanced pulse pair" has the meaning previously defined. It is very much preferred that in such a method the drive scheme be DC balanced as that term has been defined above.

In such a balanced pulse pair dwell time compensation (BPPDTC) method (as in the BPPSS and IMP methods already described), the insertion or excision of the balanced pulse pair and/or of the zero voltage period (pause) may be effected either within a single waveform element or between two successive waveform elements. The two waveforms used for the same transition following differing dwell times in the initial state from which the transition begins may be referred to hereinafter as the "alternative dwell time" or "ADT" waveforms.

It should be noted that ADT waveforms may differ from one another by the location and/or duration of a BPP or pause within a waveform (see, for example, the discussion of FIGS. 25B-25E below), since such movement of a BPP or pause may be formally regarded as a combination of an excision of a BPP or pause at one location and an insertion of the BPP or pause at a different location, or (in the case of a change of duration at the same location) as a combination of an excision of a BPP or pause at the location and an insertion of a different BPP or pause at the same location.

In a BPPDTC drive scheme, the insertion of excision of BPP's and/or pauses raises the same problems, and may be handled in the same way, as in the BPPSS and modified IMP drive schemes described in Sections A and B above. Thus, where the difference between the ADT waveforms in accordance with the BPPDTC aspect of the present invention includes excision of at least one BPP, the period formerly occupied by the or each excised BPP may be left as a period of zero voltage. Alternatively, this period may be "closed up" by moving some or all of the later waveform elements earlier in time, normally with insertion of a period of zero voltage at some later stage in the waveform, typically at the end thereof, in order to ensure that the overall length of the waveform is maintained. (In any practical display, which will normally have at least several thousand pixels, in any transition there will normally be at least one pixel undergoing every possible transition, and if the waveforms for all pixels are not of the same length, controller logic becomes extremely complicated.) Alternatively, of course, the period may be "closed up" by moving some or all of the earlier waveforms elements later in time, with insertion of a period of zero voltage at some earlier stage of the waveform, typically at the beginning thereof.

Similarly, inserting a BPP adds to the total duration of a waveform unless an existing period of zero voltage can simultaneously be removed. Since all waveforms of a drive scheme very desirably have the same overall length, when one waveform of a drive scheme has a BPP inserted, all the other waveforms of the drive scheme should have a period of zero voltage added to them, or some other modification made, to compensate for the increase in overall waveform length caused by the insertion of the BPP. For example, if a 40 msec BPP is inserted into the black-to-white waveform shown in Table 1 above (which has a waveform length of 420 msec), 40 msec pauses could be added to the remaining three waveforms shown in Table 1 so that all the waveforms have a length of 460 msec. Obviously, if appropriate, BPP's could be added to the other three waveforms rather than pauses, or some combination of BPP's and pauses totaling 40 msec could be used.

Preferred drive schemes and waveforms of the BPPDTC aspect of the present invention will now be described, though by way of illustration only. The balanced pulse pairs used in such drive schemes and waveforms may be of any of the types described above; for example, the types of BPP's shown in FIGS. 4A-4C may be used.

FIGS. 25A-25E illustrate alternative dwell time waveforms which may be used for a single transition in accordance with the BPPDTC aspect of the present invention. FIG. 25A illustrates the black-to-white waveform mentioned in the third line of Table 1 and the last line of Table 2 above. Since this is the waveform appropriate for the black-to-white transition after a long dwell time in the black state, it may be regarded as the base black-to-white waveform which is modified in accordance with the BPPDTC aspect of the present invention to produce waveforms appropriate for the black-to-white transition after shorter dwell times in the black state. As already noted, the base waveform of FIG. 25A consists of a −15V, 400 msec pulse followed by 0 V for 20 msec.

FIG. 25B illustrates a modification of the base waveform of FIG. 25A which has been found effective to decrease the reflectance of the final white state when a black-to-white transition is effected after only a short dwell time of not more than 0.3 seconds in the initial black state. The waveform of FIG. 25B is produced by inserting a BPP similar to BPP 300 shown in FIG. 4A at the end of the −15V, 400 msec pulse of the waveform of FIG. 25A, so that the waveform of FIG. 25B comprises a −15V, 420 msec pulse, followed by a +15V, 20 msec pulse and 0 V for 20 msec.

FIGS. 25C and 25D illustrate two further ADT waveforms for the same black-to-white transition as the waveforms of FIGS. 25A and 25B. The waveforms of FIGS. 25C and 25D have been found effective to standardize the reflectance of the final white state when the black-to-white transition is effected after dwell times of 0.3 to 1 second, and 1 to 3 seconds, respectively, in the black state. The waveforms of FIGS. 25C and 25D are produced by inserting the same BPP as in FIG. 25B into the waveform of FIG. 25A, but at locations different from that used in FIG. 25B. As noted above, it has been found that the position at which a BPP is inserted into (or excised from) a base waveform has a significant effect on the final optical state following a transition, and hence that shifting the position of insertion of a BPP with a base waveform is an effective means for compensating the waveform for variations in the dwell time of the pixel in the initial optical state.

FIG. 25E is a preferred alternative to the waveform of FIG. 25A for effecting the black-to-white transition after long dwell times (3 seconds or greater) in the black state. The waveform of FIG. 25E is generally similar to those of FIGS. 25B-25D in that it is produced by inserting the same BPP into the waveform of FIG. 25A. However, in FIG. 25E, the BPP is inserted at the beginning of the waveform; it has also been found desirable to make the pulses of the BPP 40 msec rather than 20 msec in duration. Since this makes the overall duration of the waveform 500 msec, when the waveform of FIG. 25E is used in conjunction with the waveforms of FIGS. 25B-25D, it is necessary to "pad" the waveforms of FIGS. 25B-25D with an additional 40 msec of 0 V at the end of the waveform. Thus, a preferred set of ADT waveforms for the black-to-white transition is as shown in Table 3 below:

TABLE 3

| Dwell time | Waveform |
| --- | --- |
| 0 to 0.3 s (FIG. 25B, padded) | −15 V for 420 ms, 15 V for 20 ms, 0 V for 60 ms |
| 0.3 s to 1 s (FIG. 25C, padded) | −15 V for 220 ms, 15 V for 20 ms, −15 V for 200 ms, 0 V for 60 ms |
| 1 s to 3 s (FIG. 25D, padded) | −15 V for 20 ms, 15 V for 20 ms, −15 V for 400 ms, 0 V for 60 ms |
| 3 s or greater (FIG. 25E) | −15 V for 40 ms, 15 V for 40 ms, −15 V for 400 ms, 0 V for 20 ms |

Note that the impulse for the black-to-white transition is −15V*400 msec, or 6 V sec for all the ADT waveforms in Table 3, and thus for all initial state dwell times, so that the drive scheme is DC balanced.

As already mentioned, DTC can also be effected by excising BPP's from a base waveform. For example, consider the drive scheme shown in Table 4 below:

TABLE 4

| Transition | Waveform |
| --- | --- |
| black to black | 0 V for 820 ms |
| black to white | +15 V for 400 ms, −15 V for 400 ms, then 0 V for 20 ms |
| white to black | −15 V for 400 ms, +15 V for 400 ms, then 0 V for 20 ms |
| white to white | 0 V for 820 ms |

Note that, in this drive scheme, not merely the whole drive scheme but all waveforms are "internally" DC balanced; the desirability of such internal DC balancing is discussed in detail in the aforementioned copending application Ser. No. 10/814,205. Again, the method for DTC will be discussed with reference to the black-to-white transition, although it should be understood that DTC of the white-to-black transition can be effected in a similar manner.

In this case, DTC of the black-to-white transition is effected by excising BPP's, i.e., by removing a portion of one voltage pulse of one polarity and one duration while simultaneously removing a similar portion of one voltage pulse of the opposite polarity and equivalent duration. One can either replace the pulse sections that were excised with a period of zero voltage or the remaining parts of the waveform can be shifted in time to occupy the period previously occupied by the excised pulse pair, and, in order to maintain the total update time, a zero voltage segment matching the duration of the excised pair can be added elsewhere, typically at the beginning or end of the waveform.

Figure 26A:
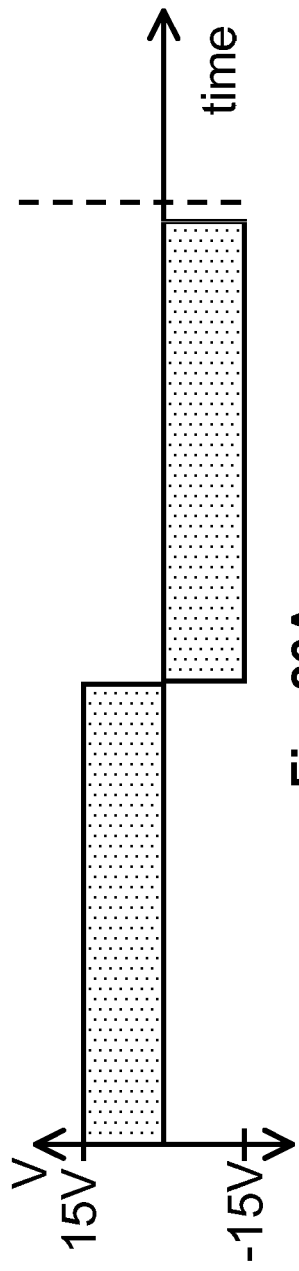
FIGS. 26A-26C illustrate a set of dwell time compensated waveforms used in a second dwell time compensation balanced pulse pair drive scheme of the present invention.
Figure 26B:
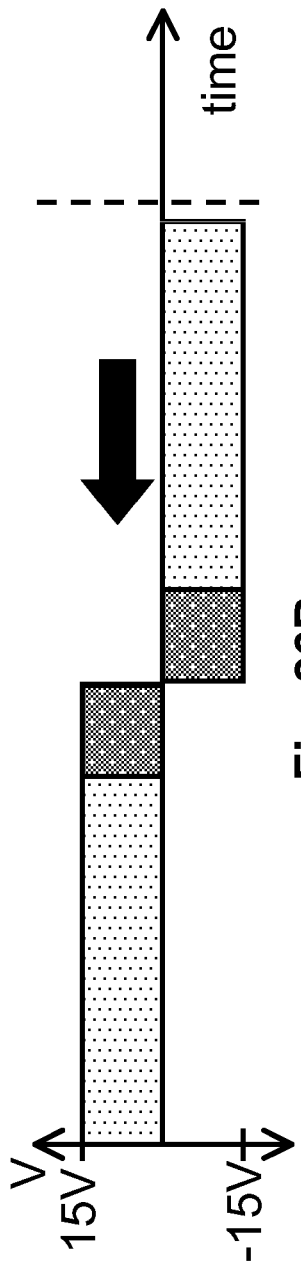
Figure 26C:
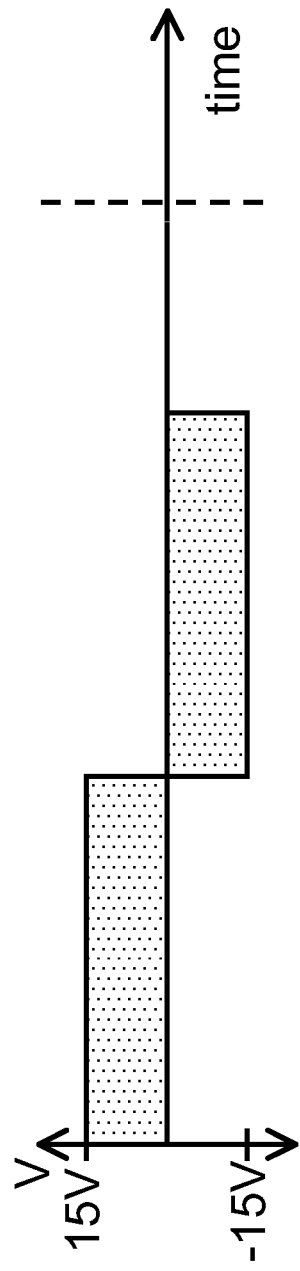

FIGS. 26A, 26B and 26C illustrate schematically this process for modification of the black-to-white waveform listed in the third row of Table 4 above for DTC at short dwell times of less than 0.3 seconds in the black state. FIG. 26A illustrates the base waveform from Table 4. FIG. 26B shows schematically excision of a BPP formed by the last 80 msec portion of the positive voltage pulse and the first 80 msec portion of the negative voltage pulse from the waveform of FIG. 26A, with the resultant gap being eliminated by shifting the negative pulse forward in time, as indicated by the arrow in FIG. 26B. The resultant dwell time compensated waveform, which comprises a 320 msec positive pulse, a 320 msec negative pulse and a 180 msec period of zero voltage, is shown in FIG. 26C.

In this case, it was found that DTC for all dwell times could be effected simply by varying the length of the excised BPP, and that for long dwell times of 3 seconds or more in the black state the base waveform of FIG. 26A was satisfactory. Hence the full list of ADT waveforms for the black-to-white transition in this case is as shown in Table 5 below:

TABLE 5

| Dwell time | Waveform |
| --- | --- |
| 0 to 0.3 s | +15 V for 320 ms, −15 V for 320 ms, then 0 V for 180 ms |
| 0.3 s to 1 s | +15 V for 360 ms, −15 V for 360 ms, then 0 V for 100 ms |
| 1 s to 3 s | +15 V for 380 ms, −15 V for 380 ms, then 0 V for 60 ms |
| 3 s or greater | +15 V for 400 ms, −15 V for 400 ms, then 0 V for 20 ms |

As already mentioned, when a BPP is excised from a base waveform in the manner shown in FIG. 26B, it is not essential that the remaining components be shifted in time; the excised BPP can simply be replaced by a period of zero voltage. Table 6 below shows a modified set of ADT waveforms similar to those in Table 5 but with the excised BPP's replaced with periods of zero voltage:

TABLE 6

| Dwell time | Waveform |
|---|---|
| 0 to 0.3 s | +15 V for 320 ms, 0 V for 160 ms, −15 V for 320 ms, then 0 V for 20 ms |
| 0.3 s to 1 s | +15 V for 360 ms, 0 V for 80 ms, −15 V for 360 ms, then 0 V for 20 ms |
| 1 s to 3 s | +15 V for 380 ms, 0 V for 40 ms, −15 V for 380 ms, then 0 V for 60 ms |
| 3 s or greater | +15 V for 400 ms, −15 V for 400 ms, then 0 V for 20 ms |

Although the BPPDTC aspect of the present invention has been described above primarily with reference to displays having only two gray levels, it is not so limited but may be applied to displays having a greater number of gray levels. Also, although in the specific waveforms illustrated in the drawings, insertion or excision of the two elements of a BPP has been effected at a single point within the waveform, the invention is not limited to waveforms in which insertion or excision of a BPP is effected at a single point; the two elements of a BPP may be inserted or excised at different points, i.e., the two pulses that make up a BPP do not have to be immediately sequential, but could be separated by a time interval. Furthermore, one or both pulses of a BPP could be subdivided into sections and these sections could be then inserted into or excised from a waveform for DTC. For example, a BPP may be composed of a +15 V, 60 msec pulse and a −15 V, 60 msec pulse. This BPP could be divided into two components, for example a +15 V, 60 msec pulse followed immediately by a −15 V, 20 msec pulse, and a −15 V, 40 msec pulse, and these two components simultaneously inserted into or excised from a waveform to achieve DTC.

Inserting or excising zero voltage segments from a waveform has also been found to affect the final gray level after a transition, and hence such insertion or excision of zero voltage segments provides a second method for tuning the final gray level to achieve DTC. Such insertion or excision of zero voltage segments may be used alone or in combination with insertion or excision of BPP's.

Although the BPPDTC aspect of the present invention has been described above primarily with reference to pulse width modulated waveforms in which the voltage applied to a pixel at any given time can only be −V, 0 or +V, the invention is not limited to use with such pulse width modulated waveforms and may be used with voltage modulated waveforms, or waveforms using both pulse and voltage modulation. The foregoing definition of a balanced pulse pair can be satisfied by two pulses of opposite polarity with zero net impulse, and does not require that the two pulses be of the same voltage or duration. For example, in a voltage modulated drive scheme, a BPP might be composed of a +15 V, 20 msec pulse followed by a −5 V, 60 msec pulse.

From the foregoing, it will be seen that the BPPDTC aspect of the present invention permits dwell time compensation of a drive scheme while maintaining DC balance of the drive scheme. Such DTC can reduce the level of ghosting in electro-optic displays.

Section D: Target Buffer Methods and Apparatus

As already mentioned, the present invention provides two different methods using target buffers for driving electro-optic displays having a plurality of pixels, each of which is capable of achieving at least two different gray levels. The first of these two methods, the non-polarity target buffer method comprises providing initial, final and target data buffers; determining when the data in the initial and final data buffers differ, and when such a difference is found updating the values in the target data buffer in such a manner that (i) when the initial and final data buffers contain the same value for a specific pixel, setting the target data buffer to this value; (ii) when the initial data buffer contains a larger value for a specific pixel than the final data buffer, setting the target data buffer to the value of the initial data buffer plus an increment; and (iii) when the initial data buffer contains a smaller value for a specific pixel than the final data buffer, setting the target data buffer to the value of the initial data buffer minus said increment; updating the image on the display using the data in the initial data buffer and the target data buffer as the initial and final states of each pixel respectively; next, copying the data from the target data buffer into the initial data buffer; and these steps until the initial and final data buffers contain the same data.

In the second of these two methods, the polarity target buffer method, the final, initial and target data buffers are again provided, together with a polarity bit array arranged to store a polarity bit for each pixel of the display. Again, the data in the initial and final data buffers are compared, and when they differ the values in the polarity bit array and target data buffer are updated in such a manner that (i) when the values for a specific pixel in the initial and final data buffers differ and the value in the initial data buffer represents an extreme optical state of the pixel, the polarity bit for the pixel is set to a value representing a transition towards the opposite extreme optical state; and the target data buffer is set to the value of the initial data buffer plus or minus an increment, depending upon the relevant value in the polarity bit array. The image on the display is then updated in the same way as in the first method and thereafter the data from the target data buffer is copied into the initial data buffer. These steps are repeated until the initial and final data buffers contain the same data.

Prior art controllers for bistable electro-optic displays typically use logic similar to that shown in the following Listing 1 (all Listings herein are in pseudocode):

Listing 1

```
pixel array initial [x_size, y_size]
pixel array final [x_size, y_size]
while( )#endless loop
    initial := final
    if (host has new data)
        final := new_image
        update_display (initial, final)
```

With a controller operating in this manner, the display waits to receive new image information, then, when such new image information is received, performs a full update before allowing new information to be sent to the display, i.e., once one new image has been accepted by the display, the display cannot accept a second new image until the rewriting of the display needed to display the first new image has been completed, and in some cases this rewriting procedure may take hundreds of milliseconds cf. some of the drive schemes set out in Sections A-C above. Therefore, when the user is scrolling or typing, the display appears insensitive to user input for this full update (rewriting) time.

In contrast, a controller effecting the non-polarity target buffer method of the present invention operates by logic exemplified by the following Listing 2 (this type of controller may hereafter for convenience be called a "Listing 2 controller"):

---
Listing 2
---
```
pixel array initial [x_size, y_size]
pixel array final [x_size, y_size]
pixel array target [x_size, y_size]
while( )#endless loop
        initial := target
        final := host_frame_buffer
        if initial != final
        for each pixel in initial
                if Initial == final then target := initial
                if Initial > final then target := initial + 1
                if initial < final then target := initial −1
        update_display (initial, target)
```
---

In this modified controller logic for an NPTB method, there are three image buffers. The initial and final buffers are the same as in prior art controllers, and the new third buffer is a "target" buffer. The display controller can accept new image data at any time into the final buffer. When the controller finds that the data in the final buffer is no longer equal to the data in the initial buffer (i.e., rewriting of the image is required), a new target data set is constructed by incrementing or decrementing the values in the initial buffer by one (or leaving them unchanged), depending upon the difference between the relevant values in the initial and final buffers. The controller then performs a display update in the usual way using the values from the initial and target buffers. When this update is complete, the controller copies the values from the target buffer into the initial buffer, and then repeats the differencing operation between the initial and final buffers to generate a new target buffer. The overall update is complete when the initial and final buffers have the same data set.

Thus, in this NPTB method, the overall update is effected as a series of sub-update operations, one such sub-update operation occurring when the image is updated using the initial and target buffers. The term "meso-frame" will be used hereinafter for the period required for each of these sub-update operations; such a meso-frame of course designates a period between that required for a single scan frame of the display (cf. the aforementioned MEDEOD applications) and the superframe, or period required to complete the entire update.

The NPTB method of the present invention improves interactive performance in two ways. Firstly, in the prior art method, the final data buffer is used by the controller during the update process, so that no new data can be written into this final data buffer while an update is taking place, and hence the display is unable to respond to new input during the entire period required for an update. In the NPTB method of the present invention, the final data buffer is used only for calculation of the data set in the target data buffer, and this calculation, being simply a computer calculation, can be effected much more rapidly than the update operation, which requires a physical response from the electro-optic material. Once the calculation of the data set in the target data buffer is complete, the update does not require further access to the final data buffer, so that the final data buffer is available to accept new data.

For reasons discussed in the aforementioned MEDEOD applications and further discussed below with regard to waveforms, it is often desirable that pixels be driven in a cyclic manner, in the sense that once a pixel has been driven from away from one extreme optical state by a voltage pulse of one polarity, no voltage pulse of the opposite polarity is applied to that pixel until the pixel reaches its other extreme optical state; see, for example FIGS. 11A and 11B and the related description of the aforementioned 2003/0137521. This restriction is satisfied by the PTB method of the present invention, which may use a controller operating with logic exemplified by the following Listing 3 (this type of controller may hereafter for convenience be called a "Listing 3 controller"; this Listing assumes a four gray level system with gray levels numbered from 1 for black to 4 for white, although those skilled in the art can readily modify the pseudocode for operation with differing numbers of gray levels):

---
Listing 3
---
```
pixel array initial [x_size, y_size]
pixel array final [x_size, y_size]
pixel array target [x_size, y_size]
bit array polarity [x_size, y_size]
while( )#endless loop
        initial := target
        final := host_frame_buffer
        if initial != final
        for each pixel in initial
                if initial == 1 then polarity := 1
                if initial == 4 then polarity := 0
                if initial != final then target := initial +
                (polarity−0.5)*2
        update_display (initial, target)
```
---

This PTB method requires four image buffers, the fourth being a "polarity" buffer having a single bit for each pixel of the display, this single bit indicating the current direction of transition of the associated pixel, i.e., whether the pixel is currently transitioning from white-to-black (0) or black-to-white (1). If the associated pixel is not currently undergoing a transition, the polarity bit retains its value from the previous transition; for example, a pixel that is stationary in a light gray state and was previously white will have a polarity bit of 0.

In the PTB method, the polarity bit array is taken into account when a new target buffer data set is constructed. If the pixel is currently black or white, and a transition to the opposite state is required, the value of the polarity bit is set accordingly, and the target value is set to the gray level closest to black or white respectively. Alternatively, if the initial state for the pixel is an intermediate (gray) state, the target value is calculated by incrementing or decrementing the state by 1, according to the value of the polarity bit (+1 if polarity=1; −1 if polarity=0).

It should be noted that, in this drive scheme, the behavior of pixels in the intermediate states is independent of the current value of the final state for that pixel. A pixel, upon starting a transition from black to white or white to black, will continue in the same direction until it reaches the opposite optical rail (extreme optical state, typically black or white). If the desired image and hence the target state changes during the transition, the pixel will then return in the opposite direction, and so on.

Preferred waveforms for use in TB methods of the present invention will now be discussed. Table 7 below illustrates one possible transition matrix which can be used for one-bit (monochrome) operation with NPTB and PTB methods of the present invention, this transition matrix using two intermediate states.

TABLE 7

|  |  | Initial State | | | |
| --- | --- | --- | --- | --- | --- |
|  |  | 1 | 2 | 3 | 4 |
| Target State | 1 | A(*) | B | — | — |
|  | 2 | C | — | E | — |
|  | 3 | — | F | — | H |
|  | 4 | — | — | I | J(*) |

The structure of this transition matrix, with black, white, and two intermediate gray states, looks very similar to those used in prior art two-bit drive schemes, such as those described in the MEDEOD applications. However, in the TB methods of the present invention, these intermediate states do not correspond to stable gray states, but are only transition states, which exist only between the completion of one meso-frame and the start of the next. Also, there is no restriction on the uniformity of the reflectivity of these intermediate states.

It should be noted that, in the transition matrix shown in Table 7, many of the elements (indicated by the dashes) are not allowed. The controller only allows each transition to change the gray level by one unit in either direction, so that transitions involving multiple changes in gray level (for example a direct 1-4 black-to-white transition) are forbidden. The elements on the leading diagonal of the transition matrix (corresponding to zero transitions) are forbidden for the intermediate states; such leading diagonal elements are not recommended for white and black states, but are not strictly forbidden, as indicated by the asterisks in Table 7.

In a monochrome NPTB method, an update sequence appears as a series of states, starting and ending at the extreme optical states (optical rails), with a sequence of intermediate gray states separated by zero dwell time. For example, a simple transition from black to white would appears as:

1⇒ 2⇒ 3⇒ 4

On the other hand, if the final state of the display changes during the update, this transition might become:

1⇒ 2⇒ 3⇒ 2⇒ 1

Multiple changes in the final state might produce transitions such as:

1⇒ 2⇒ 3⇒ 2⇒ 3⇒ 4

More generally, there are four possible types of transitions between the extreme black and white optical states:

1⇒ 2⇒ 3(⇒ 2⇒ 3)⇒ 4
1⇒ 2(⇒ 3⇒ 2)⇒ 1
4⇒ 3⇒ 2(⇒ 3⇒ 2)⇒ 1
4⇒ 3(⇒ 2⇒ 3)⇒ 4 where the parentheses signify zero or more repeats of the sequence within the parentheses.

Optimization ("tuning") of this class of NPTB drive schemes requires adjusting the non-zero elements of the transition matrix to ensure consistent reflectivity values for the 1 (black) and 4 (white) states, independent of the number of repeats of the parenthetical sequences. The waveform must work for arbitrary dwell times in the black and white extreme optical states, but the dwell times in the intermediate states are always zero, so that, as mentioned above, the reflectivities of the transition states are not important.

In general, the time required for any single meso-frame update is equal to the length of the longest element in the transition matrix. Thus, the time for a total update is three times the length of this longest element. In the best case, the black-to-white and white-to-black (1⇒ 4 and 4⇒ 1 respectively) waveforms can be segmented into three equal-length pieces; this approach will reduce the update latency to one third of the full update time, while maintaining the same duration for the full update. As the length of the meso-frame updates becomes longer, which may be the result of optimizing the waveform, the benefit becomes less substantial. For example, if one element becomes twice as long, then the latency increases to two-thirds of the simple update time, and the full transition will require twice as long as before. It is possible to test to find the longest element present in a given meso-frame, and dynamically adjust the update time to that length, but the benefit of this extra computation is not likely to be significant.

Consideration should be given to what electro-optical properties of a medium make the display using the medium suitable for use with this type of NPTB drive scheme. Firstly, the dwell time dependency of the medium should be zero (ideally, or at least very low), since this waveform combines a series of near zero dwell times between meso-frames with potentially much longer dwell times between transitions. Secondly, the medium should have little or no sensitivity to optical states preceding the initial state of a particular transition, because the direction of a transition may change in mid-stream; for example, a 2⇒ 1 transition might be preceded by either a 1⇒ 2 or a 3⇒ 2 transition. Finally, the electro-optic medium should be symmetric in its response, especially near the black and white states; it is difficult to produce a DC balanced waveform that can perform a 1⇒ 2⇒ 1 or 4⇒ 3⇒ 4 transition that reaches the same black or white state, respectively.

For the foregoing reasons, the "intermediate reversals" in NPTB drive schemes make it very difficult to develop optimized waveforms. In contrast, a PTB drive scheme greatly reduces the demands on the electro-optic medium, and hence should alleviate much of the difficulty in optimizing an NTPB drive scheme while still providing improved performance.

Although the structure of the transition matrix for a PTB drive scheme is identical to that for an NPTB drive scheme, a PTB drive scheme permits only two black-to-white and white-to-black transitions, namely:

1⇒ 2⇒ 3⇒ 4; and
4⇒ 3⇒ 2⇒ 1.

In fact, these two transitions can be the same as the normal 1⇒ 4 and 4⇒ 1 transitions, with the transitions partitioned into three equal parts. Some slight re-tuning may be desirable to account for any delays between the meso-frames, but the adjustment is straightforward. For simple typing input, this drive scheme should result in a two-thirds reduction in latency.

There are some drawbacks to a PTB method. Extra memory is required for the polarity bit array, and a more complex controller is operate this simpler drive scheme because allowing for the direction of the transition at each pixel requires taking account of an extra datum (the polarity bit) in addition to the initial and final states for a transition. Also, while a PTB method does reduce the latency for starting an update, the controller must wait until an update is complete before reversing the transition. This limitation is apparent if a user types a character, and then immediately erases it; the delay before the character is erased is equal to the full update time. This limits the usefulness of the PTB method for cursor tracking or scrolling.

Although the NPTB and PTB methods have been described above primarily with regard to monochrome drive schemes, they are also compatible with gray scale drive schemes. The NPTB method is inherently completely gray scale compatible; the gray scale compatibility of a PTB method is discussed below.

From a drive scheme perspective, it will obviously be more difficult to produce a workable gray scale drive scheme for an NPTB method than a corresponding monochrome drive scheme, because in the gray scale drive scheme the intermediate states now correspond to actual gray levels, and thus the optical values of these intermediate states are constrained. Producing a gray scale drive scheme for a PTB method is also quite difficult. To reduce latency, the meso-frame transitions must be appreciably shortened. For example, a 2⇒3 transition could be a stand-alone transition, the last stage of a 1⇒2⇒3 transition, or the first stage of a 2⇒3⇒4 transition. Thus, there are competing demands to make this transition short (to achieve a shorter overall update), and accurate (in case the transition stops at gray level 3).

A gray scale PTB method may be modified by introducing multiple gray level steps (i.e., by permitting the gray level to change by more than one unit during each meso-frame, corresponding to re-inserting elements more than one step removed from the leading diagonal of the relevant transition matrix, such as that shown in Table 7 above), thus eliminating the degeneracy of the meso-frame steps described in the preceding paragraph. This modification could be effected by replacing the polarity bit matrix with a counter array, which contains, for each pixel of the display, more than one bit, up to the number of bits required for a full gray scale image representation. The waveform would then contain up to a full N×N transition matrix, with each waveform divided evenly into four (or other essentially arbitrary number of meso-frames).

Although the specific TB methods discussed above are two-bit gray scale methods, with two intermediate gray levels, TB methods can of course be used with any number of gray levels. However, the incremental benefit of reduced latency will tend to decrease as the number of gray levels grows.

Thus, the present invention provides two types of TB methods that give significant reductions in update latency in monochrome mode, while minimizing the complexity of the controller algorithms. These methods may prove especially useful in interactive one-bit (monochrome) applications, for example, personal digital assistants and electronic dictionaries, where a fast response to user input is of paramount importance.

Section E: Waveform Compression Methods and Apparatus

As already mentioned, the last main aspect of the present invention relates to a method for reducing the amount of waveform data which has to be stored in order to drive a bistable electro-optic display. More specifically, this aspect of the present invention provides a "waveform compression" or "WC" method for driving an electro-optic display having a plurality of pixels, each of which is capable of achieving at least two different gray levels, the method comprising: storing a base waveform defining a sequence of voltages to be applied during a specific transition by a pixel between gray levels; storing a multiplication factor for the specific transition; and effecting the specific transition by applying to the pixel the sequence of voltages for periods dependent upon the multiplication factor.

When an impulse-driven electro-optic display is being driven, each pixel of the display receives a voltage pulse (i.e., a voltage differential between the two electrodes associated with that pixel) or temporal series of voltage pulses (i.e., a waveform) in order to effect a transition from one optical state of the pixel to another, typically a transition between gray levels. The data needed to define the set of waveforms (forming a complete drive scheme) for each transition is stored in memory, generally on the display controller, although the data could alternatively be stored on a host computer or other auxiliary device. A drive scheme may comprise a large number of waveforms, and (as described in the aforementioned MEDEOD applications) it may be necessary to store multiple sets of waveform data to allow for variations in environmental parameters such as temperature and humidity, and non-environmental variations, for example the operating life of the electro-optic medium. Thus, the amount of memory needed to hold the waveform data can be substantial. It is desirable to reduce this amount of memory in order to reduce the cost of the display controller. A simple compression scheme that can be realistically accommodated in a display controller or host computer would be helpful in reducing the amount of memory needed for waveform data and thus the display controller cost. The waveform compression method of the present invention provides a simple compression scheme that is particularly advantageous for electrophoretic displays and other known bistable displays.

Uncompressed waveform data for a particular transition is typically stored as a series of bit sets, each bit set specifying a particular voltage to be applied at a particular point in the waveform. By way of example, consider a tri-level voltage drive scheme, where a pixel is driven toward black using a positive voltage (in this example, +10 V), toward white using a negative voltage (−10 V), and held at its current optical state with zero voltage. The voltage for a given time element (a scan frame for an active matrix display) can be encoded using two bits, for example, as shown in Table 8 below:

TABLE 8

| Desired voltage (V) | Binary representation |
|---|---|
| +10 | 01 |
| −10 | 10 |
| 0 | 00 |

Using this binary representation, a waveform for use in an active matrix drive and comprising a +10V pulse lasting for five scan frames followed by two scan frames of zero voltage would be represented as:

01 01 01 01 01 00 00.

Waveforms that comprise a large number of time segments require the storage of a large number of bit sets of waveform data.

In accordance with the WC method of the present invention, waveform data is stored as a base waveform (such a binary representation described above) and a multiplication factor. The display controller (or other appropriate hardware) applies to a pixel the sequence of voltages defined by the base waveform for periods dependent upon the multiplication factor. In a preferred form of such a WC method, a bit set (such as that given above) is used to represent the base waveform, but the voltage defined by each bit set is applied to the pixel for n time segments, where n is the multiplication factor associated with the waveform. The multiplication factor must be a natural number. For a multiplication factor of 1, the waveform applied is unchanged from the base waveform. For a multiplication factor greater than 1, the representation of the voltage series is compressed for at least some waveforms, that is, fewer bits are needed to express these waveforms than would be needed if the data were stored in uncompressed form.

By way of example, using the three voltage level binary representation of Table 8, consider a waveform that requires twelve scan frames of +10V followed by nine scan frames of −10V followed by six scan frames of +10V followed by three scan frames of 0V. This waveform is expressed in uncompressed form as:

01 01 01 01 01 01 01 01 01 01 01 01 10 10 10 10 10 10 10 10 10 01 01 01 01 01 01 00 00 00 and in compressed form as:

multiplication factor: 3
base waveform 01 01 01 01 10 10 10 01 01 00.

The length of the voltage sequence that must be allocated for each waveform is determined by the longest waveform. For encapsulated electrophoretic and many other electro-optic displays, the longest waveforms are typically required at the lowest temperatures, where the electro-optic medium responds slowly to the applied field. At the same time, the resolution necessary to achieve successful transitions is reduced when the response is slow, so there is little loss in accuracy of optical state by grouping successive scan frames through the WC method of the present invention. Using this compression method, a number of scan frames (or generally time segments) that is appropriate for waveforms at moderate and high temperatures where the update time is short can be allocated to each waveform. At low temperature, where the number of scan frames needed can exceed the memory allocation, multiplication factors greater than unity can be used to generate long waveforms. This ultimately results in reduced memory requirements and costs.

The WC method of the present invention is in principle equivalent to simply changing the frame time of an active matrix display at various temperatures. For example, a display could be driven at 50 Hz at room temperature, and at 25 Hz at 0° C. to extend the allowable waveform time. However, the WC method is superior because backplanes are designed to minimize the impact of capacitive and resistive voltage artifacts at a given scan rate. As one deviates significantly from this optimum scan rate in either direction, artifacts of at least one type rise. It is therefore better to keep the actual scan rate constant, while grouping scan frames using the WC method, which, in effect, provides a way of achieving a virtual change in scan rate without actually changing the physical scan rate.

It will be apparent to those skilled in the art that numerous changes can be made in the specific embodiments of the present invention already described without departing from the spirit scope of the invention. Accordingly, the whole of the foregoing description is to be construed in an illustrative and not in a limitative sense.

The invention claimed is:

1. A method for driving an electro-optic display having a plurality of pixels, each of which is capable of achieving at least two different gray levels, the method comprising:
   storing a base waveform defining a sequence of voltages to be applied to a pixel during a specific transition by the pixel between gray levels;
   storing a multiplication factor, n, that is a natural number greater than one; and
   effecting said specific transition by applying to said pixel a driving waveform-corresponding to n base waveforms.

2. The method of claim 1, wherein the multiplication factor is temperature-dependent.

3. The method of claim 1, wherein the base waveform comprises a set of bits, and the driving waveform comprises n sets of bits.

4. The method of claim 1 wherein the driving waveform is n times longer in time than the base waveform.

* * * * *